(12) United States Patent
Skala et al.

(10) Patent No.: US 9,745,507 B2
(45) Date of Patent: Aug. 29, 2017

(54) SYNTHETIC PROPPANTS AND MONODISPERSED PROPPANTS AND METHODS OF MAKING THE SAME

(71) Applicant: Halliburton Energy Services, Inc., Houston, TX (US)

(72) Inventors: Robert D. Skala, Houston, TX (US); Christopher Y. Fang, Houston, TX (US); Christopher E. Coker, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 222 days.

(21) Appl. No.: 13/952,090

(22) Filed: Jul. 26, 2013

(65) Prior Publication Data
US 2014/0038859 A1  Feb. 6, 2014

Related U.S. Application Data

(60) Provisional application No. 61/678,318, filed on Aug. 1, 2012.

(51) Int. Cl.
*C09K 8/80* (2006.01)
*C04B 35/01* (2006.01)
(Continued)

(52) U.S. Cl.
CPC ............... *C09K 8/80* (2013.01); *C04B 35/01* (2013.01); *C04B 35/117* (2013.01); *C04B 35/1115* (2013.01); *C04B 35/14* (2013.01); *C04B 35/16* (2013.01); *C04B 35/18* (2013.01); *C04B 35/185* (2013.01); *C04B 35/19* (2013.01); *C04B 35/195* (2013.01); *C04B 35/26* (2013.01); *C04B 35/443* (2013.01); *C04B 35/515* (2013.01); *C04B 35/56* (2013.01); *C04B 35/58* (2013.01); *C04B 35/62655* (2013.01); *C04B 38/009* (2013.01);
(Continued)

(58) Field of Classification Search
None
See application file for complete search history.

(56) References Cited

U.S. PATENT DOCUMENTS 3,598,373 A   8/1971 Inman
3,875,271 A   4/1975 Martin
(Continued)

FOREIGN PATENT DOCUMENTS

EP       2880122        6/2014
WO    2009027841 A2    3/2009
(Continued)

OTHER PUBLICATIONS

Communication Relating to the Results of the Partial International Search issued in corresponding International Patent Application No. PCT/US2013/052203 dated Oct. 30, 2013 (2 pages).
(Continued)

*Primary Examiner* — Jeffrey Washville
(74) *Attorney, Agent, or Firm* — Craig W. Roddy; Tumey LLP

(57) ABSTRACT

Synthetic ceramic proppants are described. Proppants having a monodispersity of 3-sigma distribution or lower are also described, including methods to make these proppants and methods of using these proppants.

35 Claims, 38 Drawing Sheets

(51) Int. Cl.

| | | |
|---|---|---|
| *C04B 35/111* | (2006.01) | |
| *C04B 35/117* | (2006.01) | |
| *C04B 35/14* | (2006.01) | |
| *C04B 35/16* | (2006.01) | |
| *C04B 35/18* | (2006.01) | |
| *C04B 35/185* | (2006.01) | |
| *C04B 35/19* | (2006.01) | |
| *C04B 35/195* | (2006.01) | |
| *C04B 35/26* | (2006.01) | |
| *C04B 35/443* | (2006.01) | |
| *C04B 35/515* | (2006.01) | |
| *C04B 35/56* | (2006.01) | |
| *C04B 35/58* | (2006.01) | |
| *C04B 35/626* | (2006.01) | |
| *C04B 38/00* | (2006.01) | |

(52) U.S. Cl.
CPC ............... *C04B 2235/3201* (2013.01); *C04B 2235/3203* (2013.01); *C04B 2235/3206* (2013.01); *C04B 2235/3208* (2013.01); *C04B 2235/3232* (2013.01); *C04B 2235/3272* (2013.01); *C04B 2235/3472* (2013.01); *C04B 2235/36* (2013.01); *C04B 2235/42* (2013.01); *C04B 2235/528* (2013.01); *C04B 2235/5296* (2013.01); *C04B 2235/5436* (2013.01); *C04B 2235/5445* (2013.01); *C04B 2235/5481* (2013.01); *C04B 2235/77* (2013.01); *C04B 2235/784* (2013.01)

(56) References Cited

U.S. PATENT DOCUMENTS

| | | | |
|---|---|---|---|
| 3,875,272 | A | 4/1975 | Martin |
| 3,875,273 | A | 4/1975 | Martin |
| 3,978,269 | A | 8/1976 | Martin |
| 4,440,866 | A | 4/1984 | Lunghofer et al. |
| 4,493,875 | A | 1/1985 | Beck et al. |
| 4,522,731 | A | 6/1985 | Lunghofer |
| 4,547,468 | A | 10/1985 | Jones et al. |
| 4,551,436 | A | 11/1985 | Johnson et al. |
| 4,632,876 | A | 12/1986 | Laird et al. |
| 4,639,427 | A | 1/1987 | Khaund |
| 4,713,203 | A | 12/1987 | Andrews |
| 4,944,905 | A | 7/1990 | Gibb et al. |
| 5,120,455 | A | 6/1992 | Lunghofer |
| 5,175,133 | A | 12/1992 | Smith et al. |
| 5,188,175 | A | 2/1993 | Sweet |
| 5,240,654 | A | 8/1993 | Smith et al. |
| RE34,371 | E | 9/1993 | Rumpf et al. |
| 5,964,291 | A | 10/1999 | Bourne et al. |
| 6,279,656 | B1 | 8/2001 | Sinclair et al. |
| 6,753,299 | B2 | 6/2004 | Lunghofer et al. |
| 6,767,868 | B2 | 7/2004 | Dawson et al. |
| 6,817,414 | B2 | 11/2004 | Lee |
| 7,132,389 | B2 | 11/2006 | Lee |
| 7,387,752 | B2 | 6/2008 | Canova et al. |
| 7,459,209 | B2 * | 12/2008 | Smith ............... C04B 18/082 166/280.2 |
| 7,491,444 | B2 | 2/2009 | Smith et al. |
| 7,598,209 | B2 | 10/2009 | Kaufman et al. |
| 7,615,172 | B2 | 11/2009 | Palamara et al. |
| 7,624,802 | B2 | 12/2009 | McCrary et al. |
| 7,703,521 | B2 | 4/2010 | Sullivan et al. |
| 7,721,804 | B2 | 5/2010 | Duenckel |
| 7,732,384 | B2 | 6/2010 | Putzig et al. |
| 7,845,409 | B2 | 12/2010 | Shinbach et al. |
| 7,867,613 | B2 | 1/2011 | Smith et al. |
| 7,883,773 | B2 | 2/2011 | Smith et al. |
| 7,887,918 | B2 | 2/2011 | Smith et al. |
| 7,897,546 | B2 | 3/2011 | Showalter et al. |
| 7,914,892 | B2 | 3/2011 | Smith et al. |
| 7,921,910 | B2 | 4/2011 | Wilson et al. |
| 8,003,212 | B2 | 8/2011 | Smith et al. |
| 8,003,707 | B2 | 8/2011 | Holland |
| 8,012,533 | B2 | 9/2011 | Smith et al. |
| 8,044,001 | B2 | 10/2011 | Putzig |
| 8,044,002 | B2 | 10/2011 | Putzig |
| 8,047,288 | B2 | 11/2011 | Skala et al. |
| 8,063,000 | B2 | 11/2011 | Wilson |
| 8,075,997 | B2 | 12/2011 | Smith et al. |
| 8,100,177 | B2 | 1/2012 | Smith, Jr. et al. |
| 8,168,570 | B2 | 5/2012 | Barron et al. |
| 8,178,476 | B2 | 5/2012 | Xie et al. |
| 8,178,477 | B2 | 5/2012 | Skala et al. |
| 8,214,151 | B2 | 7/2012 | Duenckel et al. |
| 8,216,675 | B2 | 7/2012 | Palamara et al. |
| 8,234,072 | B2 | 7/2012 | Smith, Jr. et al. |
| 8,298,667 | B2 | 10/2012 | Smith et al. |
| 8,496,057 | B2 | 7/2013 | Ferrero et al. |
| 8,505,628 | B2 | 8/2013 | Panga et al. |
| 2004/0147388 | A1* | 7/2004 | Webber ............... C04B 35/111 501/128 |
| 2006/0169450 | A1 | 8/2006 | Mang et al. |
| 2006/0172894 | A1 | 8/2006 | Mang et al. |
| 2006/0172895 | A1 | 8/2006 | Mang et al. |
| 2007/0059528 | A1 | 3/2007 | Palamara et al. |
| 2007/0099793 | A1 | 5/2007 | Wilson |
| 2007/0298977 | A1 | 12/2007 | Mang et al. |
| 2008/0070810 | A1 | 3/2008 | Mang |
| 2008/0241540 | A1 | 10/2008 | Canova et al. |
| 2009/0038797 | A1 | 2/2009 | Skala et al. |
| 2009/0044941 | A1 | 2/2009 | De Paiva Cortes et al. |
| 2009/0062157 | A1 | 3/2009 | Munoz, Jr. et al. |
| 2009/0118145 | A1 | 5/2009 | Wilson et al. |
| 2010/0105579 | A1 | 4/2010 | Pershikova |
| 2010/0167056 | A1 | 7/2010 | Fuss et al. |
| 2010/0193189 | A1 | 8/2010 | Pershikova |
| 2010/0204070 | A1 | 8/2010 | Orange et al. |
| 2010/0320652 | A1 | 12/2010 | Rao |
| 2011/0077176 | A1* | 3/2011 | Smith ............... C04B 35/04 507/271 |
| 2011/0111990 | A1 | 5/2011 | Pershikova et al. |
| 2011/0150735 | A1 | 6/2011 | Roberts et al. |
| 2011/0158873 | A1 | 6/2011 | Riman et al. |
| 2011/0160104 | A1* | 6/2011 | Wu ............... C04B 35/195 507/269 |
| 2011/0177984 | A1 | 7/2011 | Wilson et al. |
| 2011/0182799 | A1 | 7/2011 | Riman et al. |
| 2011/0200658 | A1 | 8/2011 | Mulqueen et al. |
| 2011/0278003 | A1 | 11/2011 | Rediger |
| 2012/0004147 | A1 | 1/2012 | Seetz et al. |
| 2012/0080588 | A1 | 4/2012 | Smith, Jr. et al. |
| 2012/0118574 | A1 | 5/2012 | Li et al. |
| 2012/0157358 | A1 | 6/2012 | Fang et al. |
| 2012/0178653 | A1 | 7/2012 | McClung, III |
| 2012/0181020 | A1 | 7/2012 | Barron et al. |
| 2012/0181035 | A1 | 7/2012 | Mang |
| 2012/0190593 | A1 | 7/2012 | Soane et al. |
| 2012/0190597 | A1 | 7/2012 | Chatterjee et al. |
| 2012/0227967 | A1 | 9/2012 | Shaikh et al. |
| 2012/0227968 | A1 | 9/2012 | Eldred et al. |
| 2012/0231981 | A1 | 9/2012 | Eldred et al. |
| 2012/0241157 | A1 | 9/2012 | Pope et al. |
| 2012/0245060 | A1 | 9/2012 | Jiang et al. |
| 2012/0273197 | A1 | 11/2012 | Gupta |
| 2013/0014945 | A1 | 1/2013 | Fang et al. |
| 2013/0022816 | A1 | 1/2013 | Smith et al. |
| 2013/0025860 | A1 | 1/2013 | Robb et al. |
| 2013/0025862 | A1 | 1/2013 | Eldred et al. |
| 2013/0062057 | A1 | 3/2013 | Smith, Jr. |
| 2013/0123152 | A1 | 5/2013 | Stephens et al. |
| 2013/0206408 | A1 | 8/2013 | Chatterjee et al. |
| 2014/0038859 | A1 | 2/2014 | Skala et al. |

(56) References Cited

U.S. PATENT DOCUMENTS

2014/0038860 A1    2/2014  Skala et al.
2014/0110110 A1    4/2014  Rohring

FOREIGN PATENT DOCUMENTS

| WO | 2011/094106     | 4/2011  |
| WO | 2011163224 A1   | 12/2011 |
| WO | 2013059793 A1   | 4/2013  |
| WO | 2014022210      | 6/2014  |

OTHER PUBLICATIONS

International Search Report and Written Opinion issued in corresponding International Patent Application No. PCT/US2013/052203, dated Jul. 15, 2014 (27 pages).

Russian office action for Russian Application No. 2015106913 dated Mar. 17, 2016.

Canadian Office Action for Canadian patent Application No. 2,880,426 dated Apr. 4, 2016.

\* cited by examiner

SYNTHETIC PROPPANTS AND MONODISPERSED PROPPANTS AND METHODS OF MAKING THE SAME

This application claims the benefit under 35 U.S.C. §119 (e) of prior U.S. Provisional Patent Application No. 61/678,318, filed Aug. 1, 2012, which is incorporated in its entirety by reference herein.

BACKGROUND OF THE INVENTION

The present invention relates to proppants and methods of making proppants. The present invention further relates to the use of proppants for hydrocarbon recovery. The present invention further relates to the method of fracking a well using the proppants of the present invention.

Proppants are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates.

Ceramic proppants are widely used as propping agents to maintain permeability in oil and gas formations. High strength ceramic proppants have been used in the hydrofracture of subterranean earth in order to improve production of natural gas and/or oil. For wells that are drilled 10,000 feet or deeper into the earth, the proppant beads need to withstand 10 kpsi or higher pressure to be effective to prop the fracture generated by the hydrofracture process. Currently only proppants formed from high strength materials, such as sintered bauxite and alumina have sufficient compressive and flexural strength for use in deep wells. These conventional high strength materials are expensive, however, because of a limited supply of raw materials, a high requirement for purity, and the complex nature of the manufacturing process. In addition, such high strength materials have high specific gravity, in excess of 3.0, which is highly undesirable for proppant applications. Producing high strength proppants with low specific gravity is also a challenge. In field applications, the transportability of proppants in wells is hindered by the difference of specific gravities of proppant and carrying fluid. While light weight oxide materials, such as cordierite, have low specific gravity, they have a relatively weak flexural strength and stiffness.

While ceramic proppants have been known, the previous ceramic proppants that are considered conventional had numerous defects and inconsistencies. For instance, as can be seen in FIGS. 21 and 22, conventional proppants were not uniform in shape or in surface characteristics. This is further confirmed by various ceramic proppants previously described or commercially available. For instance, FIGS. 26-31 provide images of various conventional ceramic proppants, and, as can be seen from these images, the surface of the proppants had numerous defects with regard to irregular and inconsistent shapes, irregular and inconsistent sizes, or surface defects. Each of these negative attributes would lead to inconsistent proppant performance when injected into a well and most especially would lead to proppant failure at a low crush strength.

While there is literature that describes nearly-monodispersed proppants and other references that characterize particles or proppants as monodispersed, there is a problem with such characterizations. First, no quantified descriptions are given when the term "monodispersed" is used to characterize particles of proppants. Thus, the monodispersity may have an immense distribution area involved, such that the standard deviation is over five standard deviations. No effort has been made in most, if not all, of this literature to quantify the monodispersity. Further, based on the methods described in these various literature articles, it would appear that achieving a highly-monodispersed proppant population would not be possible and that the standard deviation would be significant.

In addition, while various methods can be used to make proppants, and then classification techniques can be used to achieve some standard sizing, it is important to point out the following. Standard screen or sieve classifications will have typically a deviation or error of ±100 microns, for instance. The coefficient of variation for screen or sieve classification is over 20 to 25% or higher, whereas the coefficient of variation for air classification methods would be a coefficient of variation of 10 to 15% or higher. None of these techniques would produce a proppant population of monodispersity and further would not create a proppant population with a 3-sigma distribution with the width of the total distribution being more than 5% of the mean particle size.

Accordingly, there is a need to provide proppant populations of ceramic proppants, wherein the ceramic proppants are monodispersed with a 3-sigma distribution or better. In addition, there is a need to provide methods which can achieve this monodispersity.

SUMMARY OF THE PRESENT INVENTION

A feature of the present invention is to provide a plurality of proppants having high monodispersity.

A further feature of the present invention is to provide a proppant population that comprises, consists essentially of, or consists of ceramic proppants, wherein the proppants are monodispersed.

An additional feature of the present invention is to provide methods to make a plurality of proppants, such as ceramic proppants, which have monodispersity and can optionally be achieved without the need for any post-classification processing.

A further feature of the present invention is to provide new methods to make ceramic core/shell proppants where the core can include a hollow portion that is created during sintering of a solid green body core and a solid green body shell.

Further, a feature of the present invention is to provide proppants having a balance of strength properties from the shell and the core.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a plurality of sintered ceramic proppants, wherein the sintered ceramic proppants are monodispersed with a 3-sigma distribution or better with the width of the total distribution being 5% or less of the mean particle size. The plurality of ceramic proppants can be considered a population of proppants.

The present invention also relates to a plurality of ceramic proppants that can be green ceramic proppants or sintered ceramic proppants or both, having a Krumbein sphericity of at least 0.9, such as at least 0.94 or 0.95 to 0.99.

Also, the present invention relates to a proppant having a plurality of micron particles that are sintered together, wherein the micron particles (prior to sintering) have a unimodal particle distribution, bi-modal particle distribution, or a multi-modal particle distribution (e.g., tri-modal particle distribution).

Furthermore, the present invention relates to a proppant having a core and a shell, wherein the core is ceramic or an oxide thereof and the shell comprises at least one ceramic material, wherein the proppant has a core strength to shell strength ratio of from 0.8 to 1. The proppant can have an overall proppant strength to core strength ratio of from 2 to 3.

The present invention further relates to methods of making the proppants of the present invention. The method can include preparing a slurry of ceramic particles and/or ceramic precursor particles, and then forming a plurality of green bodies by spray-drying the slurry into spherical green bodies (or other shapes) which can then optionally be coated with one or more coatings or shell-forming materials of the same or different material used to form the green body. The optional coating technique can be achieved by fluid bed coating techniques, and then the green body is sintered. The ceramic proppants (in the green state (before or after the optional shell) and/or in the sintered state) can have a monodispersity with a 3-sigma distribution or lower (e.g., 2-sigma or 1-sigma distribution) with the width of the total distribution being 5% or less of the mean particle size. Monodispersity can be achieved, for instance, using specially designed spray heads attached to the spray dryer as described herein. The monodispersity can be achieved using various spray-dryer settings and parameters as described herein.

The present invention further relates to a method to prop open subterranean formation fractures by utilizing the proppants of the present invention. The proppant population of the present invention can be combined with one or more fluids to form a suspension, which can then be pumped into the subterranean producing zone. Further details are provided herein.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF DRAWINGS

FIG. 8 shows that the diffusion of the core material forms a type of gradient and, therefore, a higher concentration of core material is present closer to the core than the outer surface of the proppant, with migration or diffusion of the core material occurring in an outward radial direction. FIG. 8 also comprises three graphs that show the degree of porosity, core material concentration, and mullite whisker formation/concentration based on location within the proppant. The three graphs are in alignment with the location shown in the proppant sphere diagram or drawing.

DETAILED DESCRIPTION OF THE PRESENT INVENTION

Figure 1:
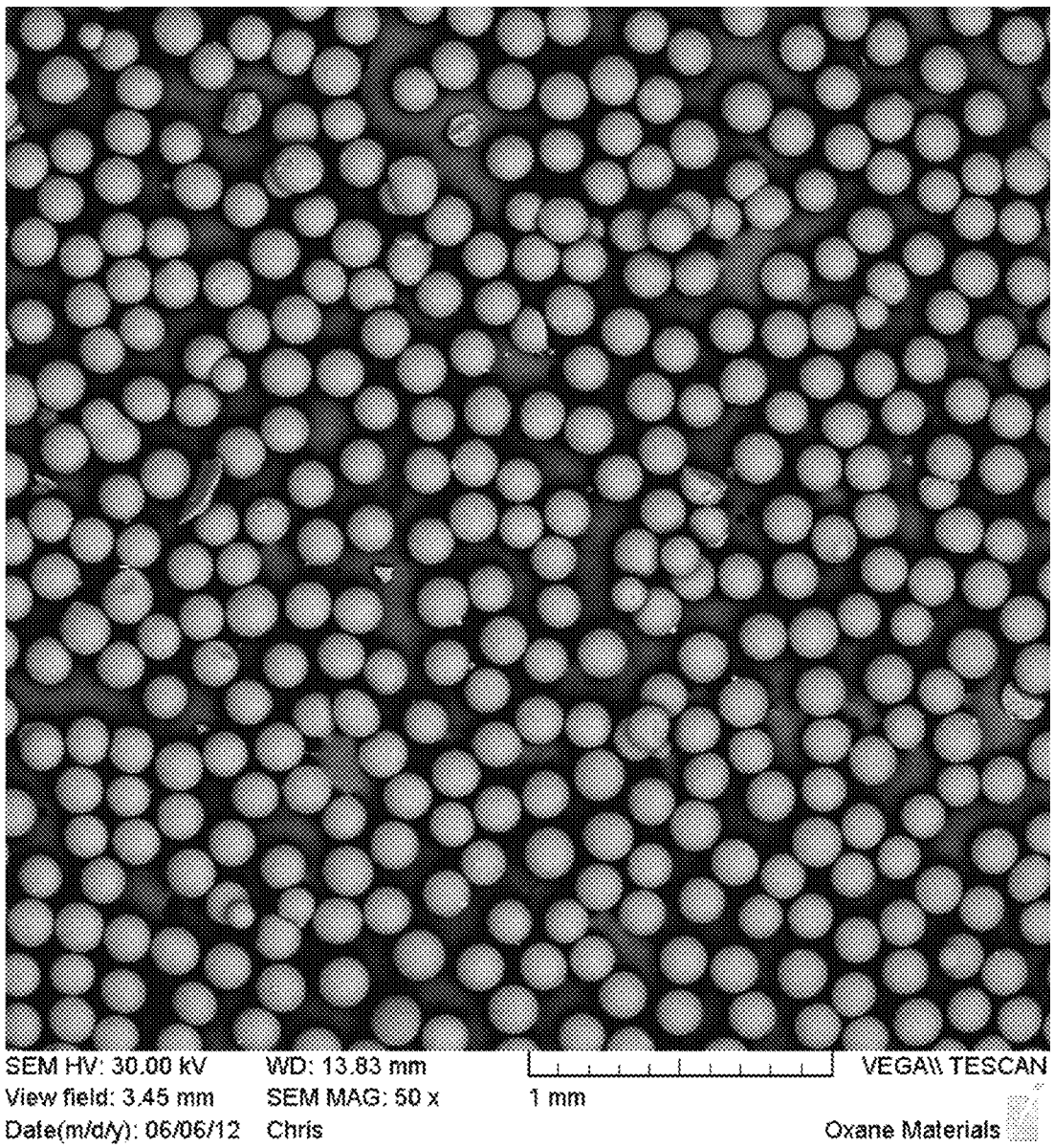
FIG. 1 is a SEM image of microspheres from an example of the present application.

The present invention relates to a proppant, populations of proppants, methods of making the proppants, and uses for the proppants, including using the proppants in hydrocarbon recovery.

The present invention makes it possible to achieve a population of ceramic proppants, more specifically, green and/or sintered ceramic proppants, wherein the green or sintered ceramic proppants can be monodispersed with a 3-sigma distribution or lower with the width of the total distribution being 5% or less of the mean particle size (which can be considered a 5% tolerance). In other words, the plurality of the proppants or the population of the proppants can be highly monodispersed and have a standard deviation of 3 or less. Standard deviation can be 3 or less, 2.75 or less, 2.5 or less, 2.25 or less, 2 or less, 1.75 or less, 1.5 or less, 1.25 or less, 1 or less, 0.9 or less, 0.8 or less, 0.7 or less, 0.6 or less, or 0.5 or less standard deviation. The standard deviation can be from 1 to 3, 0.5 to 3, 0.5 to 2.5, 0.5 to 2 and the like. Put another way, the population of green or sintered ceramic proppants of the present invention can be with a 3-sigma distribution, can be with a 2-sigma distribution, or can be with a 1-sigma distribution with the width of the total distribution being 5% or less of the mean particle size (which can be considered a 5% tolerance). For purposes of the present invention, a representative sample can be taken to determine this monodispersity, such as, but not limited to, ISO standard 13503-2 (First edition) or taking a random sample of 50, 100, 150, or 200 proppants from the population and testing.

The proppants of the present invention can have a coefficient of variation (or coefficient of variance) (CV) of 8% or less, such as from about 5% to about 8%. This coefficient of variation can apply to the green body core, the green body that comprises a core and shell, and/or the sintered proppant resulting from these green bodies. The coefficient of variation is also known as the coefficient of variance. For purposes of the present invention, the coefficient of variance or coefficient of variation is calculated by:

$$\frac{\text{(standard deviation in microns)}}{\text{(mean particle size in microns)}}.$$

As stated above, this highly monodispersed population of proppants of the present invention is not achieved through conventional classification techniques, such as screen or sieve classifying or air classifying. One way to achieve such a highly monodispersed proppant is through manufacturing techniques which form the green and/or sintered ceramic proppant in the desired shape and in an extremely consistent manner.

A further advantage of the present invention is an increase in the production rate, or put another way a reduced cycle time for the formation of the green proppant particles. This can be achieved through the use of a solid template particle, wherein during sintering, at least some of the material of the template diffuses into the shell material of the proppant particle. Given that the solid template particle contains more mass than that of an equivalent size hollow particle, the total weight of the proppant particle may increase and thus the total weight of coating material that must be applied to obtain an equivalent weight to the hollow template is reduced. This then equates to a reduced processing time and hence an increase in production rate.

The increase in production rate due to the present invention can also be realized by the use of a larger template particle. The phenomenon of the template material diffusion into the coating structure can be used to good effect to reduce the thickness of the applied coating whilst still maintaining the desired properties (shape, sphericity, coefficient of variance, strength to weight ratio, etc) of the proppant. The reduction in the coating thickness applied to achieve identical or improved properties results in a reduction in the cycle time of the process, hence an improvement in production rate.

Due to the tighter particle size distribution of the template particles of the present invention and the improved surface morphology and shape of the template particles, an increased bed loading during the process may be used to improve fluidization of the particles. An increase in the bed loading of the process will yield a larger final batch size for essentially the same or reduced processing time as the hollow template particles. In addition, the tighter particle size distribution of the template particles of the present invention can produce a final green proppant particle batch with a tighter particle size distribution (reduced Cv) leading to increases in the yield of target size proppant per batch and consequently an increase in the production rate of green proppant.

A further advantage of the present invention is an increase in the coating efficiency of the process. The synthetic template particles of the present invention absorb moisture from the coating slurry during the process. This improves the coating to template bond and reduces the tendency for the coating slurry to spall during the early stages of coating as is the case with the hollow template particles which typically exhibit a glassy, impervious surface. The improvement in bond strength between the coating slurry and the synthetic template particle, increased slurry deposition rates may be employed, especially in the early stages of the process, which will lead to a reduction in cycle time of the process and hence increases in the production rate of the process.

For purposes of the present invention, a ceramic proppant is a proppant that contains at least 90% by weight ceramic materials based on the entire weight of the ceramic proppant. For example, the ceramic proppant can contain at least 92% by weight ceramic materials, at least 95% by weight ceramic materials, at least 96% by weight ceramic materials, at least 97% by weight ceramic materials, at least 98% by weight ceramic materials, at least 99% by weight ceramic materials, at least 99.5% by weight ceramic materials, at least 99.9% by weight ceramic materials, or can be 100% by weight ceramic materials. The ceramic materials, for purposes of the present invention, can be one or more metal oxides, and/or one or more non-oxides that are considered ceramics, such as carbides, borides, nitrides, and/or silicides. For purposes of the present invention, the term "ceramic" includes glass material, ceramic material, and/or glass-ceramic material and/or can comprise one or more glass, ceramic, and/or glass-ceramic phases. The "ceramic" material can be non-crystalline, crystalline, and/or partially crystalline.

For purposes of the present invention, the ceramic proppant can have less than 5 wt % polymeric and/or cellulosic (e.g., plant material or tree material). More preferably, the proppants of the present invention have less than 1 wt %, less than 0.5 wt %, less than 0.1 wt %, or 0 wt % of polymeric material or cellulosic material or both in the sintered proppants of the present invention.

The ceramic in the ceramic proppants of the present invention can be an oxide, such as aluminum oxides (alumina) and/or mixed metal aluminum oxides, such as metal aluminates containing calcium, yttrium, titanium, lanthanum, barium, and/or silicon in addition to aluminum. The ceramic can be an oxide, such as aluminum oxide called alumina, or a mixed metal oxide of aluminum called an aluminate, a silicate, or an aluminosilicate, such as mullite or cordierite. The aluminate or the ceramic in general may contain magnesium, calcium, yttrium, titanium, lanthanum, barium, and/or silicon. The ceramic may be formed from a nanoparticle precursor such as an alumoxane. Alumoxanes can be chemically functionalized aluminum oxide nanoparticles with surface groups including those derived from carboxylic acids such as acetate, methoxyacetate, methoxyethoxyacetate, methoxyethoxyethoxyacetate, lysine, and stearate, and the like. The ceramic can include, but is not limited to, boehmite, alumina, spinel, aluminosilicate clays (e.g., kaolin, montmorillonite, bentonite, and the like), calcium carbonate, calcium oxide, magnesium oxide, magnesium carbonate, cordierite, spinel, spodumene, steatite, a silicate, a substituted alumino silicate clay or any combination thereof (e.g. kyanite) and the like.

The ceramic can be or contain cordierite, mullite, bauxite, silica, spodumene, clay, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide or a non-oxide ceramic or any mixtures thereof. The proppant can include or be one or more sedimentary and/or synthetically produced materials.

Glass-ceramic, as used herein, refers to any glass-ceramic that is formed when glass or a substantially glassy material is annealed at elevated temperature to produce a substantially crystalline material, such as with limited crystallinity or controlled crystallite size. As used herein, limited crystallinity should be understood as crystallinity of from about 5% to about 100%, by volume (e.g., 10% to 90%; 20% to 80%; 30% to 70%; 40% to 60% by volume). The crystallite size can be from about 0.01 micrometers to 20 micrometers, such as 0.1 to 5 micrometers. Preferably the crystallite size is less than 1 micrometer. The glass-ceramic can be composed of aluminum oxide, silicon oxide, boron oxide, potassium oxide, zirconium oxide, magnesium oxide, calcium oxide, lithium oxide, phosphorous oxide, and/or titanium oxide or any combination thereof.

The glass-ceramic can comprise from about 35% to about 55% by weight $SiO_2$; from about 18% to about 28% by weight $Al_2O_3$; from about 1% to about 15% by weight (e.g., 1 to 5 wt %) CaO; from about 7% to about 14% by weight MgO; from about 0.5% to about 15% by weight $TiO_2$ (e.g., 0.5 to 5 wt %); from about 0.4% to about 3% by weight $B_2O_3$, and/or greater than 0% by weight and up to about 1% by weight $P_2O_5$, all based on the total weight of the glass-ceramic. The glass-ceramic can comprise from about 3% to about 5% by weight $Li_2O$; from about 0% to about 15% by weight $Al_2O_3$; from about 10% to about 45% by weight $SiO_2$; from about 20% to about 50% by weight MgO; from about 0.5% to about 5% by weight $TiO_2$; from about 15% to about 30% by weight $B_2O_3$, and/or from about 6% to about 20% by weight ZnO, all based on the total weight of the glass-ceramic.

The proppant can comprise aluminum oxide, silicon oxide, titanium oxide, iron oxide, magnesium oxide, calcium oxide, potassium oxide and/or sodium oxide, and/or any combination thereof. The sintered proppant can be or include at least in part cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic or any combination thereof.

The glass-ceramic proppant can be fully or nearly fully crystalline or can contain a glass component (e.g., phase(s)) and a crystalline component (e.g., phase(s)) comprising crystallites. The glass-ceramic can have a degree of crystallinity of from about 5% to about 100%, or from about 15% to about 80%. For example, the glass-ceramic can have from about 50% to 80% crystallinity, from about 60% to 78% crystallinity or from about 70% to 75% crystallinity by volume. The crystallites can have a random and/or directed orientation. With respect to the orientation of the crystals that are present in the glass-ceramic, the crystal orientation of the crystals in the glass-ceramic can be primarily random or can be primarily directed in a particular orientation(s) (e.g., non-random). For instance, the crystal orientation of the glass-ceramic can be primarily random such that at least 50% or higher of the orientations are random orientations based on the overall orientation of the crystals present. For instance, the random orientation can be at least 60%, at least 70%, at least 80%, at least 90%, such as from about 51% to 99%, from 60% to 90%, from 70% to 95% or higher with respect to the percent of the crystals that are random based on the crystals measured. X-ray diffraction ("XRD") can be used to determine the randomness of the crystallites. As the glass-ceramic can have both crystal and glass components, the glass-ceramic can have certain properties that are the same as glass and/or crystalline ceramics. Thus, the glass-ceramic can provide an ideal gradient interface between the template sphere and the ceramic shell, if present. The glass-ceramic can be impervious to thermal shock. Furthermore, the proportion of the glass and crystalline component of the glass-ceramic can be adjusted to match (e.g., within 10%, within 5%, within 1%, within 0.5%, within 0.1%) the coefficient of thermal expansion (CTE) of the shell (if present) or other material to which it will be bonded or attached or otherwise in contact with, in order to prevent premature fracture(s) resulting from cyclic stresses due to temperature changes, or thermal fatigue. For example, when the glass-ceramic has from 70% to 78% crystallinity, the two coefficients balance such that the glass-ceramic as a whole has a thermal expansion coefficient mismatch that is very close to zero.

Glass (which can be considered a ceramic type of material), as used herein, can be any inorganic, non-metallic solid non-crystalline material, such as prepared by the action of heat and subsequent cooling. The glass can be any conventional glass such as, for example, soda-lime glass, lead glass, or borosilicate glass. Crystalline ceramic materials, as used herein, can be any inorganic, non-metallic solid crystalline material prepared by the action of heat and subsequent cooling. For example, the crystalline ceramic materials can include, but are not limited to, alumina, zirconia, stabilized zirconia, mullite, zirconia toughened alumina, spinel, aluminosilicates (e.g., mullite, cordierite), perovskite, perchlorate, silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or any combination thereof.

The proppant can have a crystalline phase and a glass (or glassy) phase, or amorphous phase. The matrix or amorphous phase can include a silicon-containing oxide (e.g., silica) and/or an aluminum-containing oxide (e.g., alumina), and optionally at least one iron oxide; optionally at least one potassium oxide; optionally at least one calcium oxide; optionally at least one sodium oxide; optionally at least one titanium oxide; and/or optionally at least one magnesium oxide, or any combinations thereof. The matrix or amorphous phase can contain one or more, or all of these optional oxides in various amounts where, preferably, the silicon-containing oxide is the major component by weight in the matrix and/or the amorphous phase, such as where the silicon-containing oxide is present in an amount of at least 50.1% by weight, at least 75% by weight, at least 85% by weight, at least 90% by weight, at least 95% by weight, at least 97% by weight, at least 98% by weight, at least 99% by weight (such as from 75% by weight to 99% by weight, from 90% by weight to 95% by weight, from 90% by weight to 97% by weight) based on the weight of the matrix or based on the weight of the amorphous phase alone. Exemplary oxides that can be present in the amorphous phase include, but are not limited to, $SiO_2$, $Al_2O_3$, $Fe_2O_3$, $Fe_3O_4$, $K_2O$, $CaO$, $Na_2O$, $TiO_2$, and/or $MgO$. It is to be understood that, for purposes of the present invention, other metals and/or metal oxides can be present in the matrix or amorphous phase.

The amorphous phase can include or be ceramic, and for instance can include alumina and/or silica. The amorphous phase can further include unreacted material (e.g., particles), such as alumina, alumina precursor, and/or siliceous material or any combination thereof.

The proppant can include one or more minerals and/or ores, one or more clays, and/or one or more silicates, and/or one or more solid solutions. The minerals or ores can be aluminum-containing minerals or ores and/or silicon-containing minerals or ores. These minerals, ores, clays, silicates, and/or solid solutions can be present as particulates. These component(s) can be present as at least one crystalline particulate phase that can be a non-continuous phase or continuous phase in the material. More specific examples include, but are not limited to, alumina, aluminum hydroxide, bauxite, gibbsite, boehmite or diaspore, ground cenospheres, fly ash, unreacted silica, silicate materials, quartz, feldspar, zeolites, bauxite and/or calcined clays. These components in a combined amount can be present in the material in an amount, for instance, of from 0.001 wt % to 85 wt % or more, such as from 1 wt % to 80 wt %, 5 wt % to 75 wt %, 10 wt % to 70 wt %, 15 wt % to 65 wt %, 20 wt % to 60 wt %, 30 wt % to 70 wt %, 40 wt % to 70 wt %, 45 wt % to 75 wt %, 50 wt % to 70 wt %, 0.01 wt % to 10 wt %, 0.1 wt % to 8 wt %, 0.5 wt % to 5 wt %, 0.75 wt % to 5 wt %, 0.5 wt % to 3 wt %, 0.5 wt % to 2 wt % based on the weight of the material. These amounts and ranges can alternatively apply to one crystalline particulate phase, such as alumina or an aluminum-containing material. These additional components can be uniformly dispersed throughout the matrix or amorphous phase (like filler is present in a matrix as discrete particulates).

The proppant can have any particle size. For instance, the proppant can have a particle diameter size of from about 75 microns to 1 cm or a diameter in the range of from about 100 microns to about 2 mm, or a diameter of from about 100 microns to about 3,000 microns, or a diameter of from about 100 microns to about 1,000 microns. Other particle sizes can be used. Further, the particle sizes as measured by their diameter can be above the numerical ranges provided herein or below the numerical ranges provided herein.

The proppant can have any median particle size, such as a median particle size, $d_{p50}$, of from about 90 μm to about 2000 μm (e.g., from 90 μm to 2000 μm, from 100 μm to 2000 μm, from 200 μm to 2000 μm, from 300 μm to 2000 μm, from 500 μm to 2000 μm, from 750 μm to 2000 μm, from 100 μm to 1000 μm, from 100 μm to 750 μm, from 100 μm to 500 μm, from 100 μm to 250 μm, from 250 μm to 2000 μm, from 250 μm to 1000 μm), wherein $d_{p50}$ is a median particle size where 50% of the particles of the distribution have a smaller particle size.

The proppants of the present application can, for instance, have a specific gravity of from about 0.6 g/cc to about 4 g/cc. The specific gravity can be from about 1.0 g/cc to about 3 g/cc or can be from about 0.9 g/cc to about 2.5 g/cc, or can be from 1.0 g/cc to 2.5 g/cc, or from 1.0 g/cc to 2.4 g/cc, or from 1.0 g/cc to 2.3 g/cc, or from 1.0 g/cc to 2.2 g/cc, or from 1.0 g/cc to 2.1 g/cc, or 1.0 g/cc to 2.0 g/cc. Other specific gravities above and below these ranges can be obtained. The term "specific gravity" as used herein is the weight in grams per cubic centimeter (g/cc) of volume, excluding open porosity in determining the volume. The specific gravity value can be determined by any suitable method known in the art, such as by liquid (e.g., water or alcohol) displacement or with a gas pycnometer.

The proppant (green body and/or sintered proppant) can be spherical and have a Krumbein sphericity of at least about 0.5, at least 0.6 or at least 0.7, at least 0.8, or at least 0.9, and/or a roundness of at least 0.4, at least 0.5, at least 0.6, at least 0.7, or at least 0.9. The term "spherical" can refer to roundness and sphericity on the Krumbein and Sloss Chart by visually grading 10 to 20 randomly selected particles. As an option, in the present invention, the proppants of the present invention can have a very high degree of sphericity. In particular, the Krumbein sphericity can be at least 0.92, or at least 0.94, such as from 0.92 to 0.99, or from 0.94 to 0.99, or from 0.97 to 0.99, or from 0.95 to 0.99. This is especially made possible by the methods of the present invention, including forming synthetic templates on cores and using a spray dryer or similar device.

With regard to the proppant (either in the green body state or as a sintered proppant or both), the proppant has a change in sphericity of 5% or less. This change in sphericity parameter is with respect to the proppant (either in the green body state or sintered proppant state) in the shape of a sphere and this change in sphericity parameter refers to the uniformity of the sphere around the entire surface area of the exterior of the sphere. Put another way, the curvature that defines the sphere is very uniform around the entire sphere such that the change in sphericity compared to other points of measurement on the same sphere does not change by more than 5%. More preferably, the change in sphericity is 4% or less or 3% or less, such as from about 0.5% to 5% or from about 1% to about 5%.

The proppants of the present invention can have a crush strength of 1,000 psi to 20,000 psi or higher (e.g., from 1,500 psi to 10,000 psi, from 3,000 psi to 10,000 psi, from 5,000 psi to 10,000 psi, from 9,000 psi to 12,000 psi). Other crush strengths below or above these ranges are possible. Crush strength can be measured, for example, according to American Petroleum Institute Recommended Practice 60 (RP-60) or according to ISO 13503-2.

The proppant can have a flexural strength in a range of from about 1 MPa to about 800 MPa, or more, such as 1 MPa to 700 MPa, 5 MPa to 600 MPa, 10 MPa to 500 MPa, 25 MPa to 400 MPa, 50 MPa to 200 MPa, and the like.

The proppant or part thereof can have a coefficient of thermal expansion (CTE at from 25° C. to 300° C.) of from about $0.1 \times 10^{-6}$/K to about $13 \times 10^{-6}$/K, such as from $0.1 \times 10^{-6}$/K to $2 \times 10^{-6}$/K or $1.2 \times 10^{-6}$/K to $1.7 \times 10^{-6}$/K. The proppant can have a MOR of from about 1 to about 800 MPa, such as 100 to 500 MPa.

The present invention further relates to a proppant. The proppant can have a core and at least one shell surrounding or encapsulating the core. The core can comprise, consist essentially of, or consist of one or more ceramic materials and/or oxides. The shell can comprise, consist essentially of, or consist of at least one ceramic material and/or oxide. The examples of various ceramic materials or oxides thereof provided above can be used here in this proppant. The sintered proppant can have a core strength to shell strength ratio of from 0.8 to 1. As an option, the proppant can have an overall proppant strength to core strength ratio of 2 to 3. The reference to core strength is based on the strength measurement of the core alone without any shell, for instance, as tested in a crush strength measurement, for instance, according to API Recommended Practice 60 (RP-60). The shell strength is determined by diametral splitting tensile strength test method based on ASTM C1144, Modulus of Rupture test based on ASTM C78, or Modulus of Rupture test based on ASTM C 1609. Similarly, the overall proppant strength is based on the proppant with the core and shell tested for crush strength compared to the core strength alone. In the present invention, as an option, the core strength is equal to the shell strength, and can be below (lower than) the shell strength, and can be significantly below. The shell can be formed by a plurality of particles which are formed as a ceramic coating around or encapsulating the core and sintered to form a sintered continuous shell.

For purposes of the present invention, the plurality of green and/or sintered ceramic proppants having a monodispersed size means that the production of the proppants from a process produces monodispersed proppants without the need for any classification. Also, a plurality of green and/or sintered ceramic proppants having a monodispersed distribution that is at least a 3-sigma distribution means that the plurality of green and/or sintered ceramic proppants is not achievable by standard air classification or sieving classification techniques. The "plurality," for purposes of the present invention, can refer to at least 1 kilogram of proppant, such as at least 5 kilograms, at least 10 kilograms, at least 50 kilograms, or at least 100 kilograms of proppant or other amounts, which would have this monodispersity of the present invention.

With regard to the plurality of sintered ceramic proppants, it is understood that the sintered ceramic proppants are preferably synthetically prepared. In other words, all components of the proppants are formed by processing into a desired green body shape that is ultimately sintered. Put another way, the sintered proppants of the present invention preferably do not have any naturally preformed spheres present (e.g., no preformed cenospheres), unless it is ground to particle sizes for use in forming the green body, or a part thereof. Thus, the sintered ceramic proppants of the present invention can be considered to be synthetically formed.

With the ceramic proppants of the present invention, various property improvements can be achieved. For instance, the crush strength/weight relationship or ratio is significantly improved. With the present invention, for the same size proppant, the proppants can achieve a higher crush strength (PSI) and, at the same time, permit more porosity in the proppant, which can be beneficial to lowering the specific gravity or density of the proppant. Porosity in a proppant is considered a flaw by those in the proppant industry and ceramic industry. However, the existence of pores or voids is important because even though these pores or voids are considered flaws, they permit the proppant to have a desirable lower specific gravity or density. However, there is a trade-off in that with porosity in the proppant, this leads to proppant failure due to affecting the overall crush strength of the proppant. Thus, there is a desired balance between crush strength and porosity. In previous proppants, this balance meant that the crush strength of a conventional proppant was lower than desired and, in fact, the desired porosity was lower than desired, since any increase in porosity would lead to a lower crush strength and a proppant that would be considered not desirable due to low crush strength. With the present invention, high crush strength in combination with high porosity can be achieved and this can be achieved by managing the flaw (pore or void) size, the flaw population, and/or flaw tolerance. One way to better understand the property balance achieved with the present invention is to provide several examples. For instance, for a ceramic proppant of the present invention having a $d_{50}$ size of 321±24 microns, the crush strength (as determined by API RP-60) was 3.73% fines at 20,000 psi, and this proppant had a total porosity (by volume based on the overall volume of proppant) of 7.98%. Another example is for a ceramic proppant of the present invention having a $d_{50}$ size of 482±30 microns, the crush strength (as determined by API RP-60) was 5.08% fines at 20,000 psi, and this proppant had a total porosity (by volume based on the overall volume of proppant) of 5.79%. A further way to understand the present invention is with respect to the strength/porosity relationship. The strength of a proppant (according to API RP-60) is given by the percentage of fines generated at a given load, say 20,000 psi. The relationship may be understood by taking the ratio of crush fines to the porosity, i.e. % fines/%porosity to give a dimensionless number which represents the strength/porosity relationship. By doing so with the present invention, a strength/porosity descriptor can be established which, in the present invention can be from 0.4 to 0.9, or from 0.46 to 0.88, or from 0.467 to 0.877, such as from 0.5 to 0.8, or from 0.5 to 0.85, or from 0.6 to 0.75, or from 0.55 to 0.7, or from 0.55 to 0.8 and the like.

Another property improvement of the present invention is with regard to achieving a measured specific gravity that is equal or nearly equal (e.g. within 10%, within 7%, within 5%, within 2.5%, within 1%, within 0.5%, within 0.25%, or within 0.1%) to the specific gravity calculated from the bulk density of the proppant. The specific gravity is measured using the Archimedes method. Generally, with conventional proppants, the measured specific gravity is higher than the specific gravity calculated from the bulk density of the proppants. For instance, this can be over 10% greater. This higher value in measured specific gravity generally means that the proppant is "leaking" which means that there are flaws or cracks, or imperfections on the surface of the proppant. With the present invention, the "leaking" can be avoided or substantially reduced and this is reflected in the measured specific gravity being the same or nearly equal to the specific gravity calculated from the bulk density. As an option, the bulk density/SG ratio can further include excellent maximum load strength. The maximum load is determined based on AP 60 and is a determination of the maximum load an individual proppant can withstand before proppant failure. With the present invention, the proppants (individual proppant) of the present invention can achieve a maximum load (in N) of at least 18 N, such as from 18 to 27 N, or from 20 N to 25 N, or from 21 N to 26 N, from 20 N to 100 N, from 30 N to 100 N, from 40 N to 100 N, from 20 N to 80 N, from 20 N to 60 N, and the like. These maximum loads can especially be achieved for proppants that are spherical (such as ones having an average diameter of from 100 microns to 500 microns, or from 150 microns to 450 microns, or from 200 microns to 400 microns, or from 250 microns to 350 microns). The proppant can have a hollow center or have a solid center (e.g., hollow core or solid core).

Another property that can be achieved with the present invention is an excellent crush strength with a low coefficient of variance. The reality of proppants is that each single proppant in a plurality of proppants will not have the exact same crush strength. There is a variance of crush strength per proppant. This is due to a number of factors including, but not limited to, the fact that each proppant is not identical to each other due to size, shape, flaws within the proppant, and the like. Thus, it is highly desirable to have consistent crush strength per individual proppant in a plurality of proppants (especially, with respect to the lot or batch that goes into a fracture location). This consistency can be seen by determining the coefficient of variance with regard to single proppant testing for crush strength. For instance, 30 proppants can be tested individually (30 tests) for individual crush strength of each proppant in the test group. Then, the average crush strength in psi can be determined and then the coefficient of variance can be determined. As one example, in a 30/40 mesh ceramic proppant of the present invention, 30 proppants were individually tested for crush strength following API test procedure, RP-60, and the average crush strength was 31,360 psi. The coefficient of variance was 13.94%, which was based on the standard deviation of 4,371 psi. The $d_{10}$ of the 30 tested proppants was 26,764 psi. This shows a very good low coefficient of variance, meaning the weakest proppants in the 30 that were tested were relatively close to the average crush strength of the 30 spheres, thus showing a low variance in crush strength for the plurality of proppants. This is different from conventional/commercially-available ceramic proppants, which have a coefficient of variance from the average crush strength of over 25%, such as from 25% to 40%. This is a significantly larger variance in crush strength. Thus, a property of the present invention is that a plurality of proppants (such as 30 spheres or 50 spheres or 100 spheres, or 1 kilogram of proppants) have an average crush strength in psi as determined per single proppant and the coefficient of variance of the proppants for individual crush strength can be 20% or less, such as from 5% to 20%, or from 5% to 15%, or from 5% to 10%, or from 10% to 20%, with regard to the coefficient of variance.

The proppants of the present invention can also have a low coefficient of variance with regard to size and shape for a plurality of proppants. For instance, the proppants of the present invention can have a coefficient of variance for size (size CV) of 10% or less, and the same plurality of proppants can have a coefficient of variance for the shape (shape CV) of 5% or less. The shape CV is typically for a sphere. The coefficient of variance for size is as described earlier. The shape CV is determined in a manner similar to that of the size CV, that is a number of particles, say 100, are measured to determine the sphericity and roundness. Based on these individual measurements a mean and standard deviation value for both the sphericity and roundness can be determined. With these values and a modification of the previous expression for the size CV, two distinct values for the shape CV may be obtained, i.e. the coefficient of variance for roundness ($CV_{Roundness}$) and the coefficient of variance for the sphericity ($CV_{Sphericity}$). The roundness CV can be determined from the following expression;

$$CV_{Roundness} = \frac{\sigma_{Roundness}}{\mu_{Roundness}}$$

$$CV_{Sphericity} = \frac{\sigma_{Sphericity}}{\mu_{Sphericity}}$$

where $\sigma_{Roundness}$ and $\sigma_{Sphericity}$ are the standard deviations for roundness and sphericity respectively, and $\mu_{Roundness}$ and $\mu_{Sphericity}$ are the mean values for the roundness and sphericity respectively. For example, the size CV can be 10% or less, such as from 1% to 10%, 1% to 8%, 1% to 7%, 1% to 6%, 1% to 5%, from about 3% to 10%, or from about 3% to 8%, or from about 3% to 7%, and the like. The shape CV can be 5% or less, such as from 0.5% to 5%, or from 0.5% to 3%, or from 0.5% to 2%, and the like. Previously conventional ceramic proppants did not achieve a size CV and a shape CV as shown herein, thus showing the abilities of the present invention with regard to achieving highly uniform proppants with regard to size and shape or sphericity. With regard to this test, the size CV and shape CV are based on testing at least 100 individual proppants, such as at least 500 individual proppants, or at least 1 kilogram of proppants, or at least 5 kilograms of proppants, or at least 10 kilograms of proppants.

The present invention further relates to obtaining synthetic templates (or cores) which can serve as a template to receive one or more shell layers or can be used by itself. In the present invention, the synthetic templates of the present invention can achieve very low fines when crushed at 20,000 psi. For instance, the 20,000 psi crush fines can average 5.5% (by weight of total templates) or less (e.g., 5% or less, 4% or less, 3% or less, 0.5% to 5.5%, 1% to 5%, and the like). The % can be consider weight % based on the total weight of material subjected to the crush test under API RP-60 or similar test. This 5.5% or less crush fines is especially applicable when the sintered $d_{50}$ size of the synthetic template is 500 microns or less, such as from 500 microns to 100 microns, or 475 microns to 200 microns, or 475 microns to 300 microns. This is also especially applicable when the specific gravity of the sintered synthetic template is 3 sg or lower, such as 2.9 sg to 2 sg, or 2.9 sg to 2.5 sg. The reference to "template" can be considered a "core" here and throughout the present application.

As an option, in the present invention, the present invention achieves a crush resistance #(number) based on the overall crush fine ratio that is determined as follows:

Crush resistance Number $(CR)=\{[D \times Sd_{50}]/[CF \times P]\} \times 10^6$

In the above formula, CF represents the amount (by weight % in fraction) of the crushed fines from a 20,000 psi crush test and is an average. This crush test is based on API RP-60. The weight percent is based on the total amount of particles being subjected to the crush test. D is density of the proppant being tested and is in $$\frac{g}{cm3}.$$

$Sd_{50}$ represents the sintered $d_{50}$ size of the particles being tested in microns (μm) and P is crush fine measurement pressure in $g/cm^2$ (with psi=70.3 $g/cm^2$), which is 20,000 psi for this test.

In the present invention, an excellent balance with regard to specific gravity, size, and the low crush fines can be achieved, and, in the above formula, this is represented by a crush resistance number of from about 0.5 to about 3, or from 0.5 to 3, from 0.75 to 2.75, from 1 to 2.5, from 1 to 2, from 0.7 to 1.9, and the like. Some specific examples from proppants of the present invention is set forth below. Each of these proppants had a core/shell design and where made in a similar matter to Example 1 in the Examples section. Though not part of the actual CR number, testing at a 25,000 psi crush strength is also provided.

| Sample | | $Sd_{50}$, | Crush fines, % | | Crush Resistance | |
|---|---|---|---|---|---|---|
| No. | D, g/cm³ | μm | 20 ksi | 25 ksi | 20 ksi | 25 ksi |
| 1 | 2.80 | 325 ± 23 | 4.31 | 7.37 | 1.50 | 0.70 |
| 2 | 2.89 | 321 ± 24 | 3.54 | 6.26 | 1.86 | 0.84 |
| 3 | 2.89 | 320 ± 28 | 4.35 | 7.78 | 1.51 | 0.68 |
| 4 | 2.84 | 475 ± 28 | 5.63 | 8.22 | 1.70 | 0.93 |
| 5 | 2.97 | 482 ± 30 | 5.43 | 9.39 | 1.87 | 0.87 |
| 6 | 2.95 | 475 ± 35 | 5.82 | 10.13 | 1.71 | 0.79 |

Further, as an option, the present invention can achieve, with regard to the synthetic template (or core) (such as a ceramic core or template) or the overall proppant, an excellent strength to porosity ratio which can be determined by measuring the crush strength of the proppant or template and dividing by the amount of porosity (including any central void) that is present in the proppant. For instance, in the present invention, the proppant or template of the present invention can achieve a strength (psi)/porosity (percent volume based on total volume of measured particle) of from $5 \times 10^4$ to $150 \times 10^4$, such as from $5 \times 10^4$ to $40 \times 10^4$, or $10 \times 10^4$ to $30 \times 10^4$, or $15 \times 10^4$ to $30 \times 10^4$, or $5 \times 10^4$ to $10 \times 10^4$.

The proppants of the present invention can be made as follows. A slurry containing green particles (e.g., milled particles) can be prepared, which ultimately is fed into a spray dryer. The materials that form the green body can be considered the green body material that is a mixture and is formed into a slurry of green body material. The spray dryer, based on the nozzle design, creates green bodies having desired shapes. For instance, the green bodies can have a highly spherical shape and roundness. The diameter of the green bodies can typically be from about 10 microns to about 1,000 microns, such as from about 20 microns to about 250 microns. In making the slurry containing the green particles, the particles are generally a mixture of two or more ceramic and/or ceramic precursor materials. The green particles that are in the slurry can have a particle size of from about 0.3 micron to about 50 microns, such as from about 0.5 micron to about microns. The green particles that are present in the slurry that ultimately form the green body can be initially prepared by taking the raw materials that form the green body, namely ceramic and/or ceramic precursors, and reducing the size of the material to the desired diameter, such as by attritor milling or other milling techniques.

Figure 5:
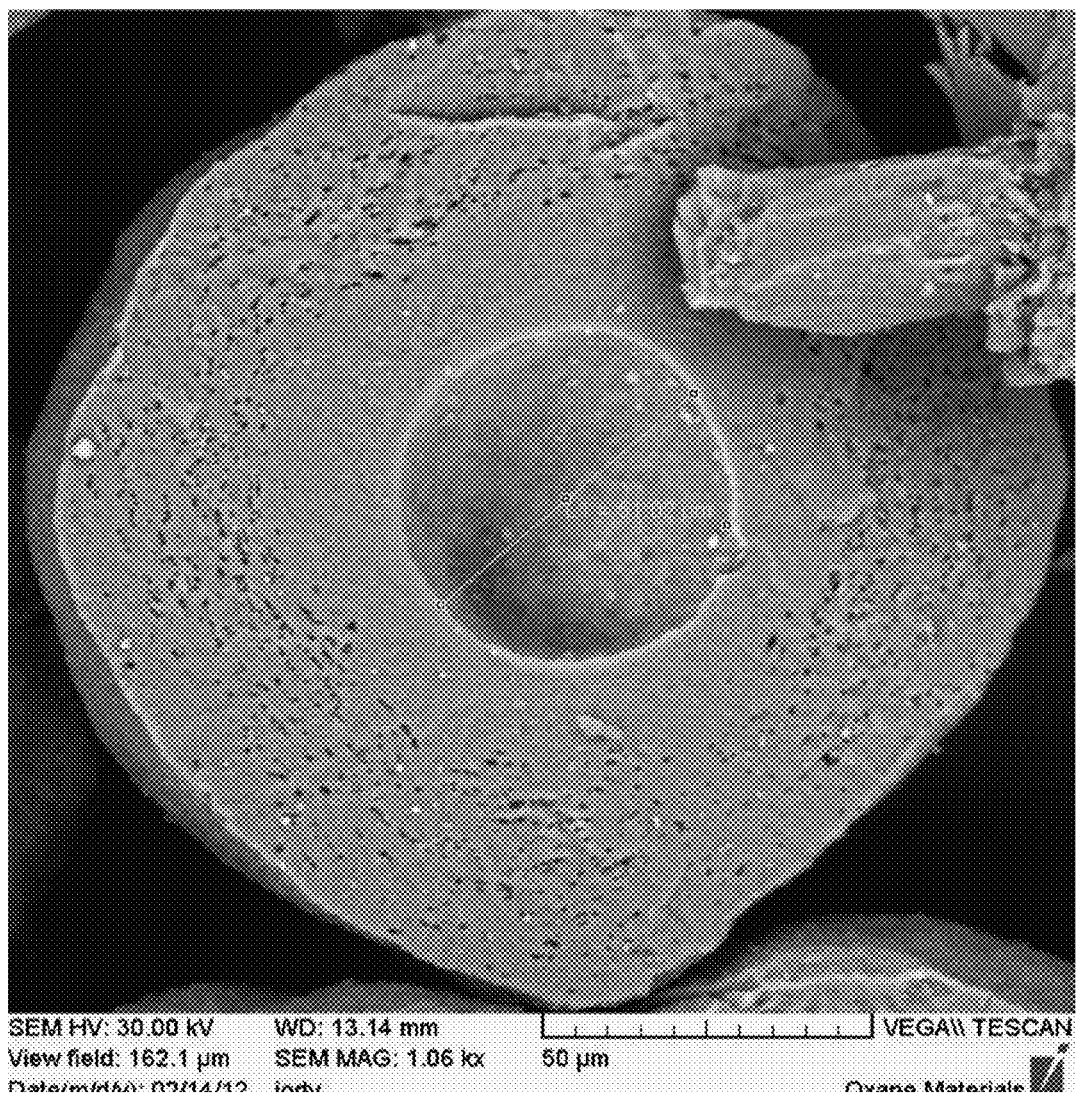
FIG. 5 is a SEM image of a 40/50 proppant of the present invention.
Figure 6:
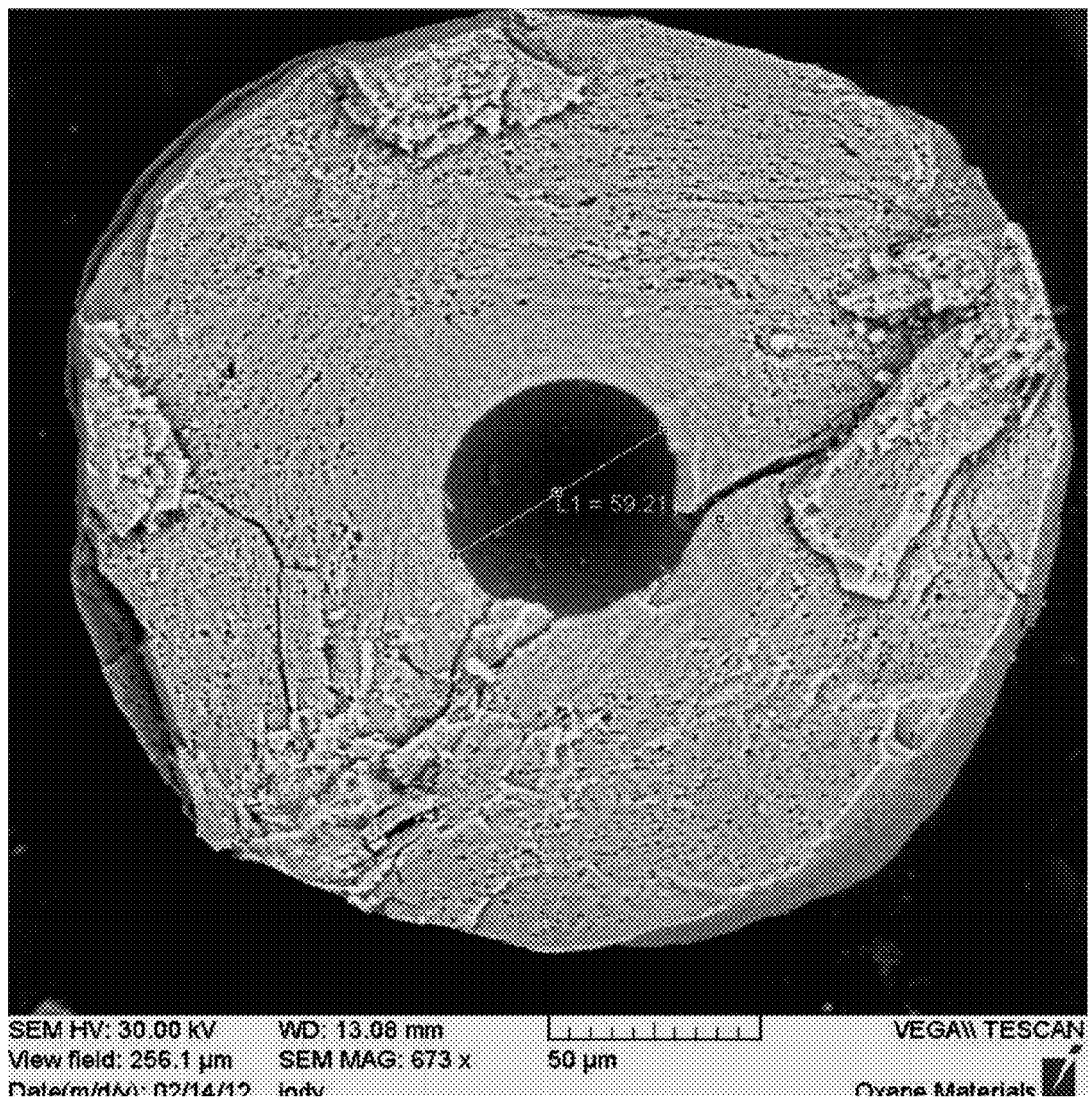
FIG. 6 is a SEM image showing a 30/40 proppant of the present invention.

As an option, in the present invention, the green body, for instance, that can form a template or core, can be solid throughout the green body. In other words, as an option, there is no void, including no center void. Put another way, the green body is not a hollow green body. With the present invention, even though the green body can be a solid throughout the green body, the resulting proppant which is a sintered proppant, can result in having a void in the center of the sintered proppant or can result in two or more hollow regions, or porous regions. In other words, the sintered proppant can be hollow in the center, or can have two or more hollow regions or pores or cells or hollow portions in the center region of the sintered proppant. This can occur when the green body is comprised of a solid core and at least one shell-forming material forms a shell around the core. The green body that comprises the green body core and green body shell can be sintered, and, during sintering, part or all of the core diffuses to or within the shell, such as in a very systematic way or in a random way. This diffusion can be in an outward radial direction from the center of the core to the outer surface of the proppant. This results in forming a hollow portion(s) or void(s) in the proppant generally in the location of the core (e.g., geometrical center of proppant sphere). FIG. 5 and FIG. 6 are SEM figures. FIG. 5 shows a cut-opened 40/50 proppant made from synthetic materials, and FIG. 6 shows a cut-opened 30/40 proppant made from synthetic materials, wherein at the center of each SEM, a hollow void can be seen which was formed during sintering, but did not exist prior to sintering. This hollow void(s) or hollow region(s) or cell(s) generally can be the shape and size of the original green body or a portion thereof that formed the core (e.g., from 0.01% to 100%, 0.1% to 100%, 0.5% to 100%, 1% to 90%, 2% to 90%, 5% to 90%, 7% to 80%, or 10% to 100% by volume of the green core, or 20% to 80%, or 30% to 70%, or 40% to 60% by volume of the green core). From 0.01% to 100%, 0.1% to 100%, 0.5% to 100%, 1% to 90%, 2% to 90%, 5% to 90%, 7% to 80%, or 10% to 100% by weight of the green core, or 20% to 80%, or 30% to 70%, or 40% to 60% by weight of the green core can diffuse from the core to the shell, to form one or more hollow regions or areas in the core. As stated, at least some of the material that formed the core of the green body diffused into the shell which surrounds this hollow space. This diffusion provides a mechanism for strengthening the shell, as well as the overall proppant. With the present invention, any amount (by weight) or volume of the core can diffuse to the shell. This diffusion can leave hollow pockets or voids or hollow regions or pores. The hollow pockets or voids or hollow regions or pores can be random in location in the core area. The size of each of the hollow pockets or voids or hollow regions or pores can be the same, substantially the same or different from other hollow pockets or voids or hollow regions or pores in the core formed by diffusion. The hollow pockets or voids or hollow regions or pores can be irregularly shaped and/or can be different in shape, and/or size, and/or other parameters from other hollow pockets or voids or hollow regions or pores formed in the same core. The hollow pockets or voids or hollow regions or pores can have a size of from 0.5 nm to 100 nm or more, from 1 nm to about 100 nm. The hollow pockets or voids or hollow regions or pores that form can create an appearance of a network of pores or cells (e.g., opened and/or closed cells) within the core. The areas diffused can be considered hollow regions or form a scaffolding appearance. The hollow pockets or voids or hollow regions or pores can be isolated from each other, meaning not interconnected. As an option, some or all of the hollow pockets or voids or hollow regions or pores can be interconnected. Some or all of the hollow pockets or voids or hollow regions or pores can have an appearance of air cells that form in air blown polyurethane. The hollow pockets or voids or hollow regions or pores that form can have any population in the core, such as from 1 to 1,000 or more, such as 2 to 1,000, 10 to 1,000, 50 to 1,000, 100 to 1,000, 200 to 1,000, 300 to 1,000 and the like.

As indicated, the core may partially diffuse into the shell structure thereby leaving a porous or partially hollow core. Any amount of material may diffuse from the core, for example from 1 wt % to 95 wt % or more, based on the weight of the green core. The element or elements or material to diffuse from the core typically have lower melting temperatures than do the surrounding materials. Glassy materials and/or regions can generally diffuse, such as ones with a melting temperature or glass transition temperature lower than the shell or one or more components that form the shell. Generally crystalline materials and/or regions do not diffuse or easily diffuse or are resistant to diffusing. The depth and degree of diffusion can be altered by changing the chemical composition of the green body material that forms the core. Additionally, the viscosity and material properties of the core material may be altered through the addition of select dopants.

Thermally assisted diffusion can be due to chemical gradients within the ceramic body. At high temperatures, select material species may diffuse from areas of high concentration to areas of lower concentration. Capillary forces can also contribute to diffusion, pulling liquid components into the shell matrix. Additionally, an electric or magnetic field may be used to provide assist diffusion through the formation of an electrochemical gradient.

Figure 35:
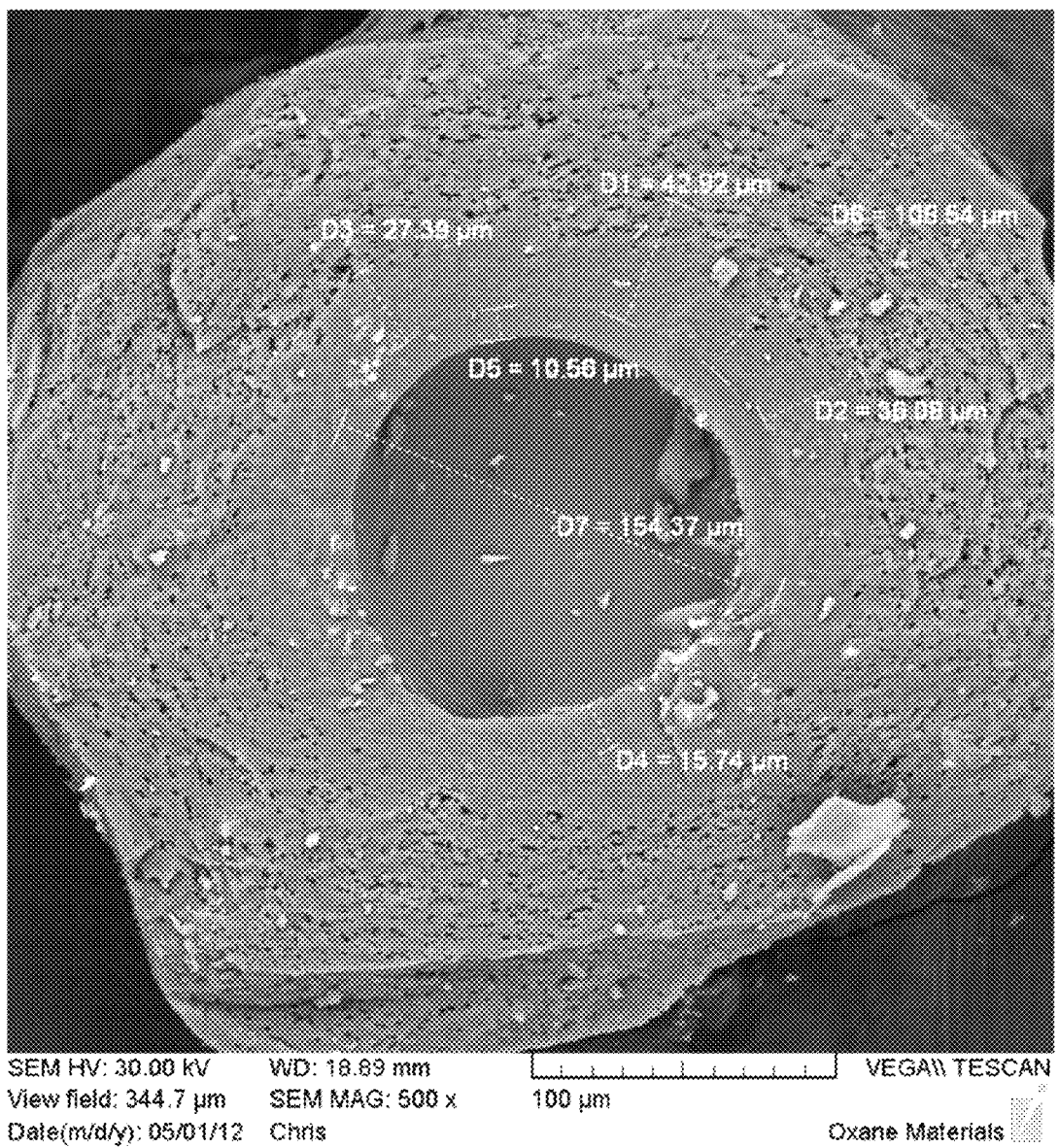
FIG. 35 is a SEM image of the cross-section of an example of a ceramic synthetic proppant of the present invention, showing the fractured surface with a hollow core formed by outward radial diffusion of at least a portion of the core during sintering.
Figure 36:
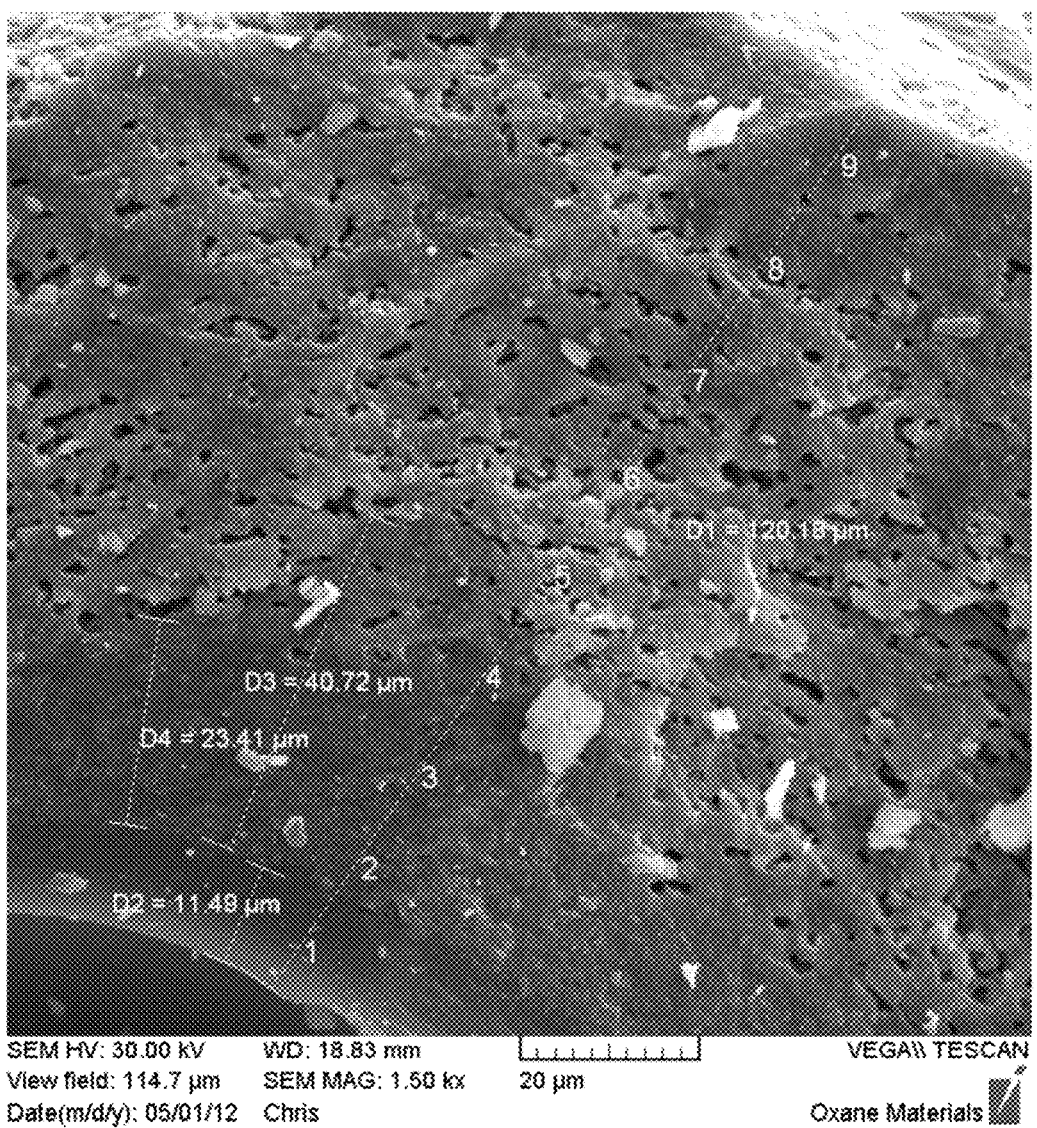
FIG. 36 is a SEM image at a higher magnification of FIG. 35 of the cross-section of the ceramic synthetic proppant of the present invention, showing the fractured surface with a hollow core formed by outward radial diffusion of at least a portion of the core during sintering.

FIG. 35 is an SEM showing the fracture surface of a proppant with a hollow core formed by outward radial diffusion of the melted template during sintering. A dense diffusion region can be seen immediately surrounding the hollow core where the template once existed. This is in direct contrast with the microporous region on the outer edges of the proppant. FIG. 36 shows the same proppant at a higher magnification.

Figure 37:
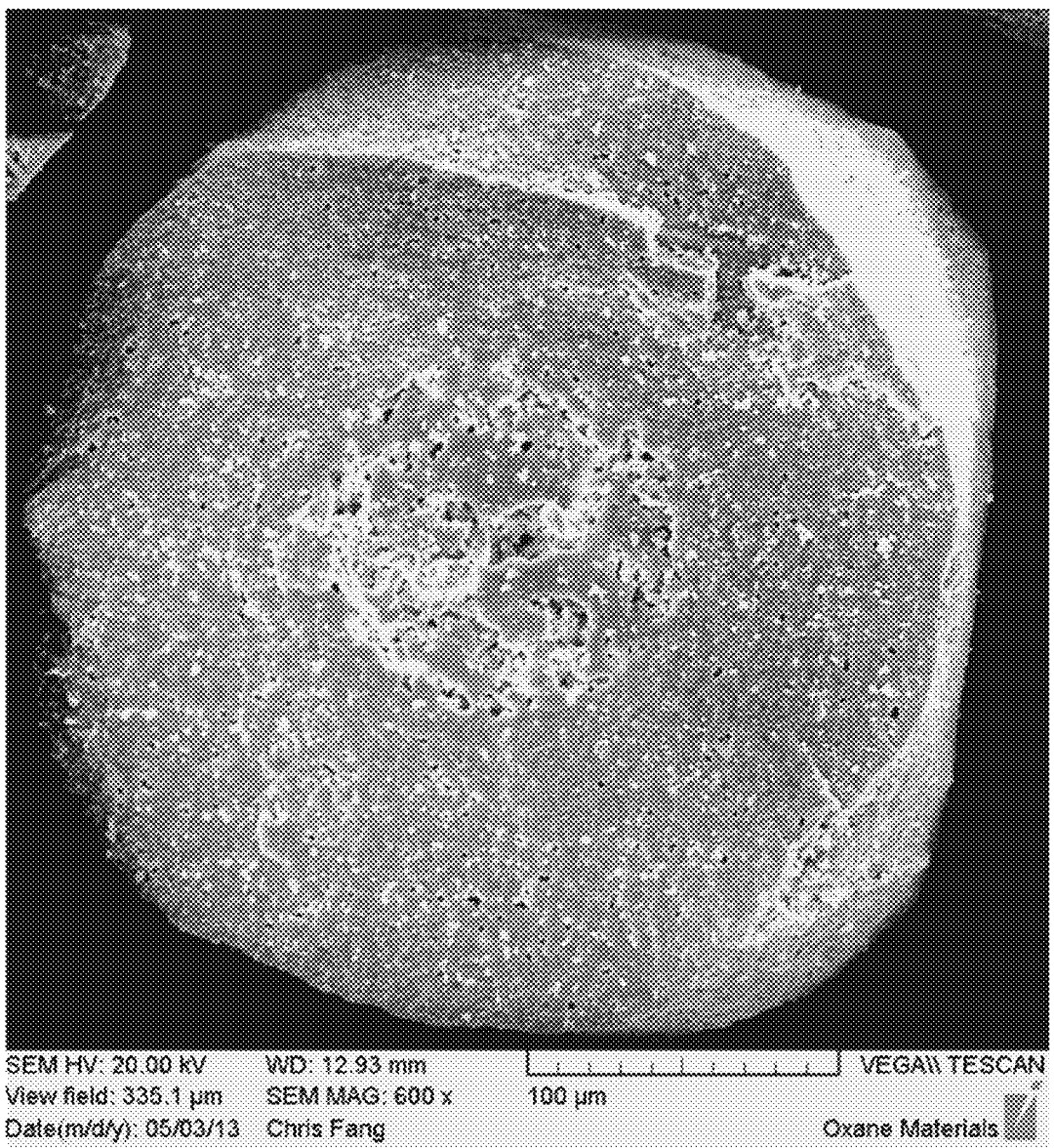
FIG. 37 is a SEM image of the cross-section of an example of a ceramic synthetic proppant of the present invention, showing the fractured surface with a porous core or hollow regions formed by outward radial diffusion of a small portion of the core during sintering. The diffusion here was less than in FIG. 35, thus no hollow core resulted, but instead a plurality of hollow regions or porous areas.
Figure 38:
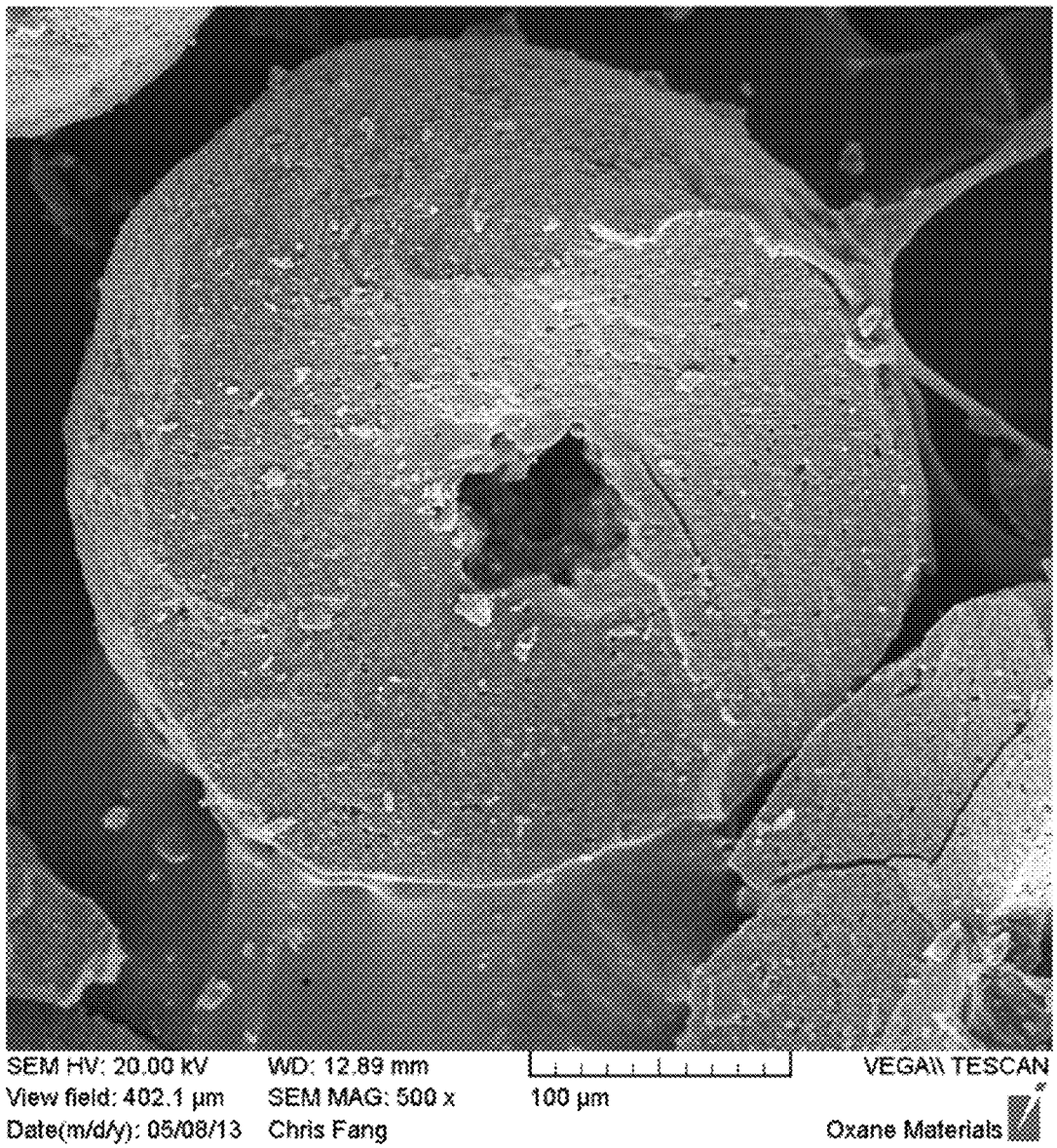
FIG. 38 is a SEM image of the cross-section of an example of a ceramic synthetic proppant of the present invention, showing the fractured surface with a hollow core formed by outward radial diffusion of at least a portion of the core during sintering. In this Figure, the hollow core formation was irregular and less than in FIG. 35.

Alternatively, the template may partially diffuse. An example of partial diffusion is shown in FIG. 37. FIG. 37 is an SEM micrograph of the fracture surface of a proppant fabricated from a synthetic template. In this case, alumina was added to constrain diffusion (silica/alumina wt. ratio=1.27) resulting in the highly porous, but not hollow, region seen at the center of the image. This scattered random porous regions can be considered hollow regions or cells. FIG. 38 is the fracture surface of another proppant formed by synthetic template. In this case, the silica/alumina wt. ratio was altered to 2.27 to lower the melting temperature of the core. As a result, a hollow cavity (irregularly shaped) was formed in the center of the proppant. In this example, while a hollow cavity was formed, the diffusion was partial and thus the cavity formed was irregularly shaped.

In addition to dopant selection and concentration, the degree of diffusion can be controlled by the firing temperature. As one example, Table A lists the diffusion depth for proppant of the same formulation, but fired at different temperatures. By altering the firing temperature, varied microstructures can be formed from the same template and shell formulation.

TABLE A

Radial diffusion depth of synthetic template in the shell at different temperatures

| Sample No. | Temperature, ° C. | Diffusion depth, um |
| --- | --- | --- |
| 1. | 1000 | ~0 |
| 2. | 1100 | 15 |
| 3. | 1200 | 24 |
| 4. | 1250 | 30 |

Test methods for determining the magnitude of residual strain within the matrix. The residual strain due to thermal mismatch caused by the diffusion of the template material into the shell matrix can be determined by collecting the electron diffraction pattern of a specific crystalline phase present in the matrix during transmission electron microscopy (TEM) analysis. The presence of strain within the crystalline phase, and consequently the matrix will manifest itself as a deviation in the electron diffraction pattern shape and spot positions from the unstrained condition. The magnitude of the deviation from the unstrained case would allow calculation of the magnitude of the residual strain responsible for such shifts in the electron diffraction pattern.

Another method to determine the presence of residual strain is through the use of nano-indentation. In the case of an unstrained material, the dimensions of the indentation impression and any radial cracks formed at the verticies of the indentation site are solely dependent upon the material properties. The presence of a residual strain in the matrix would lead to a change in both the indentation impression dimensions and the dimensions of the radial cracks. In the case of the residual strain component being compressive, the indentation impression dimensions would be smaller than the unstrained case and the resulting radial cracks (if any) would be much shorter than the unstrained case. In the case of a tensile residual strain being present, the indentation impression dimensions would be larger and the radial cracks would be longer than the unstrained case.

Figure 8:
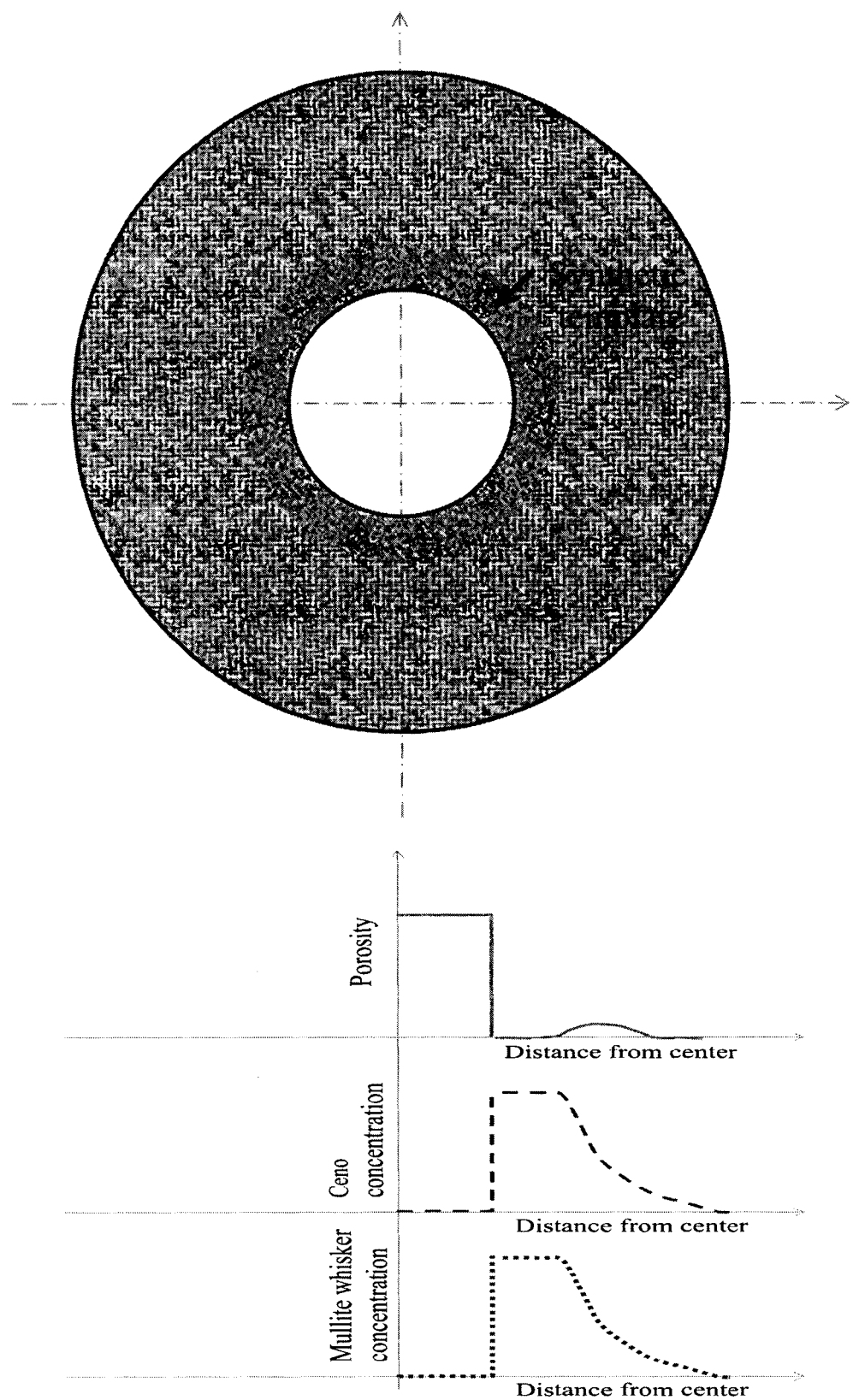
FIG. 8 is a diagram of a proppant (enlarged) that shows the schematics of void formation in the center of the proppant in the core region due to the partial or complete diffusion of the core material from the green body and further shows the diffusion or migration of the core material into the shell regions.
Figure 9:
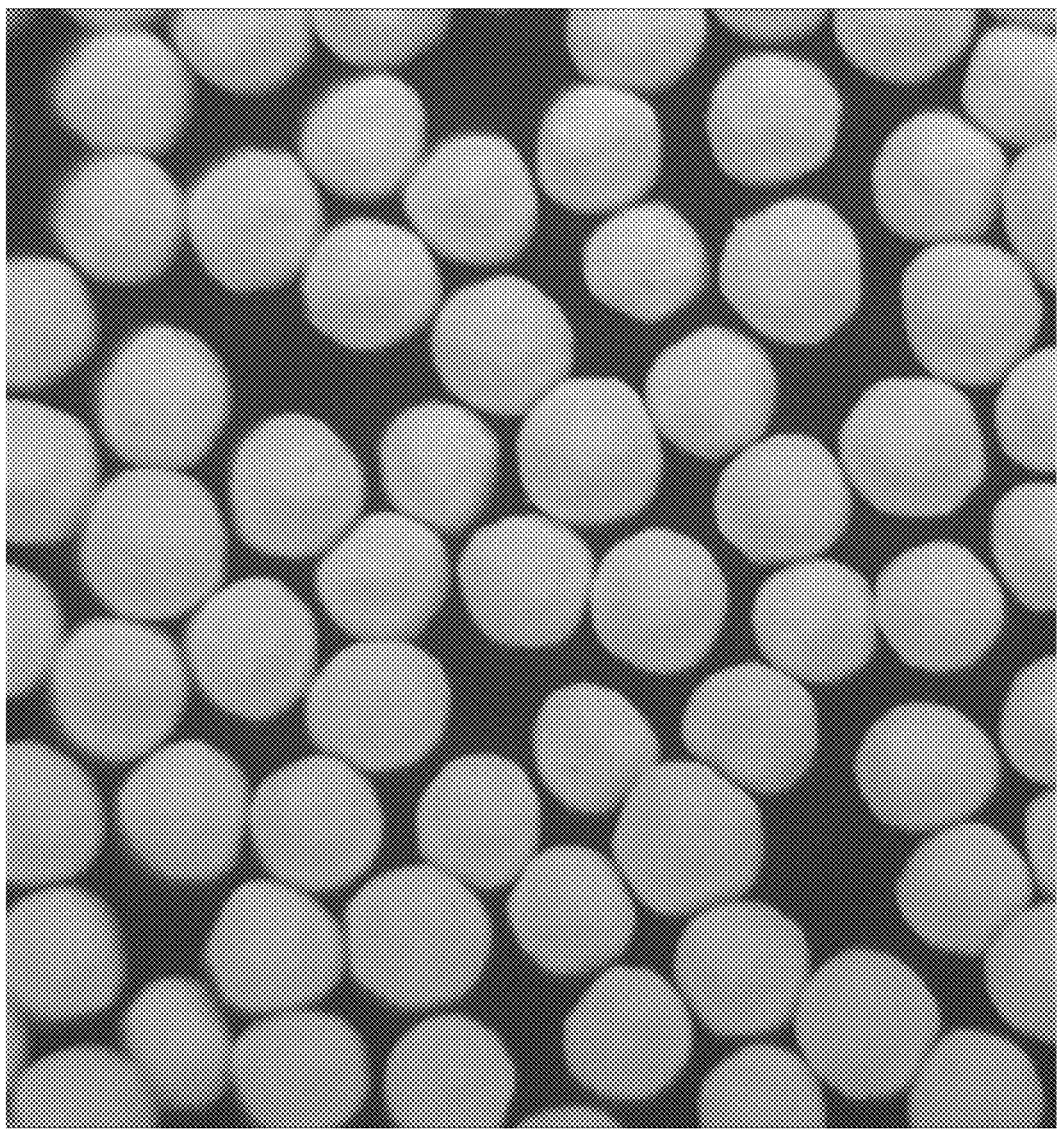
FIG. 9 is a SEM image showing 40/50 mesh green proppant fabricated from synthetic templates of the present invention.
Figure 10:
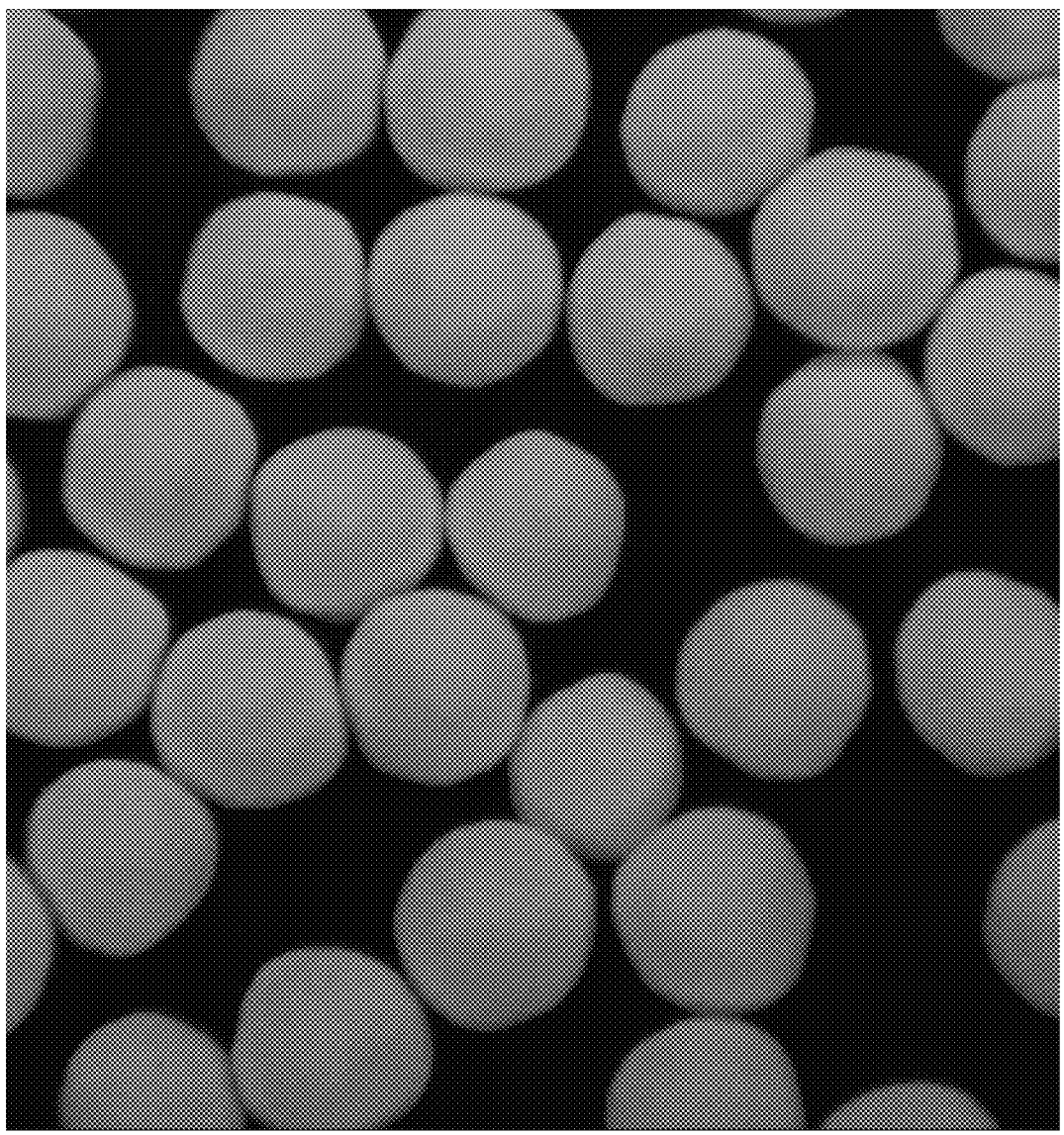
FIG. 10 is a SEM image showing 30/40 mesh green proppant fabricated from synthetic templates of the present invention.
Figure 11:
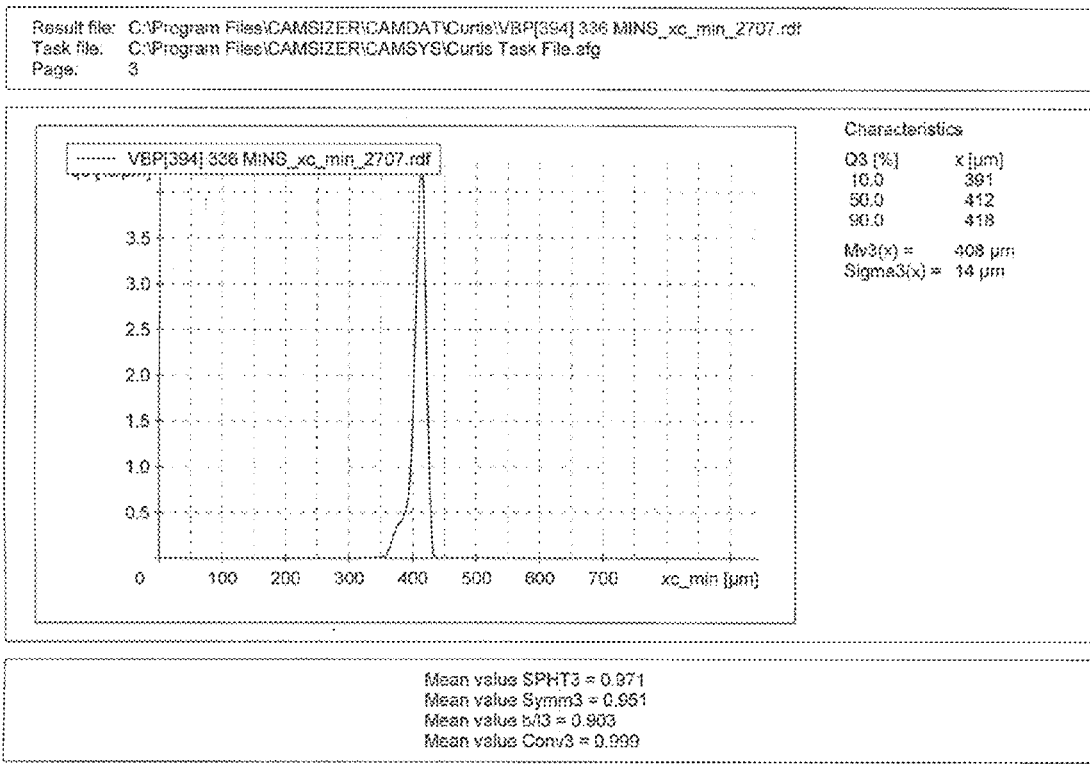
FIGS. 11 and 12 are graphs showing particle size distribution of either a 40/50 green body proppant or a 30/40 green body proppant and the tight particle size distributions achievable, including a small Sigma 3 value.
Figure 12:
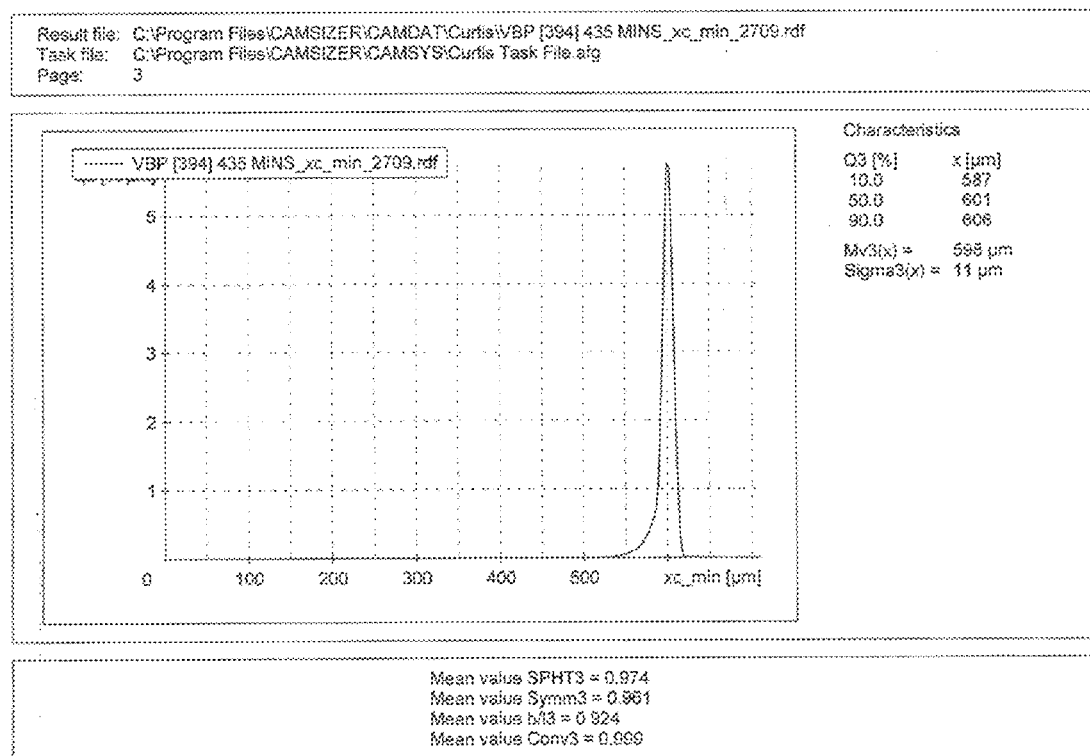

As shown in FIG. 8, based on the schematic or diagram shown, a sintered proppant with a central void (90) is shown.

The sintered proppant has a geometrical center within the sphere (110), and the central void (108) can be located in the center part of the sphere which is where part or all of the green core was located prior to diffusing into the shell (95). As indicated, and as shown in other Figures, multiple hollow pockets or regions or cell can instead be formed by diffusion. More specifically, the interface between the hollow void formed in the shell interface is shown as (106). The region from the area starting at about 104 to the interface 106 can be representative of where a majority (by weight) of the green core diffuses (over 50 wt % of the diffused material) into the shell area. Area 102 in FIG. 8 is representative of where very little or no core material diffuses (e.g., less than 25 wt % (or less than 20 wt %, or less than 15 wt %, or less than 10 wt %, or less than 5 wt % of the diffused material) into the shell and can consist of the shell material only in a sintered state. 100 is the surface of the proppant. As shown in the three graphs that are part of FIG. 8, which are in alignment with the proppant diagram, one can see that the porosity, of course, is highest in the central void area and that is due to the diffusion of part or all of the green core into the shell regions. Initially, the porosity from the void-solid interface (106) to area 104 (the circumference of 104), the porosity is low because the diffusion of the core material fills the pores (if any) in the circumferential region between 106 and 104. Then, in the circumferential area from 104 to 102, the porosity is higher (approximately 1% to 20% higher by volume) than region 104 to 106 because the porosity in this area has not been filled or not substantially filled with any diffused core material. Then, the circumferential area from 102 to 100 (the surface of the proppant) has very little or no porosity (e.g., from 0% to 5% by volume in this area) because a higher temperature is typically reached in this area during sintering and this removes or closes all or most of the pores at this near surface region. Thus, as an example, the proppant of the present invention can have a central void with porosity that is highest in the central location of the shell with regard to radius of the sphere. More specifically, the region from A to B shown in FIG. 8 has from 0% to 5% (by volume) of porosity, such as from 0% to 1% by volume porosity. The region from B to C has porosity on the order of from 5% to 30% by volume of that region, more specifically from 10% to 20% by volume in that region, and the region from C to D has porosity that is the same or about the same as the porosity from region A to B (±10%). The region from A to B can be considered the first region; the region from B to C can be considered the second region or middle region of the shell; and the region from C to D can be considered the third region or outer region of the shell. The second region has more porosity by volume than the first region and/or the third region. The second region can have porosity that is from 10% to over 100% more compared to region 1 or region 3. The first region can comprise from 10% to 40% by volume of the overall non-void region of the proppant, such as from 10% to 30% by volume. Region 2 can comprise from 20% to 50% by volume of the overall non-void regions of the proppant and region 3 can comprise from 10% to 40% by volume of the overall non-void regions of the proppant.

The second graph shown in FIG. 8 provides a showing of the diffusion of the core concentration which can be, for instance, crushed and/or milled cenospheres. As can be seen in the graph, the void would represent an area where no core concentration remains since it diffused into the shell. The diffusion of the core material is represented by plotting the concentration (as measured by energy dispersive spectroscopy) of one of the elements contained in the core material (for example, iron, if present). The concentration profile is not linear but rather follows a power law which decreases from the interior regions to the exterior regions of the proppant. The highest remnants or migration of the core is where core diffusion occurred at circumferential region A to B. From circumferential regions B to C and C to D, the amount of core diffusion can gradually decrease in a linear or somewhat linear manner. The core concentration in the first region can be the highest (by weight), wherein the third region (C to D) can be the lowest with regard to diffusion amount of the core material. In comparing the first region with the second region and the third region, with regard to the amount of core which is diffused in these three regions, the first region can have 3× to 5× (by weight) more diffused core material than the second region and 10× to 20× (by weight) more than the third region. The third graph shown in FIG. 8 shows the formation of whiskers in situ. The whisker concentration can mimic the core diffusion concentration in the first region, second region, and third region. Therefore, for purposes of the present invention, the concentration levels of the whiskers can be identical or nearly identical (±10%) to the core concentrations described above and apply equally to this description of whisker concentrations.

For purposes of the present invention, with regard to the green body core, from about 1% to about 70% by weight (or more) of the overall green body core can diffuse into the shell, such as from 20% to 90%, 30% to 90%, 80% to 90%, all based on the weight of the green body core.

As a more specific example, the green body core can comprise or be milled cenospheres and/or fly ash, which can optionally contain binder to form the green body. The green body shell material can comprise alumina, optionally with other ceramic materials or oxides. The diffusion of the core into the shell (at least partially) is or can be due to the glassy ingredients or nature of the green body core, especially when the core is or contains a cenosphere or fly ash or both or at least comprises ground cenospheres and/or fly ash. This migration or diffusion of the green body core into the shell can occur via liquid phase infiltration of the ceramic shell matrix by the molten core material at or near the sintering temperature of the ceramic shell, thus leading to densification of the ceramic shell by viscous or liquid phase sintering processes. The shell, during sintering, can be an example of solid state sintering, which ultimately forms a solidified shell.

Generally, the sintering used to achieve this viscous sintering of the core and the solid state sintering of the shell can be from about 1,000° C. to about 1,600° C. for 10 minutes to 2 hours or more, such as from about 1,200° C. to 1,300° C. for 1 to 2 hours, though other times and temperatures can be used to achieve these effects.

Figure 13:
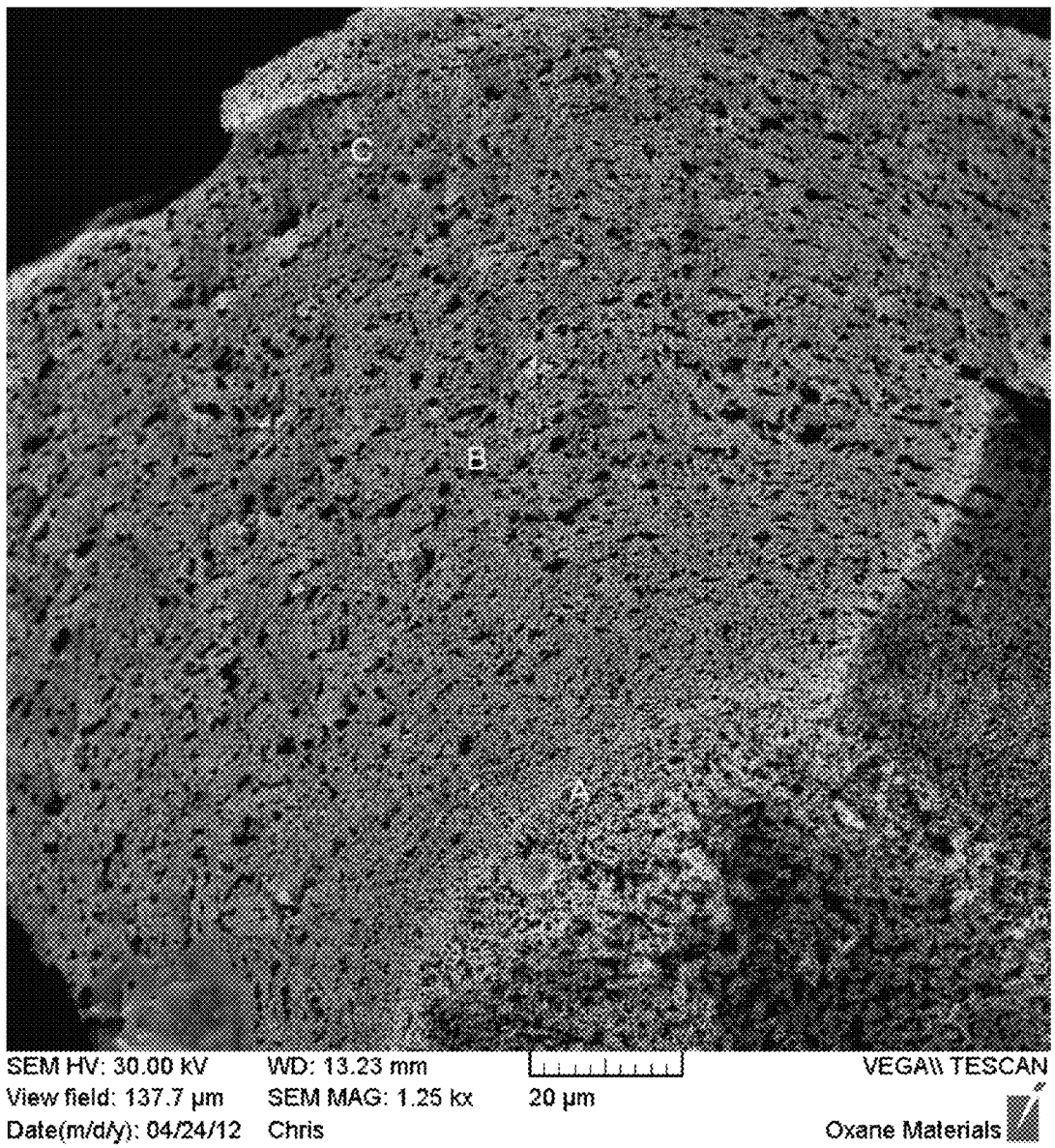
FIG. 13 is a SEM image showing a proppant of the present invention, wherein Region A is the interface between the core and shell, Region B is the central location of the shell, and Region C is the outer region of the shell near the surface of the overall proppant.
Figure 14:
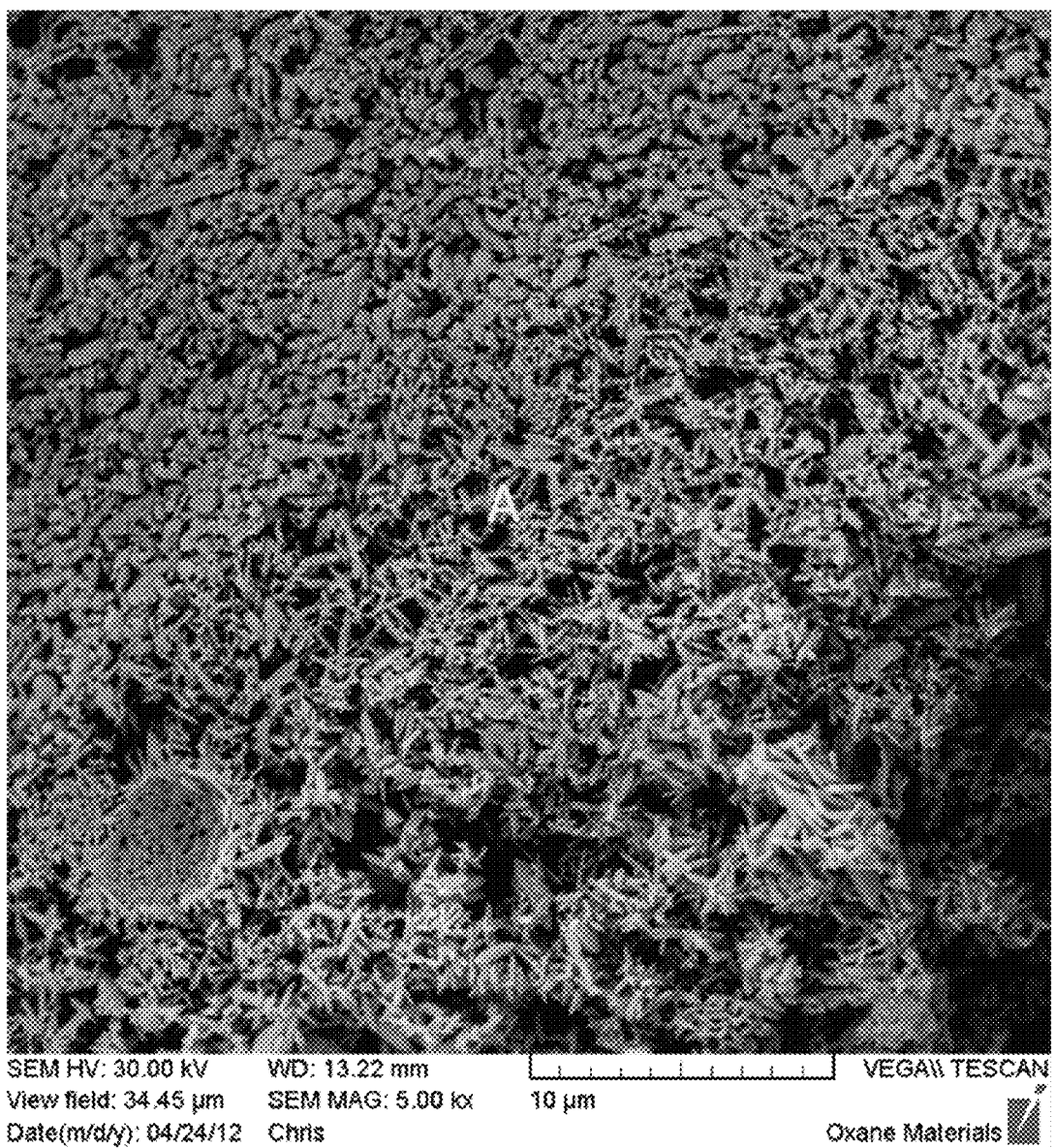
FIGS. 14-16 are magnified images of Regions A, B, and C, respectively.
Figure 15:
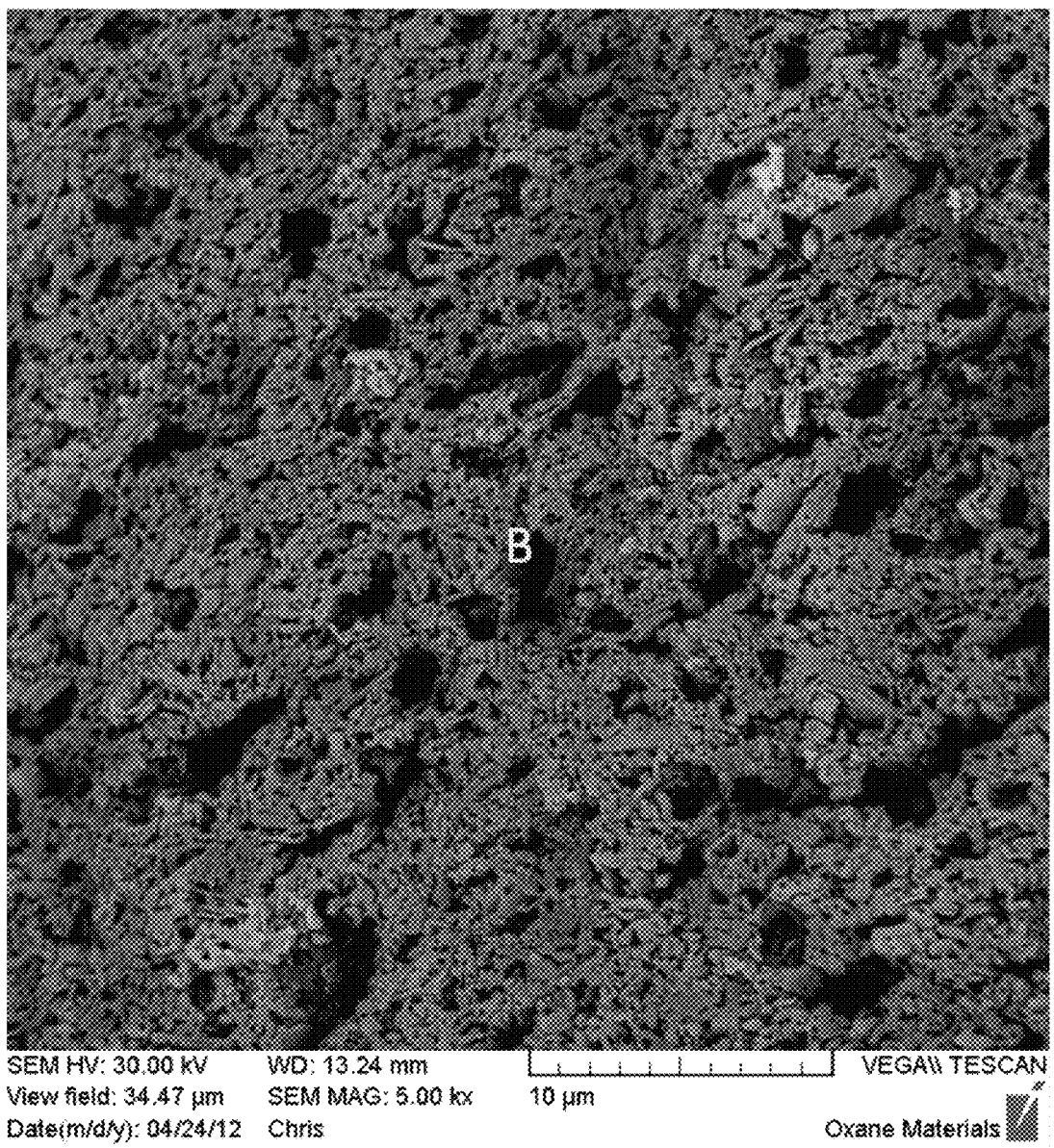
Figure 16:
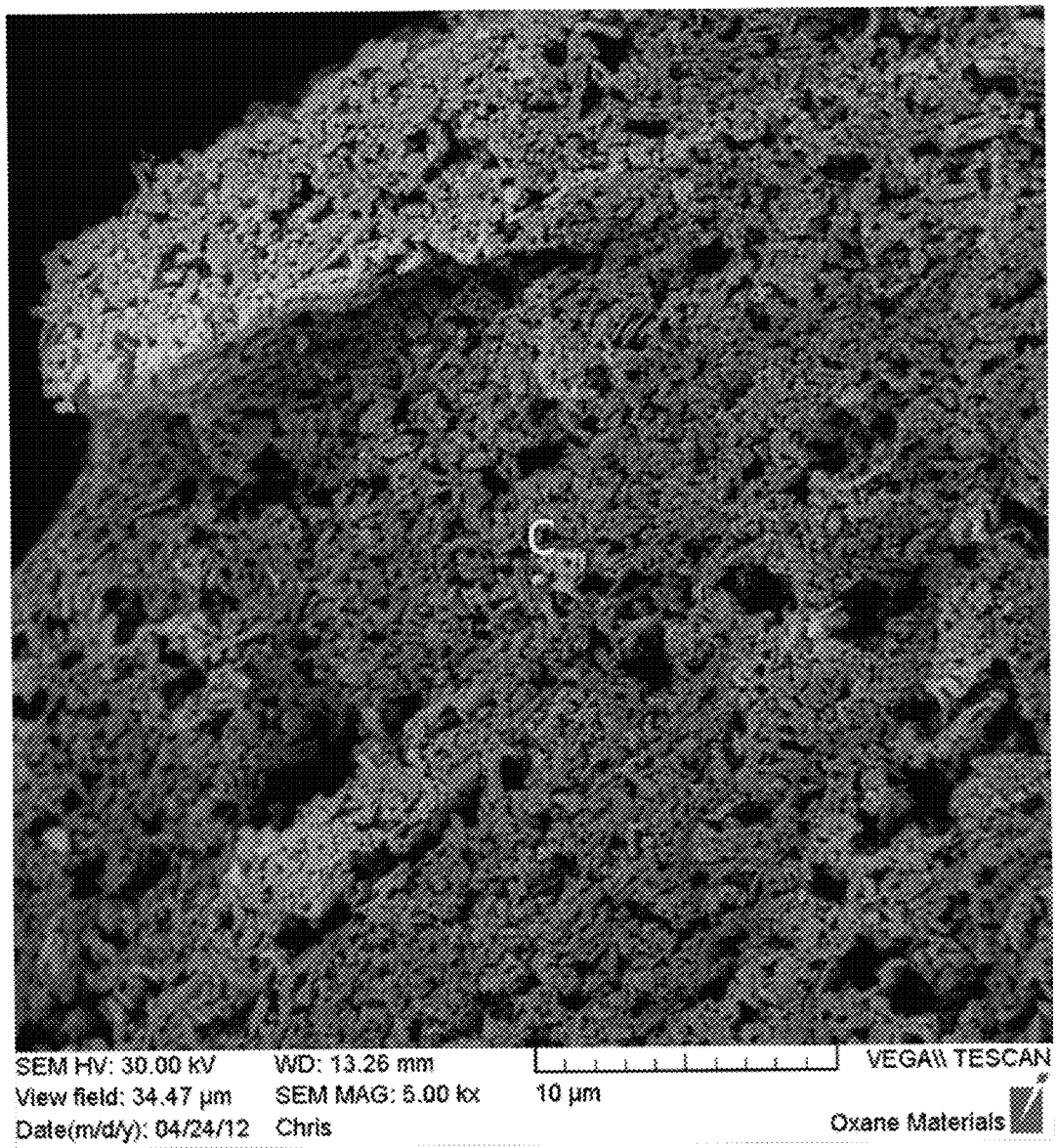

Referring to FIG. 8 and to FIGS. 13-16, FIG. 13 shows a portion of the sintered proppant, wherein the area A signifies the interface area between the void and the non-void area indicated by 106 in FIG. 8. Areas B and C shown in FIG. 13 represent regions B to C and C to D in FIG. 8. FIGS. 14, 15, and 16 are enlarged, more magnified versions of each of these three areas, respectively. As can be seen in FIG. 14, whisker concentration (e.g., mullite whiskers) is shown which, going from the bottom of FIG. 14 to the top of FIG. 14, shows the concentration of whisker formation decreasing which would be representative of the whisker concentration decreasing as shown in the third graph in FIG. 8. In other words, the mullite whisker concentration is decreasing going from region A to C in FIG. 8. Further, FIG. 15, which is an enlarged area of area B as shown in FIG. 13, shows a higher degree of porosity compared to FIG. 16, which is the near outer surface region of the proppant.

Figure 17:
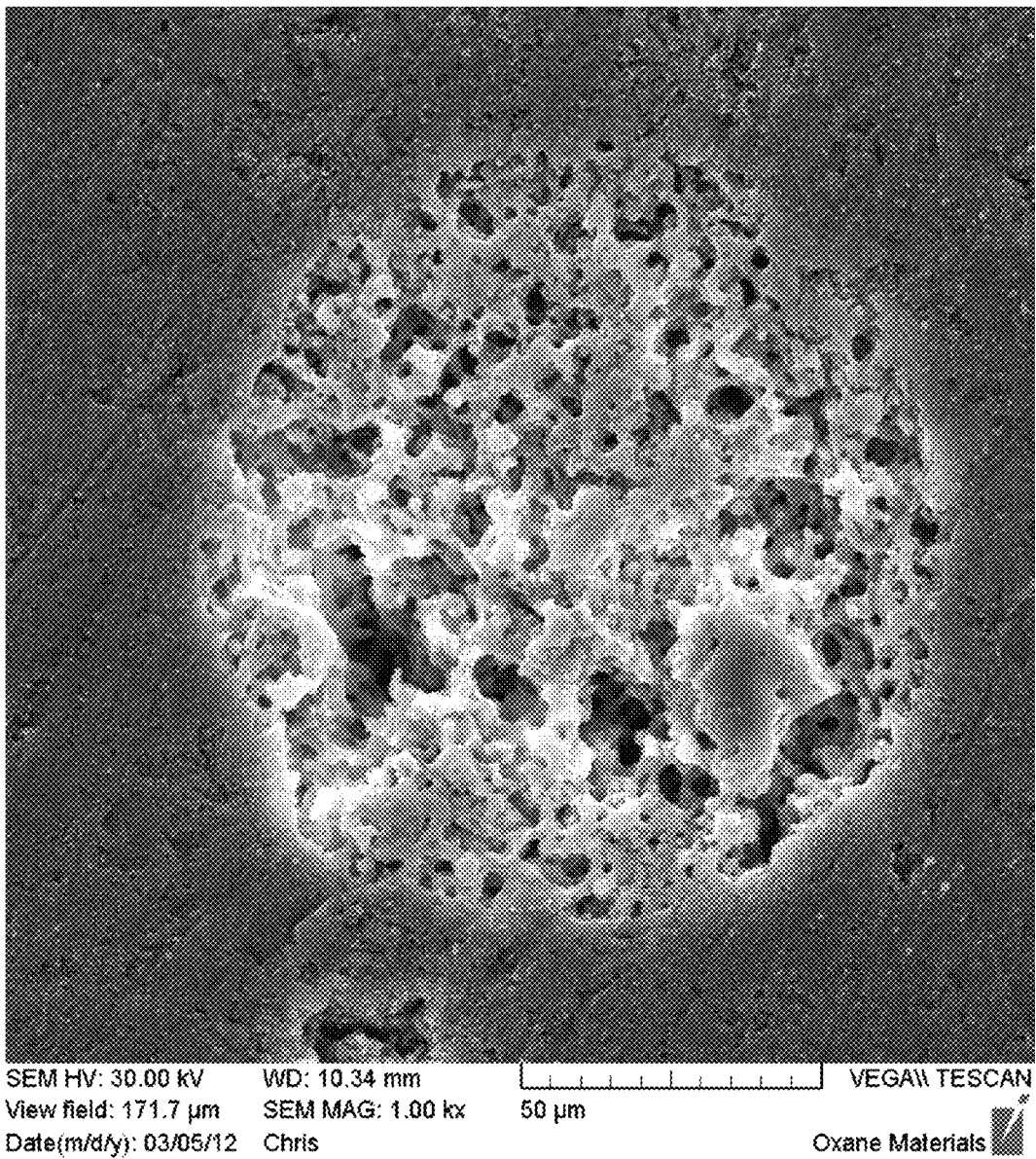
FIGS. 17-20 are SEM images which show the progression of the diffusion of the core (partial or complete) into the shell regions of a proppant through sintering/diffusion kinetics.
Figure 18:
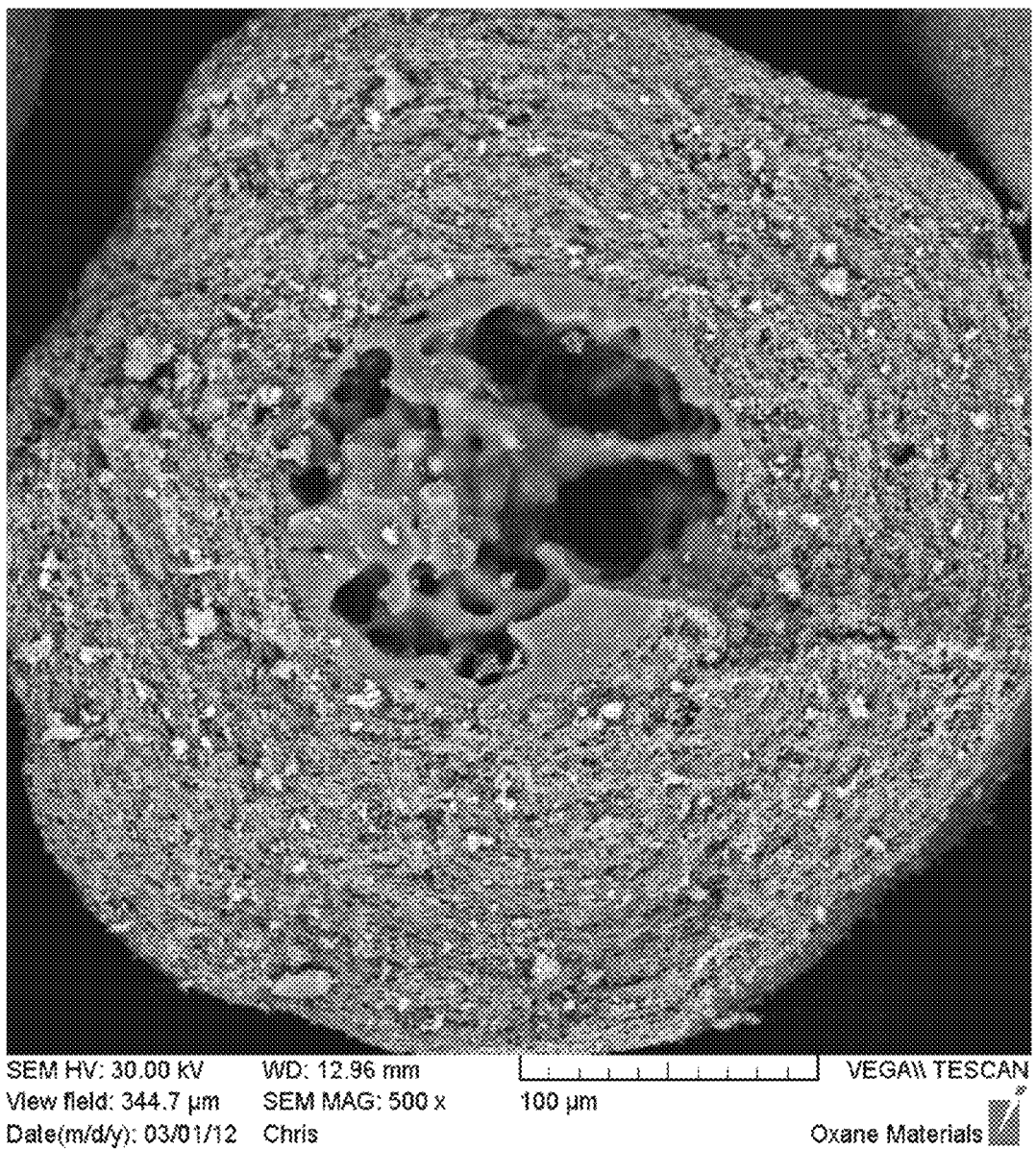
Figure 19:
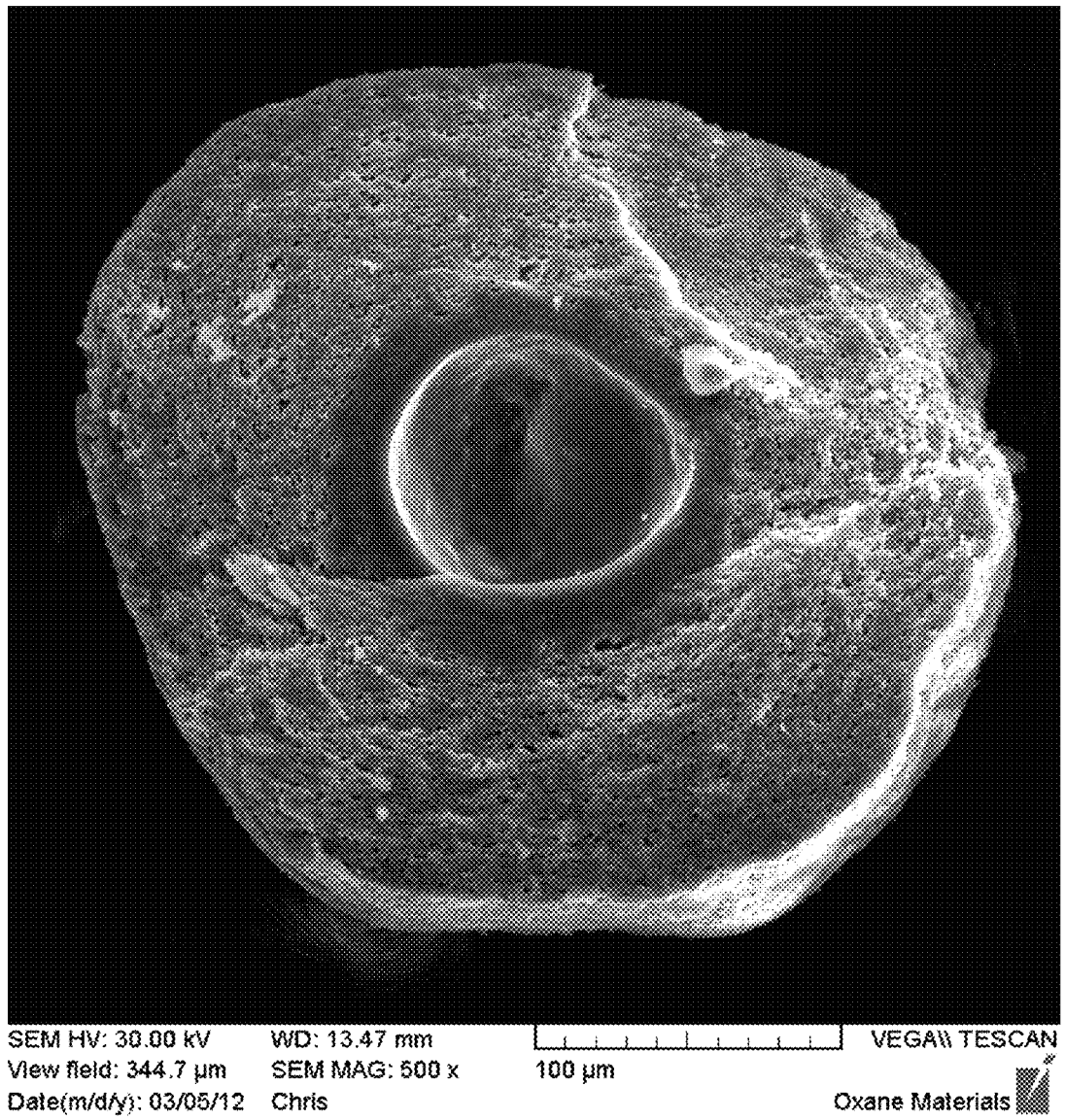
Figure 20:
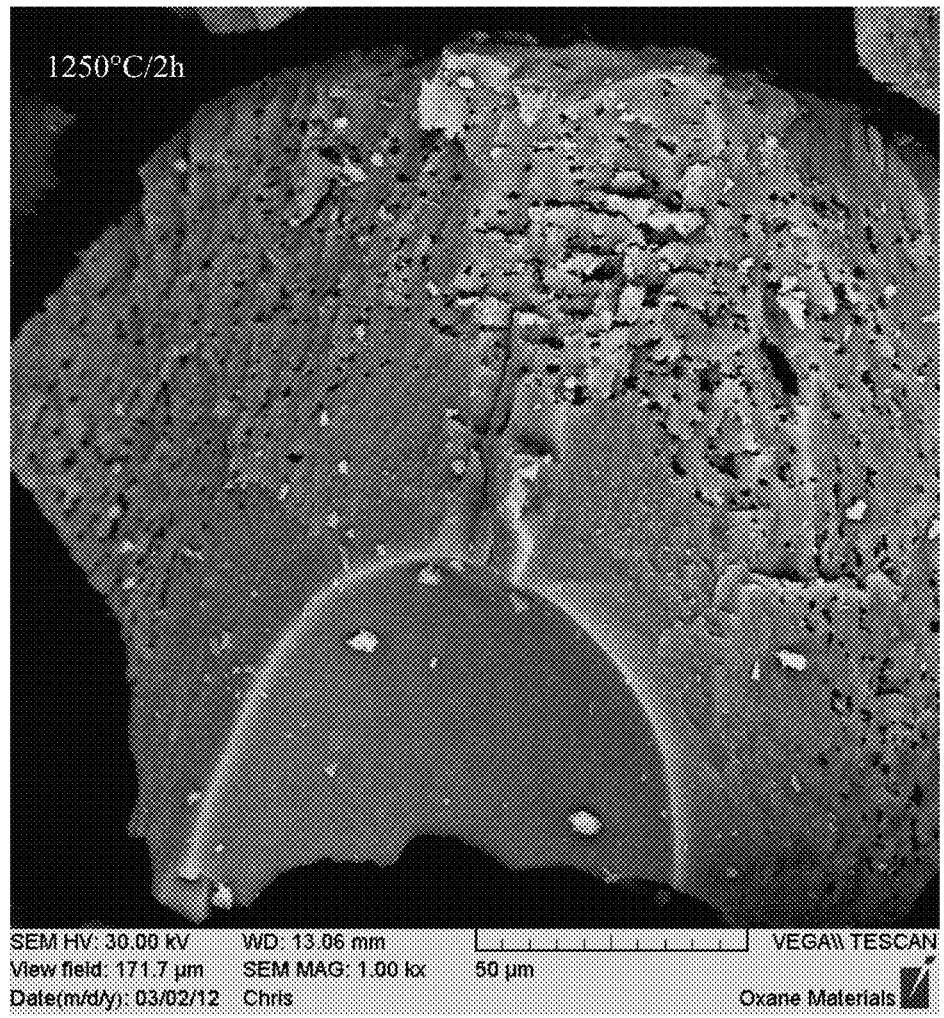

FIGS. 17-20 show the progression of the green body core during sintering, namely, viscous sintering, which leads to the diffusion of at least part of the core into the shell. As shown in FIG. 17, once sintering begins, one can still see the solid core material that forms the core or template of the green body. At this point, the sintering starts and the matrix of the core sinters very slightly and, at this point, there is no radial diffusion of the core material. FIG. 18 shows a subsequent picture where the template or core material has begun to melt and the shell or matrix surrounding the core is sintering slightly, but radial diffusion of the core material or template has not become significant yet. FIG. 19 is a subsequent SEM showing that outward radial diffusion of the core material has begun and that the shell or matrix is sintering further and a hollow core is being formed during to the diffusion of the core or template material into the shell regions. FIG. 20 finally shows further outward radial diffusion of the core material into the shell. FIG. 19 shows a radial diffusion of about 15 microns, where the diffusion depth is now about 25 microns in FIG. 20. Further, as shown in FIG. 20, the formation of a void or hollow core is occurring and the shell or matrix, at this point, is sintering substantially by solid state sintering.

Figure 21:
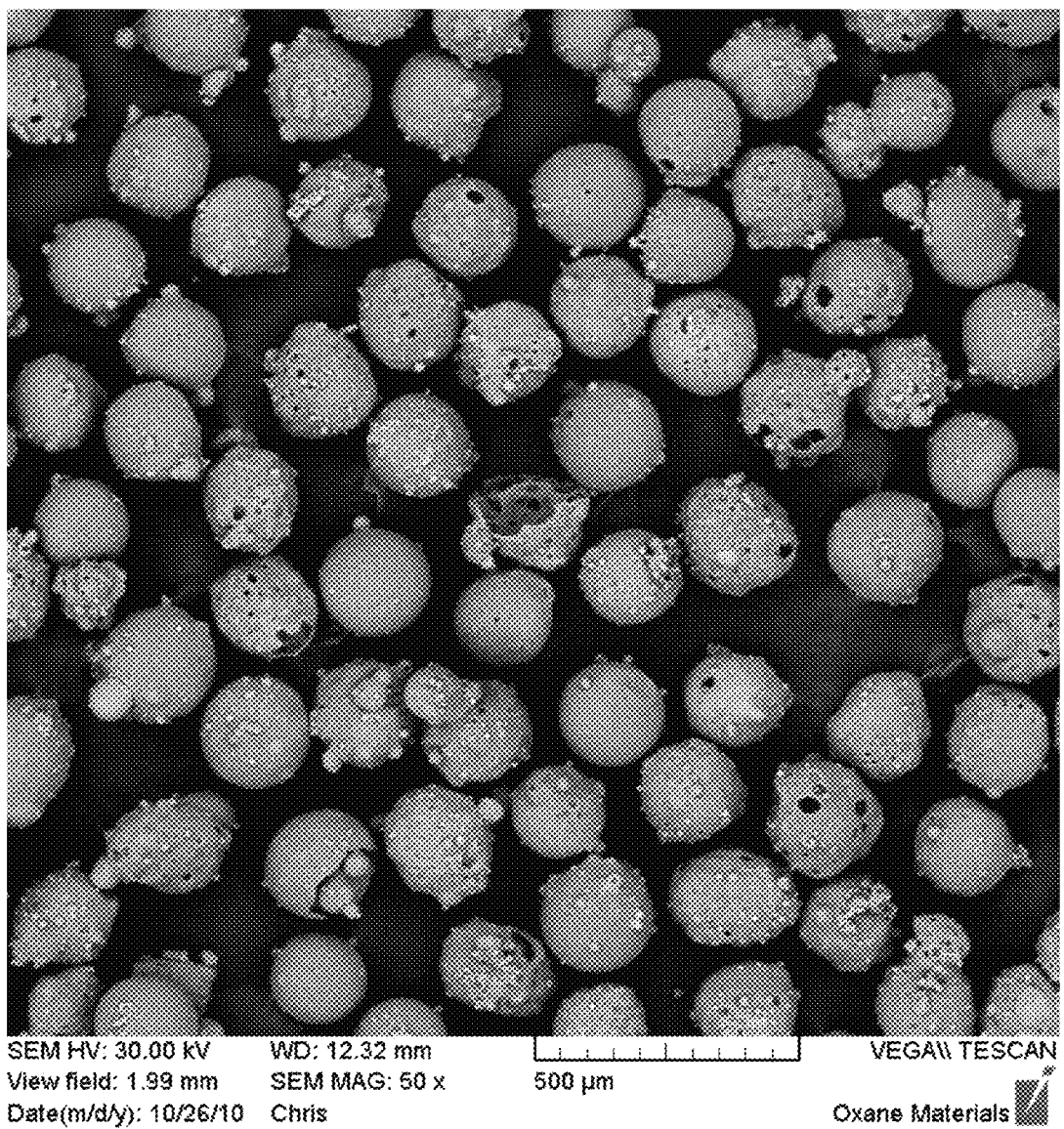
FIG. 21 is a SEM image of a conventional pre-formed cenosphere that has previously been used as a template in proppants.
Figure 22:
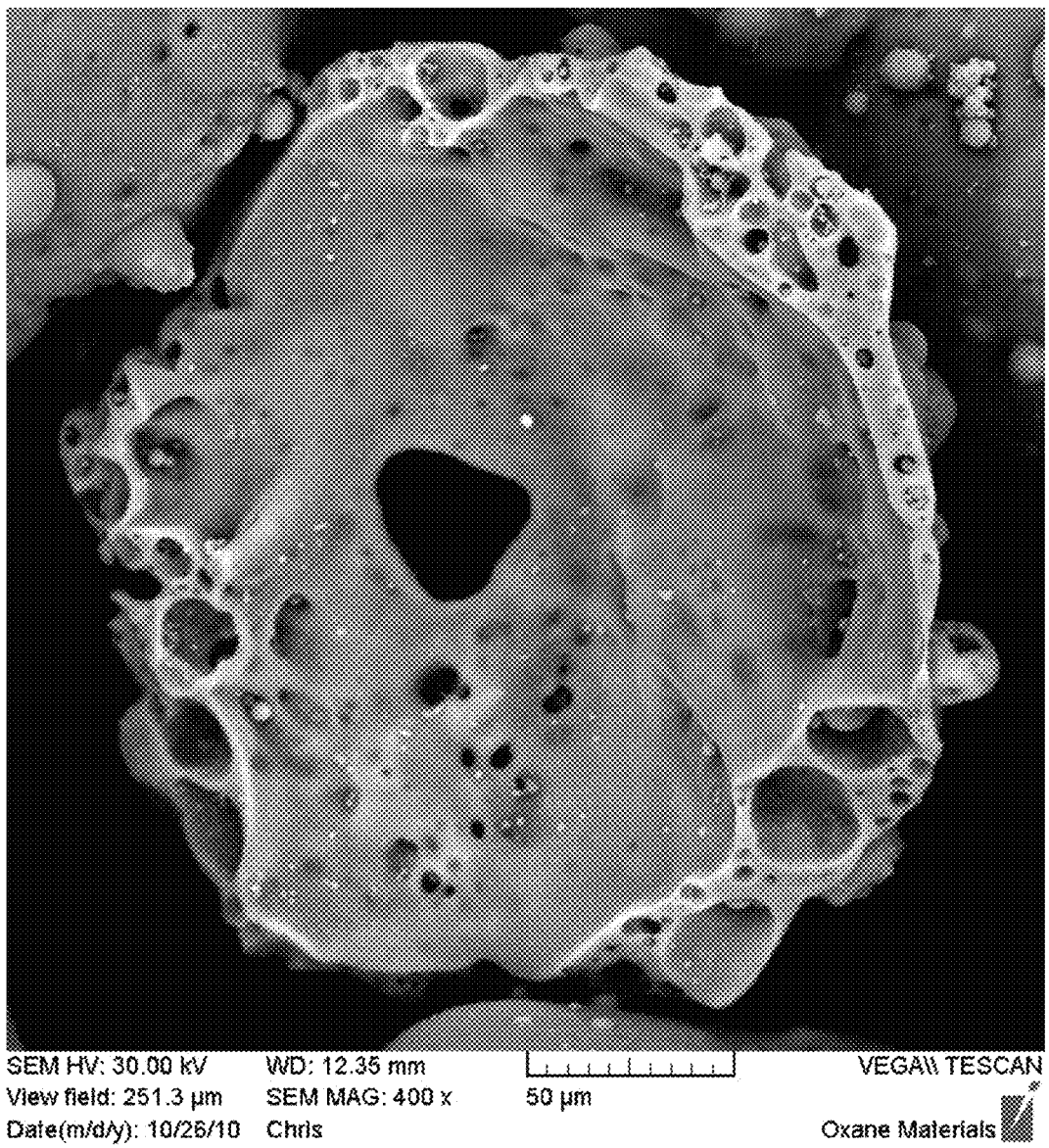
FIG. 22 is a SEM image showing a cross-section of one of the cenospheres from FIG. 21, and showing various structural defects and non-uniformity in shape and size.
Figure 23:
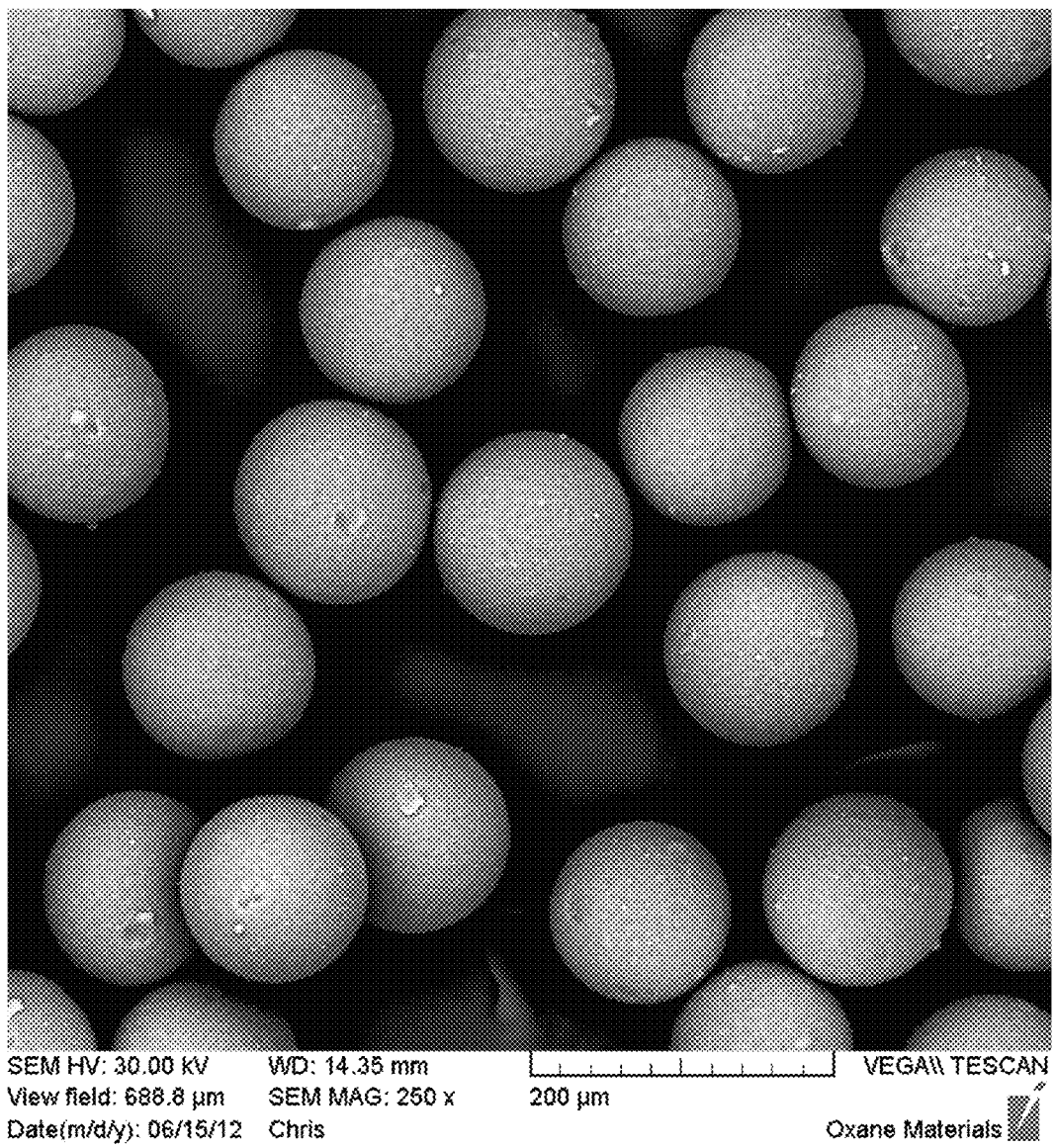
FIG. 23 is a SEM image of synthetic templates of the present invention which, in this example, were formed by spray-drying techniques and sintered at 1025° C.
Figure 24:
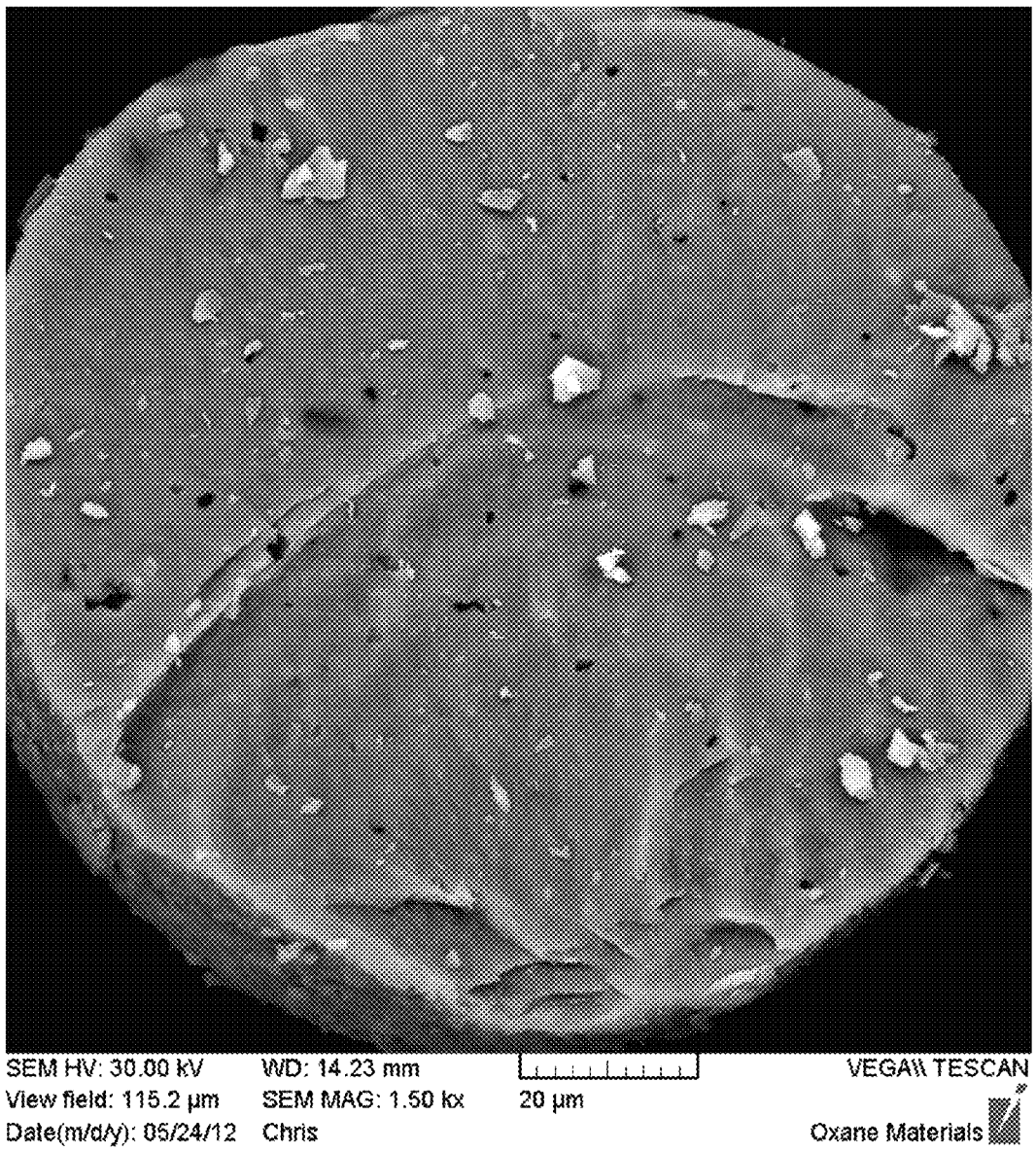
FIG. 24 is a SEM image of one of the synthetic templates from FIG. 23. As can be seen, more uniformity and low defects are shown in this figure, especially compared to FIG. 22. This figure shows a sintered solid synthetic template.
Figure 25:
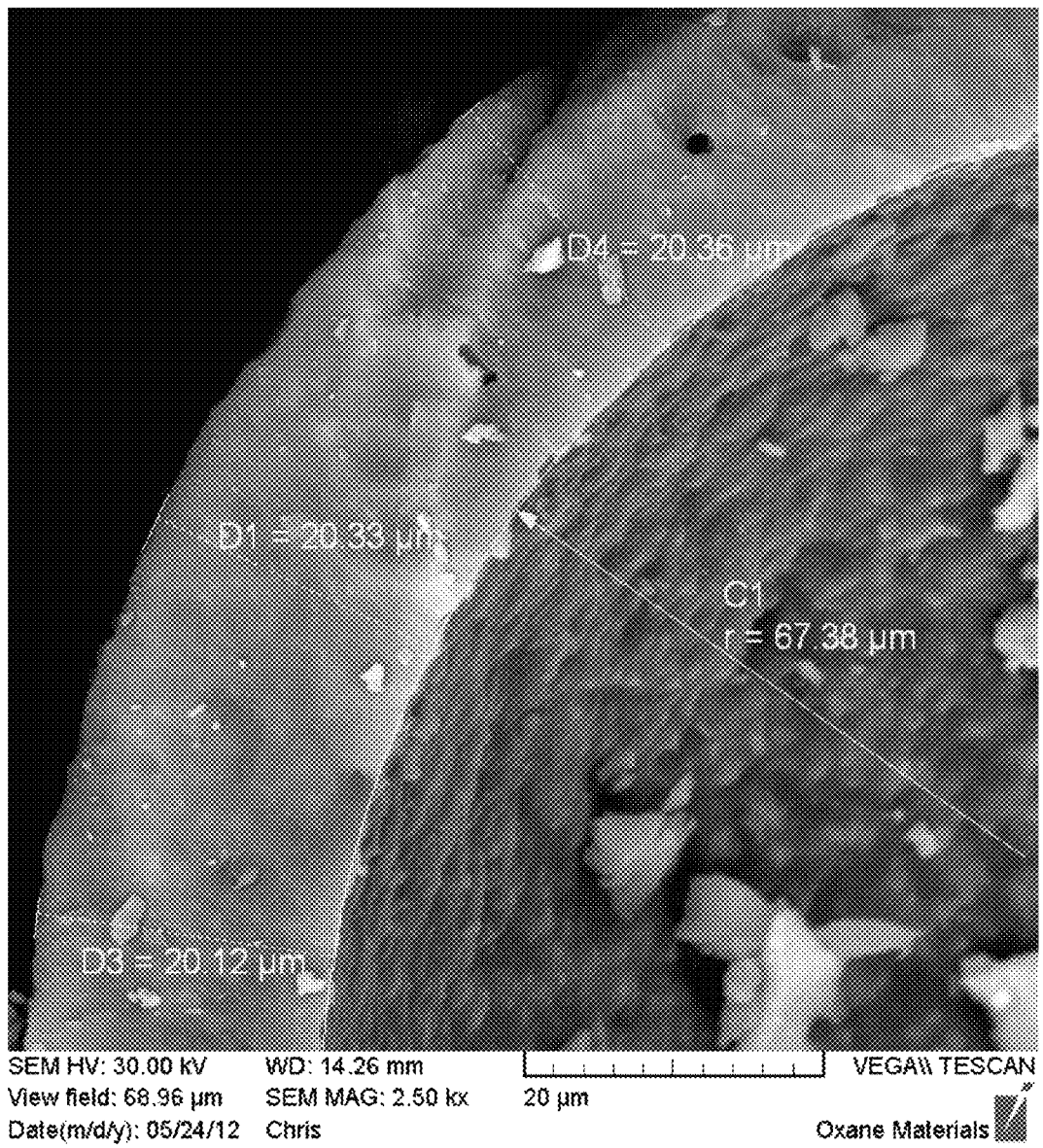
FIG. 25 is a SEM image of a synthetic template of the present invention, which is hollow in the central position of the sphere.
Figure 26:
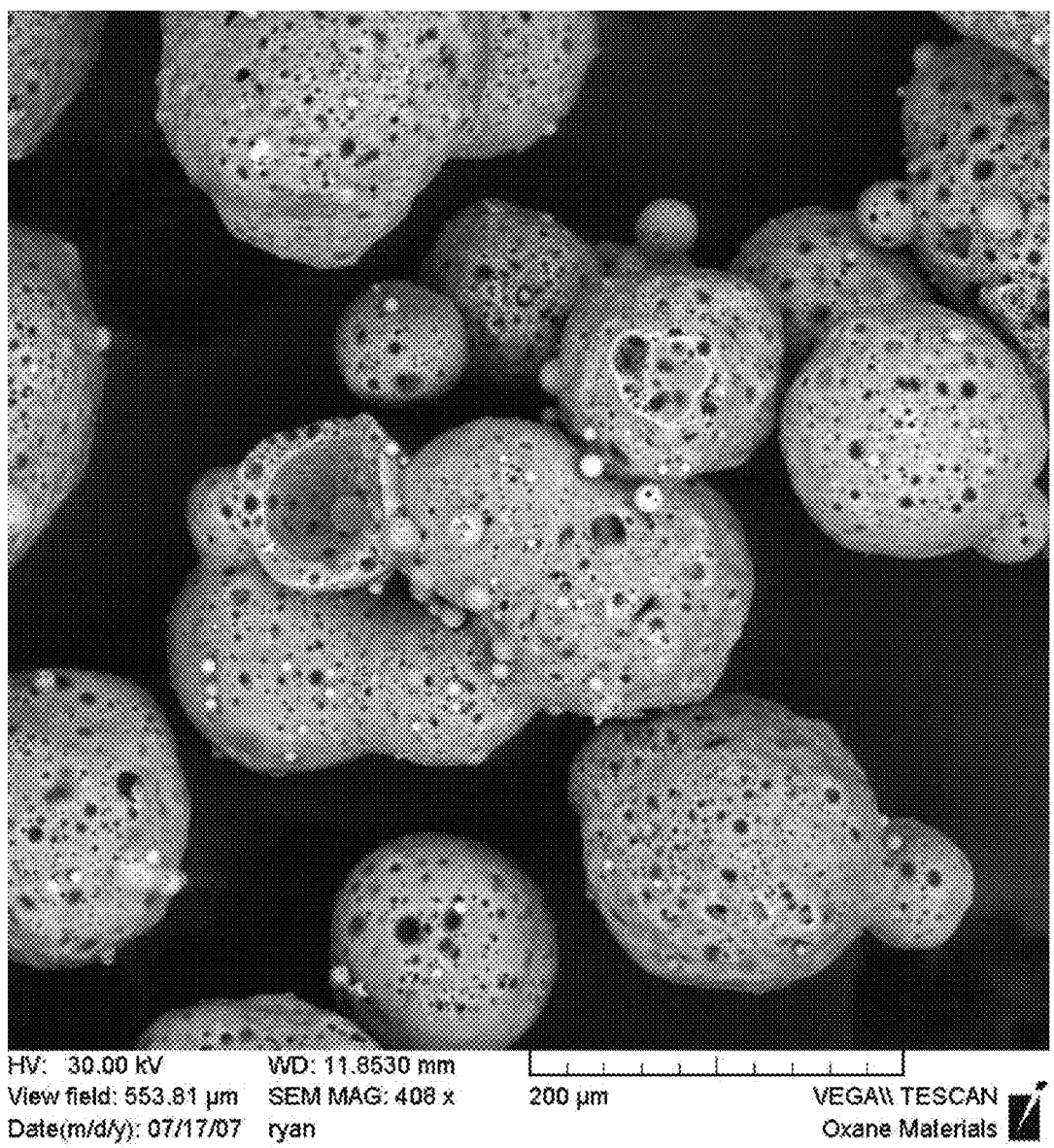
FIG. 26 is a SEM image of a conventional ceramic proppant, particularly a James Hardie cenosphere.
Figure 27:
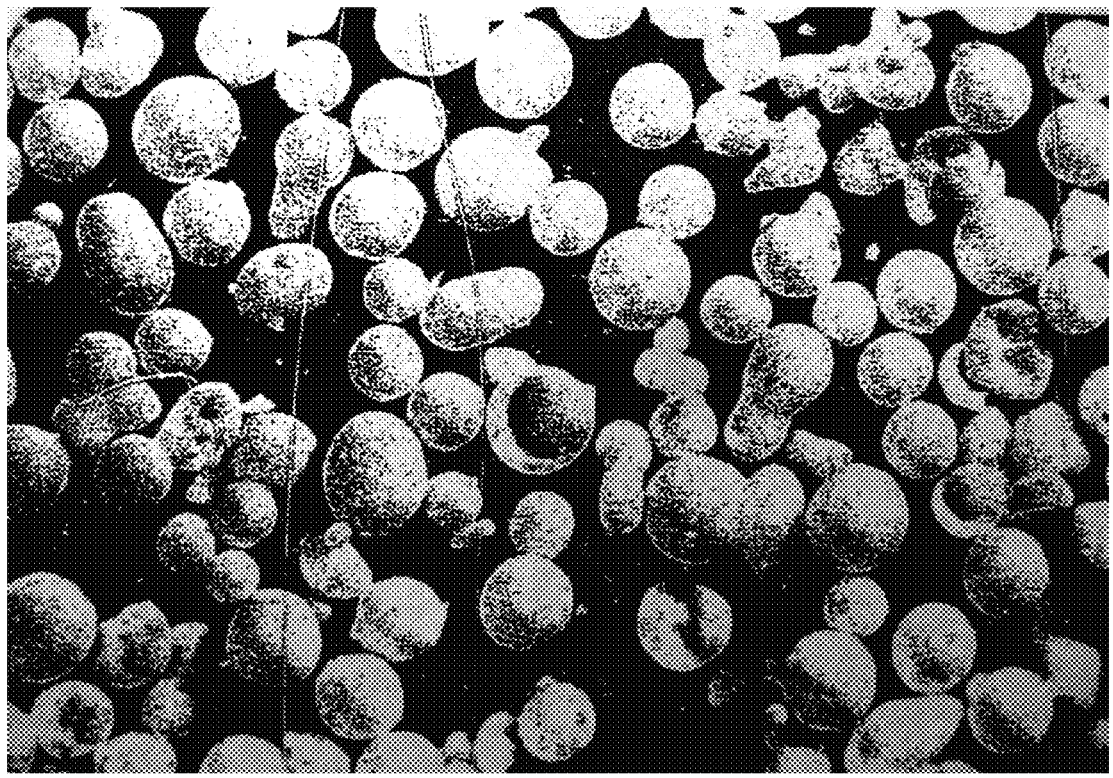
FIG. 27 is an image from a Department of Energy publication by Cutler et al. showing spray-dried ceramic proppants.
Figure 28:
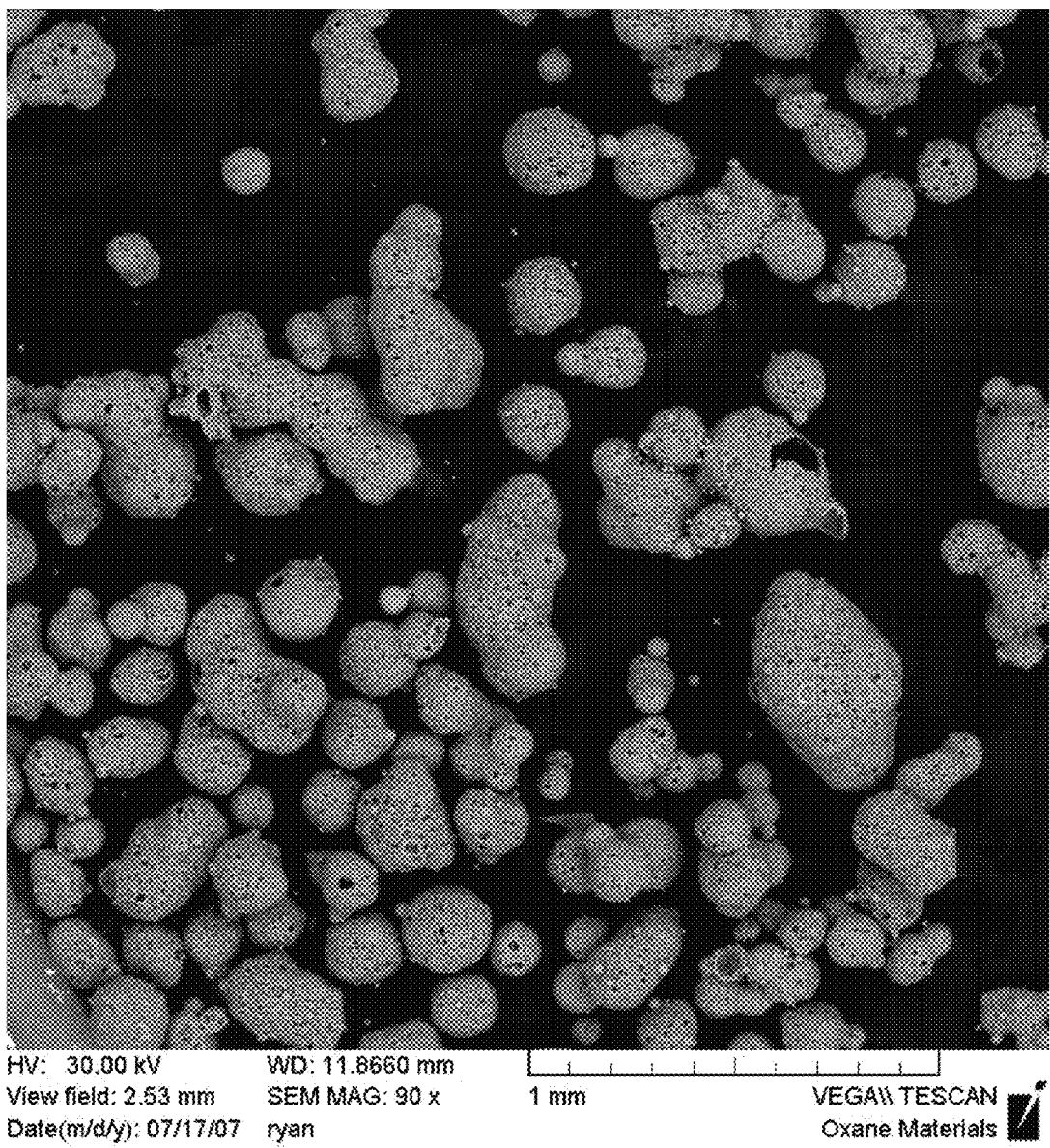
FIG. 28 is a SEM image of ceramic proppants that are James Hardie cenospheres.
Figure 29:
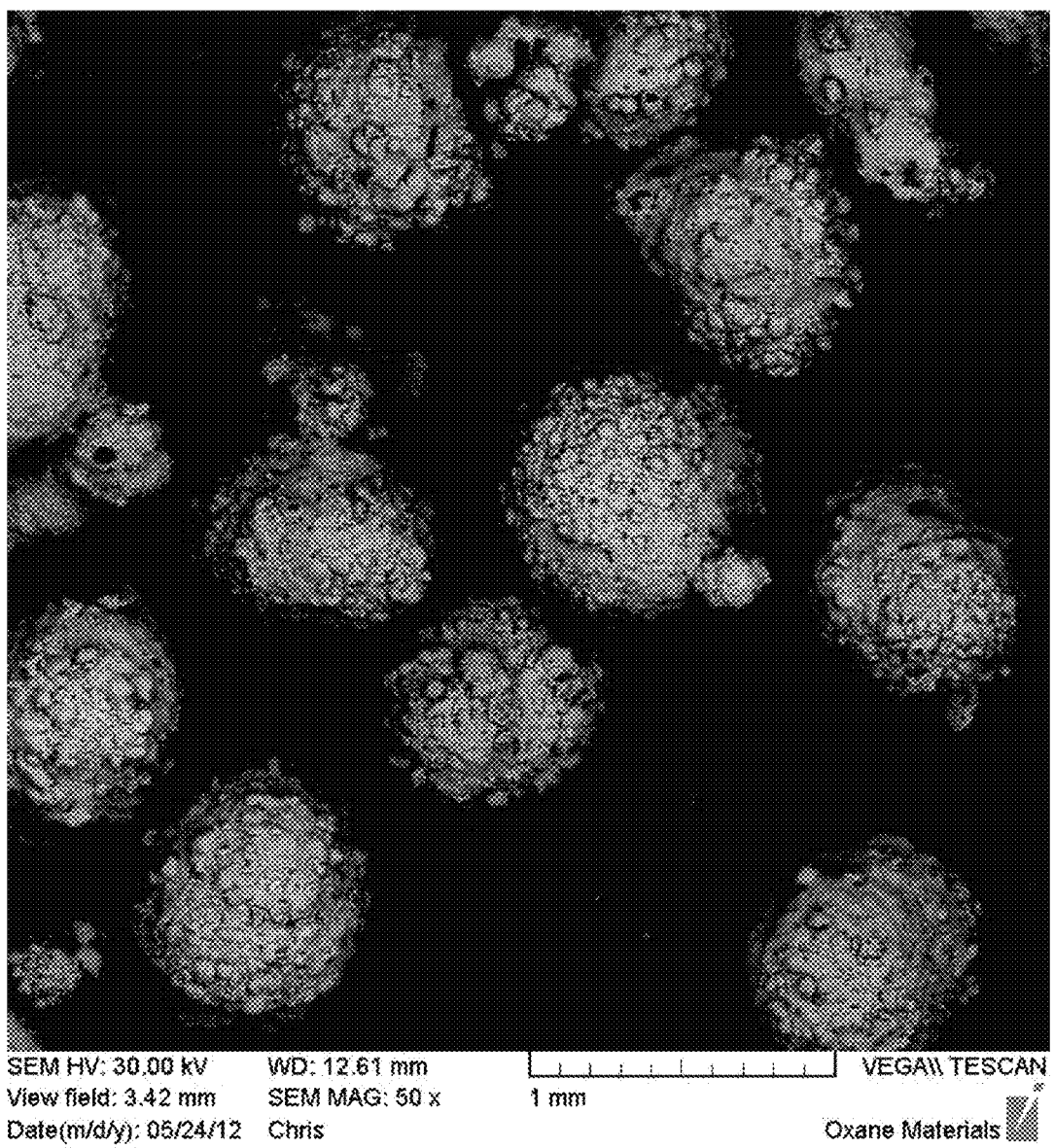
FIG. 29 is a SEM image of conventional ceramic proppants from Kerabims.
Figure 30:
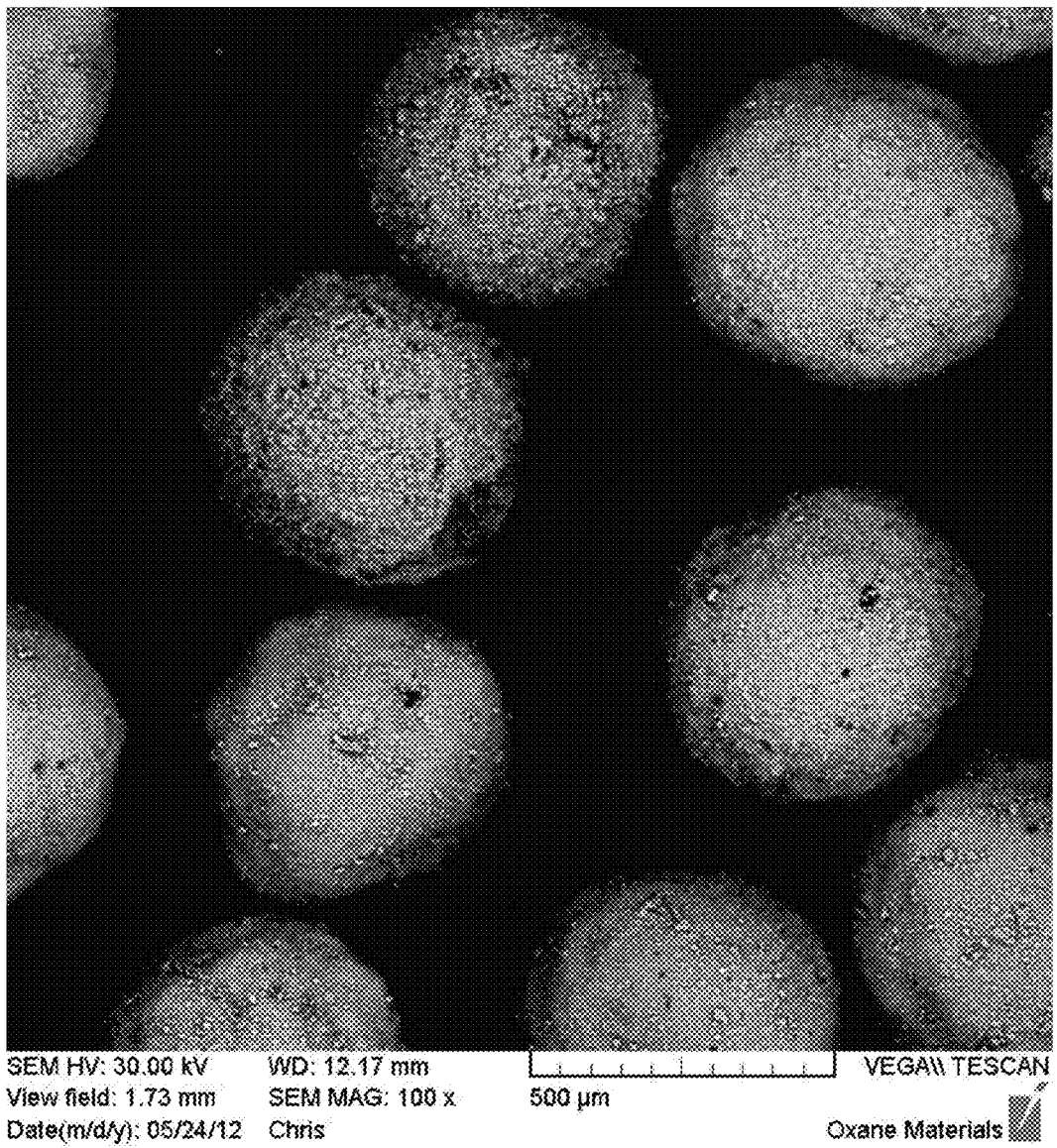
FIG. 30 is a SEM image of ceramic proppants that are known as Macrolite proppants.
Figure 31:
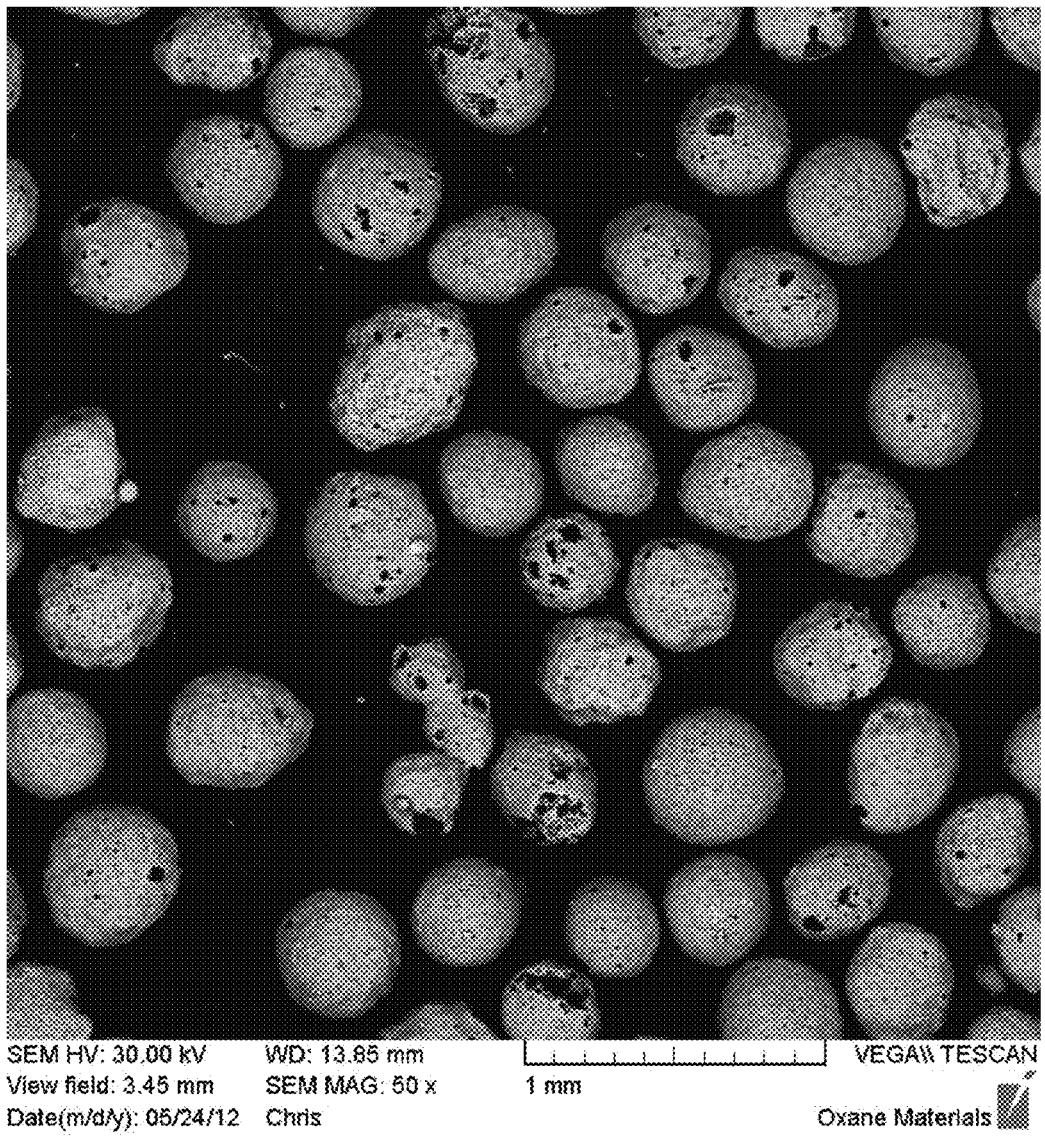
FIG. 31 is a SEM image of conventional ceramic proppants known as Poraver proppants.

The benefits of the present invention can be seen by taking SEM images of the proppants or templates of the present invention and comparing them to conventional cenospheres. For instance, FIGS. 21 and 22 represent typical conventional cenospheres that have previously been used in the formation of proppants. As can be seen in FIGS. 21 and 22, conventional pre-formed cenospheres have irregularities, surface defects, and structural defects as especially seen in the cross-section of one of these conventional cenospheres set forth in FIG. 22. Unlike the conventional cenospheres, in the synthetic templates of the present invention, high regularity and uniformity and low defects are achieved with the present invention. As can be seen in FIG. 23, a sintered synthetic template of the present invention, which was formed by spray-drying techniques, clearly shows the high uniformity and very low surface defects that exist on a synthetic template particle of the present invention. FIG. 24a is a cross-section of one of these sintered synthetic templates which is a solid and, again, as can be seen in comparing FIG. 24a with FIG. 22, the present invention achieves a very different morphology and very low defects. FIG. 24b shows the same solid synthetic template after being sintered in air at 1000° C. FIG. 25 further shows a sintered hollow synthetic template of the present invention and, again, as can be seen, low surface defects are achieved and the surface is quite uniform especially compared to the conventional templates.

The present invention relates, in part, to a method of forming a ceramic proppant having a ceramic core and ceramic shell structure. The method involves forming a solid green body core and forming a green shell(s) around the core, wherein the shell comprises one or more ceramic materials. The shell can be considered a ceramic shell. The method then involves sintering the green body that comprises the core and shell(s) such that at least part (or all) of the ceramic material that defines the core diffuses into the shell to result in a ceramic proppant having a center void (or hollow core) and a ceramic shell.

The partial or complete diffusing of the core into the shell occurs during sintering, and the diffusing can be uniform such that a portion or the entire core diffuses uniformly throughout the shell regions or the diffusing can be in a gradient fashion such that a higher concentration of the core that diffuses into the shell is located closer to the core than to the exterior outer surface of the proppant.

In this method, the green body shell has an overall higher sintering temperature than the green body core. Put another way, the softening temperature of the green body shell is higher than the softening temperature of the green body core. For instance, the softening temperature of the green body shell is at least 100° C. higher than the softening temperature of the green body core and, more preferably, is at least 200° C. higher, such as from 200° C. to 400° C. higher compared to the softening temperature of the green body core. As an example, the softening temperature of the green body shell is from about 300° C. to about 400° C. higher than the softening temperature of the green body core. "Softening temperature" is the average softening temperature. The green body shell can be porous (e.g., uniformly or non-uniformly) and is preferably porous. The porosity can be non-interconnecting. In other words, the pores are not connected or bridged in any manner. For instance, the green body shell has a porosity (before sintering) of at least 10%, at least 20%, at least 30% by volume based on the overall volume of the green body shell, such as from 10% to 40% porosity by volume prior to sintering. After sintering, and after the optional diffusion referred to above and described herein, the sintered shell can have a porosity of 5% by volume or more, such as at least 10% by volume, wherein volume is a reference to the shell volume after sintering. For instance, the shell can have a porosity by volume of from 10% to about 40% based on the overall volume of the sintered shell. Generally, the porosity in the shell after sintering, compared to pre-sintering, decreases, such as by an amount of 5% to 30% or 10% to 25% by volume.

As an option, whiskers and/or platelets, such as mullite whiskers, can be present in the core and/or shell. For purposes of the present invention, "whiskers" are referred to and this includes whiskers and/or platelets. These whiskers can be formed in situ during the sintering process that forms the sintered proppant. Particularly, and just as an example, during the diffusion of the core or portion thereof into the shell, as described above, part of the diffusing process permits one or more of the ingredients that comprise the core to react and form whiskers, such as mullite whiskers. The concentration of the whiskers can be uniform throughout the core and/or shell or it can exist as a gradient where a higher concentration of the whiskers exists closer to the sphere center of the proppant. Put another way, the concentration of whiskers can be higher near the core and at the interface between the core and shell and have a lower concentration (such as at least 20% lower, at least 30% lower, at least 40% lower, at least 50% lower, at least 60% lower with regard to the weight amount of whiskers present at or near the surface (within 15% of the surface by radius) of the proppant compared to the concentration at the core-shell interface). The formation of whiskers in situ leads to enhanced strength and reinforcement of the overall proppant.

In the present invention, as an option, one or more nucleating agents can be used in the green body or part(s) thereof (e.g., core part and/or shell part). The nucleating agents can be $TiO_2$, $Li_2O$, $BaO$, $MgO$, $ZnO$, $Fe_2O_3$, $ZrO_2$, and the like. The nucleating agents can be present in the green body from 0 wt % to 15 wt %, based on the weight of the green body, such as from 0.01 wt % to 15 wt %, or 0.1 wt % to 15 wt % or more, or 1 wt % to 10 wt %, or 2 wt % to 5 wt % and the like. The wt % provided here can alternatively apply to a part of the green body, for instance, to the core part and/or to the shell part of a proppant, if a shell is present. With the use of nucleating agents, the nucleating agents can promote glass ceramic material generation. For instance, nucleating agents can be used in the green core body material, and a green shell material can be applied to the green body core and then the nucleating agents in the green core body can diffuse or migrate to the shell and promote glass ceramic generation in the shell. With the use of nucleating agents, the shell or matrix can have an initial amorphous phase of 0% to 100% and then after sintering, the crystallinity can range from 100% to 0% from the inner to outer surface of the proppant. With the use of nucleating agents, improved mechanical strength can be achieved and/or improved chemical stability of the proppants.

In the present invention, as an option, one or more anisotropic growth promoters can be used in the green body. The growth promoters can be added to the green slurry used to form the green body (such as the green body core and/or green body shell). The growth promoters can be one or more oxides. For instance, several oxides are capable of promoting anisotropic growth of whiskers in ceramic material such as, but not limited to, alumina, boehmite, alumina precursors (gibbsite, bauxite). The growth promoters are more effective in promoting growth of whiskers, such as mullite whiskers, at temperatures ranging from 1000° C. to 1650° C. These oxides include $TiO_2$, $MnO_2$, $Cr_2O_3$, CaO, $K_2SO_4$, $K_2CO_3$, MgO, $AlF_3$ and SrO, and the like. Mixtures of $Na_2O$—MgO—$Al_2O_3$ and CaO—$SiO_2$—$Al_2O_3$ are also able to form anisotropic aluminate structures (platelets). Anisotropic grains/precipitates strengthen (or toughen) the matrix by preventing catastrophic growth of cracks in the matrix. Precipitates or clusters with high aspect ratios create torturous paths for the cracks either by blunting or by diverting/changing directions of the crack paths. Needle shaped mullites and platelet shape alumina and aluminates are some examples of the high aspect ratio structures.

In the present invention, for proppants, one can produce spray dried synthetic template cores (solid or hollow) from ceramic material, such as alumina, boehmite, gibbsite, and/or particulate mullite, and the like. One can also introduce anisotropic growth promoters in the shell green material during the spray coating of the shell forming green material onto the templates. During sintering of such green proppants, radial diffusion and migration of core materials would encounter anisotropic growth promoters at high temperatures, and their particulate shape would change to shapes having high aspect ratios (e.g. needle, platelets, laths, and the like). The growth promoters can be used in an amount of from about 0.5 to about 25 wt % based on the overall weight percent of the green body.

The proppants described herein, of the present invention can include one or more of the following characteristics:

said glassy phase (or amorphous phase) is present in an amount of at least 10% by weight, based on the weight of the proppant (e.g., at least 15%, at least 20%, at least 25%, at least 30%, at least 40%, at least 50%, such as from 15% to 70%, all based on wt %, based on the weight of the proppant);

said ceramic whiskers have an average length of less than 5 microns (e.g., less than 4 microns, less than 3.5 microns, less than 3.2 microns, less than 3 microns, less than 2.7 microns, less than 2.5 microns, less than 2.2 microns, such as from 0.5 micron to 5 microns, or from 1 micron to 3.5 microns, or from 0.8 micron to 3.2 microns, or from 1 micron to 3 microns or from 1.2 to 1.8 microns);

said ceramic whisker have an average width of less than 0.35 micron (e.g., less than 0.3, less than 0.28, less than 0.25, less than 0.2, less than 0.15, such as from 0.05 to 0.34 micron, from 0.2 to 0.33 micron, from 0.1 to 0.3 micron, from 0.12 to 0.2 micron, all units in microns);

said ceramic whiskers have a whisker length distribution, $d_{as}$, of about 8 or less (e.g., 7 or less, 6 or less, 5 or less, 4 or less, 3 or less, 2 or less, 1 or less, 0.5 or less, 0.4 or less, 0.3 or less, 0.2 or less, such as 0.1 to 8, 0.1 to 7, 0.1 to 6, 0.1 to 5, 0.1 to 4, 0.1 to 3, 0.1 to 2, 0.1 to 1, 0.1 to 0.75, 0.1 to 0.5, 0.1 to 0.3, 0.1 to 0.2, 0.1 to 1.8), wherein, $d_{as} = \{(d_{a90} - d_{a10})/d_{a50}\}$ wherein $d_{a10}$ is a whisker length wherein 10% of the whiskers have a smaller length, $d_{a50}$ is a median whisker length wherein 50% of the whiskers have a smaller whisker length, and $d_{a90}$ is a whisker length wherein 90% of the whiskers have a smaller whisker length;

said proppant having an free alpha-alumina content of at least 5% by weight of said proppant (e.g., 5 wt % to 50 wt % or more, at least 10 wt %, at least 20 wt %, at least 30 wt %, at least 40 wt %, based on the weight of the proppant);

said proppant having an HF etching weight loss of less than 35% by weight of said proppant (e.g., less than 30% by weight, less than 25% by weight, less than 20% by weight, less than 15% by weight, less than 10% by weight, such as from 10 wt % to 34 wt %, from 15 wt % to 30 wt %, from 18 wt % to 28 wt % by weight of said proppant);

said proppant has a major phase of whiskers of less than one micron and a secondary minor phase of whiskers of one micron or higher; and/or said ceramic whiskers have a whisker length distribution having $d_{a90}$, which is a whisker length wherein 90% of the whiskers have a smaller whisker length, of less than 12 microns (e.g., less than 10 microns, less than 8 microns, less than 7 microns, less than 6 microns, less than 5 microns, less than 4 microns, less than 3 microns, less than 2 microns, such as from 1 to 10, 1.5 to 5, 1.7 to 5, 1.8 to 4, 1.9 to 3.5, 1.5 to 3.5).

It is to be understood that all averages and distributions mentioned above are based on measuring at least 50 whiskers picked on a random basis in a proppant. Preferably, at least 10 proppants are measured in this manner and an average obtained.

In the methods of the present invention, the green body can be made from one or more ceramic or ceramic precursor particles, and can comprise, consist essentially of, or consists of cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic or any combination thereof. The green body material can be or include one or more sedimentary materials (e.g., feldspar, quartz, amphiboles, clay, shale, siltstone, sandstone, conglomerates, breccias, quartz sandstone, arkose, greywacke, quartz arenites, lithic sandstone or any combinations thereof) and/or synthetically produced materials (e.g., milled cenospheres). As an option, the green body material is not igneous or metamorphic materials and/or the resulting proppant of the present invention can have the complete absence or substantial absence (e.g. less than 1% by weight of proppant) of igneous or metamorphic materials, which can be less suitable for certain proppant uses.

The particles that form the green body can have any particle size distribution. For instance, the particles that form the green body can have a particle size distribution, $d_{gs}$, from about 0.5 to about 15, wherein, $d_{gs}\{(d_{g90} - d_{g10})/d_{g50}\}$ wherein $d_{g10}$ is a particle size wherein 10% of the particles have a smaller particle size, $d_{g50}$ is a median particle size wherein 50% of the particles have a smaller particle size, and $d_{g90}$ is a particle size wherein 90% of the particle volume has a smaller particle size. The particle size distribution, $d_{gs}$, can be from 0.5 to 15, from 0.75 to 12, from 1 to 6, from 1 to 10, from 1.5 to 8, from 2 to 8, from 2.5 to 8, from 2.5 to 6, from 3 to 10, from 1 to 8, from 0.5 to 10, from 0.5 to 1, from 0.5 to 2, from 0.5 to 3, from 0.5 to 4, from 0.5 to 5, from 0.5 to 6, from 0.5 to 7, from 0.5 to 8 or any various combination of ranges provided herein.

The median particle size, $d_{g50}$, of the particles that form the green body can be of any median size, for instance, from about 0.01 μm to about 100 μm, wherein $d_{g50}$ is a median particle size where 50% of the particles of the distribution have a smaller particle size. The median particle size, $d_{g50}$, of the particles that form the green body can be from about 1 μm to about 5 μm, from about 1 μm to 2 μm, from 0.01 μm to 100 μm, from 0.05 μm to 100 μm, from 0.1 μm to 100 μm, from 0.5 μm to 100 μm, from 0.75 μm to 100 μm, from 1 μm to 100 μm, from 2 μm to 100 μm, from 5 μm to 100 μm, from 10 μm to 100 μm, from 20 μm to 100 μm, from 0.01 μm to 10 μm, from 0.05 μm to 10 μm, from 0.1 μm to 10 μm, from 0.5 μm to 10 μm, from 0.75 μm to 10 μm, from 1 μm to 10 μm, from 2 μm to 10 μm, from 5 μm to 10 μm, from 0.01 μm to 5 μm, from 0.05 μm to 5 μm, from 0.1 μm to 5 μm, from 0.2 μm to 5 μm, from 0.3 μm to 5 μm, from 0.4 μm to 5 μm, from 0.5 μm to 5 μm, from 0.75 to 5 μm, from 2 μm to 8 μm, from 2 μm to 6 μm, from 1 μm to 20 μm, from 1 μm to 30 μm, or any various combination of ranges provided herein, wherein $d_{g50}$ is a median particle size where 50% of the particles of the distribution have a smaller particle size.

The particles that form the green body or a portion of the green body, such as the green body core or green body shell, can have a unimodal particle size distribution or it can be a multi-modal particle size distribution, such as a bi-modal particle size distribution. For example, as one option, the green body core can be formed from a unimodal or bi-modal or other multi-modal particle size distribution. As a preferred option, the core can be formed from a bi-modal particle size distribution which results in a tighter particle backing, and the green body shell, if used, can be formed, as a preference, with a unimodal particle size distribution which results in less packing density and therefore permits diffusion (at least partial) of the green body core (as described above as an option) into the shell area or radial portion thereof. Thus, in the present invention, a proppant can be formed comprising a plurality of micron particles that are sintered together, wherein the micron particles have a unimodal particle distribution or it can have a bi-modal particle distribution. The micron particles can have a $d_{50}$ of 0.5 micron to 3.5 microns. The green body and/or resulting proppant can have a plurality of pores having a pore volume wherein the majority of the pore volume results from the interstitial gaps formed between the micron particles. The pore volume created in this manner can be from about 1% to 30%, or from about 5% to about 20%, based on the total volume of the proppant either in the green state or sintered state. The $d_{10}$ of the micron particles used to form the green body can be within 100% of the $d_{50}$, or within 50% of the $d_{50}$. The micron particles used to form the green body can have a $d_{90}$ that is within 100% of the $d_{50}$ or that is within 50% of the $d_{50}$. Further, micron particles used to form the green body can have a $d_{10}$ that is within 100% of the $d_{50}$ and have a $d_{90}$ that is within 100% of the $d_{50}$ or can have a $d_{10}$ that is within 50% of the $d_{50}$ and have a $d_{90}$ that is within 50% of the $d_{50}$. As stated, the core and/or shell can comprise a plurality of micron particles that have a $d_{50}$ of from 0.5 micron to 3.5 microns and are sintered together, wherein the micron particles have a bi-modal particle distribution with a Modal A particle distribution and a Modal B particle distribution. The micron particles of each modal (A and B) can have a $d_{50}$ of 0.5 micron to 3.5 microns, and Modal A can have a $d_{50}$ that is at least 10% different from the $d_{50}$ from Modal B or at least 20% different from the $d_{50}$ of Modal B, or Modal A can have a $d_{50}$ that is from 10% to 100% different from the $d_{50}$ of Modal B.

With a tri-modal particle size distribution that forms the green body or a portion thereof, such as the core or shell, reduced porosity can be achieved and enhanced sintering can be achieved.

In the present invention, the green body or a portion thereof, such as the core or shell, can have a density, as measured by a gas pycnometer, such that the average density (g/cm$^3$) does not alter by more than 1% between the density of the whole green body compared to the density of the crushed green body, and preferably the average density is the same for the whole green body compared to the crushed green body. In other words, the average density changes 0% or 0.005% or less. Put another way, the average density of the green body or a portion thereof, such as the core or shell, can be 100%.

As an option, one or more mobile phases can be created in the droplets of the slurry that forms the green body, such as two phases, and one phase can migrate to the surface of the droplet, which can cause a multi-phase droplet (based on density) to form. This can cause a non-uniform green body of phases which can then cause a difference in diffusion into the shell as described herein. The difference in densities can be at least 10%, at least 20%, at least 50%, at least 100% with regard to the multi-phase droplet that results in the green body.

With regard to the diffusion of at least a portion of the green body core into the shell, a higher crystalline content will diffuse slower than a semi-crystalline or glassy green body core. Further, the largest amount of diffusion can occur when fine particles of a glassy nature are used to form the green body core, and the green body shell is formed from coarse particles of a crystalline nature. Thus, as an option, the green body core can contain at least 50% by weight of a glassy material or at least 75% by weight or at least 95% by weight based on the weight of the green body core and/or the green body shell can contain at least 50% of a crystalline material, such as at least 75% or at least 95% by weight based on the weight of the green body shell. Further, the particles used to form the green body core can be at least 10%, at least 25%, at least 50%, at least 100% smaller in the average mean size ($d_{50}$ size) compared to the mean particle size ($d_{50}$ size) of the particles that form the green body shell.

As an option and taking into account that proppant sizes can be relevant to the standard deviations, set forth below are preferred standard deviation ranges based on mean particle size of the proppant (green or sintered state). For instance, when the mean particle size is from 100-299 μm, the standard deviation can be from 0.83 to 2.5. The mean particle size is a reference to the green body and/or resulting sintered body, and the green body can be a template or a template with a shell(s), and/or the resulting sintered version thereof. The ranges provided for mean particle size and standard deviation can be exact ranges or can "about" these ranges (e.g., from about 100 microns to about 299 microns, or a standard deviation of from about 0.83 to about 2.5, and so on).

100-299 μm, σ=0.83-2.5
300-499 μm, σ=2.5-4.16
500-799 μm, σ=4.16-6.66
800-999 μm, σ=6.66-8.33

1000-1499 µm, σ=8.33-12.5

1500-2000 µm, σ=12.5-16.66

Based on the particle size distribution to achieve a monodisperse distribution (as specified previously), the diameters of the particles can fall within a 5% tolerance band about the mean particle diameter:

$$d_s = \mu \pm 0.025\mu.$$

and $d_s$ can be defined by:

$$d_s = \frac{(d_{90} - d_{10})}{d_{50}}$$

where $d_{90}$, $d_{50}$ and $d_{10}$ are the $90^{th}$, $50^{th}$, and $10^{th}$ percentiles of the particle size distribution respectively. For example, $d_{90}$ refers to the particle size below which 90% of the particles are below this particle size, similarly for the $d_{50}$ and $d_{10}$.

Specifying the total particle size distribution width to be less than or equal to 5% of the mean particle size, the following range for $d_s$ $$0.00 < d_s \leq 0.05$$

is obtained.

In the present invention, the ceramic or ceramic precursor can be present in the green body in various amounts, such as from about 50% by weight to 100% or to about 99.9% by weight of the green body, from 65% to 99.9%, from 70% to 99.5%, from 75% to 99%, from 80% to 98%, from 85% to 97%, from 75% to 95%, from 80% to 90%, from about 90% to about 99.9%, or any various combination of ranges provided herein, wherein the % is a weight percent based on the weight of the green body.

In order for the slurry to be spray dried, the rheology is preferred to be in a certain range to obtain desired properties. The sprayability of slurry is related to and affected by the density, viscosity, and surface tension of the slurry. These variables are, in turn, affected by chemical composition, solid content, particle size distribution, type and amount of additives such as binder, dispersant, surfactant and pH and zeta potential (surface charge), and the like. For stable and uniform drop formation during spray drying processes, slurry characteristics have an important role. Viscosity, surface tension and density determine the balance of viscous, inertial and surface tension forces during drop formation. A dimensionless characteristic, Z, describing this balance, called the Ohnesorge Number or Z number can be used as a measure of sprayablity $$Z = \frac{\sqrt{We}}{Re} = \frac{\eta}{\sqrt{\rho\sigma l}}$$

where $R_e$ is the Reynold's Number ($Re = \rho v l / \eta$), $W_e$ the Weber Number, ($We = \rho v^2 l / \sigma$), σ the surface tension in N/m, ρ the density of slurry in kg/m³, l the characteristic length (usually the orifice diameter) in m, η the viscosity in Pa·s, and v velocity in m/s. The range of Z for preferred spherical drop ejection in spray drying should be in a certain range, for example from 1 to 10, such as, from 2 to 9, or from 3 to 8, or from 4 to 6. As shown in one set of examples, when the Z number is above 1 and below 10, slurries had excellent sprayability for spray drying based on observed results. However, when the Z number was below 1, the slurries had poor or less than desirable sprayability which had to be addressed and/or modified in order to obtain desirable properties. These results are set forth in Example 3.

The green body material can further comprise additional components used to contribute one or more properties to the proppant or part thereof. For instance, the green body (e.g., the core and/or shell) can further comprise at least one sintering aid, glassy phase formation agent, grain growth inhibitor, ceramic strengthening agent, crystallization control agent, glass-ceramic crystallization agents, and/or phase formation control agent, or any combination thereof. The sintering promoter can be or include a compound containing zirconium, iron, magnesium, alumina, bismuth, lanthanum, silicon, calcium, cerium, yttrium, a silicate, a borate or any combination thereof. It is to be understood that more than one of any one of these components can be present and any combination can be present. For instance, two or more sintering aids can be present, and so on. There is no limit to the combination of various agents or the number of different agents used. Generally, one or more of these additional agents or aids can include the presence of yttrium, zirconium, iron, magnesium, aluminum, alumina, bismuth, lanthanum, silicon, calcium, cerium, one or more silicates, one or more borates, or one or more oxides thereof, or any combination thereof. These particular aids or agents are known to those skilled in the art. For instance, a sintering aid will assist in permitting uniform and consistent sintering of the ceramic material or oxide. A glassy phase formation agent, such as a silicate, generally enhances sintering by forming a viscous liquid phase upon heating in the sintering process. A grain growth inhibitor will assist in controlling the overall size of the grain. A ceramic strengthening agent will provide the ability to strengthen the overall crush strength. A crystallization control agent will assist in achieving the desired crystalline phase upon heat treatment such as sintering or calcining. For instance, a crystallization control agent can assist in ensuring that a desirable phase is formed such as an alpha aluminum oxide. A phase formation control agent is the same or similar to a crystallization control agent, but can also include assisting in achieving one or more amorphous phases (in addition to crystalline phases), or combinations thereof. The various aids and/or agents can be present in any amount effective to achieve the purposes described above. For instance, the aid and/or agents can be present in an amount of from about 0.1% to about 5% by weight of the overall weight of the proppant. The proppant can comprise one or more crystalline phases or one or more glassy phases or combinations thereof.

The green body core can further comprise such additives and/or components that can react or otherwise interact with the ceramic shell or various components thereof during sintering to promote the formation of residual strain fields (microstrains and/or macrostrains) within the sintered proppant body. These reactions between the active components of the core and shell materials have the ability to generate additional phases which exhibit a different thermal expansion coefficient to the core and/or shell leading to a residual strain field through the cross-section of the proppant shell. Alternatively, the active component or components of the core, may interact with, or modify the crystal structure of the shell material through such processes as atomic substitution or filling of vacancies within the crystal structure. These modifications of the crystal structure may lead to the formation of lattice strains and/or thermal mismatch strains within the shell. The formation of such residual compressive strain fields have the ability to lead to improvements in the apparent fracture toughness and strength of the ceramic shell and consequently an improvement in the strength of the proppant. In addition, the formation of residual compressive strain fields within the surface regions of the proppant particle, may improve the corrosion resistance of the ceramic by increasing the apparent activation energy of the corrosion reaction. These residual strain fields may be characterized using any one of a number of diffraction techniques, including x-ray diffraction, neutron diffraction or synchrotron radiation diffraction. The existence of macrostrains can manifest themselves as a shift in the diffraction peak positions and the microstrains (or root mean square strain, rms strain) can manifest themselves as a broadening of the peak width, i.e. an increase in the half-width at full maximum (HWFM) value of the peaks. Alternatively, the diffraction patterns can be collected at varying angles of sample tilt and inclination (with respect to the incident radiation beam) using a Eulerian cradle to obtain a set of diffraction patterns that will allow the extraction of the 3 dimensional strain tensor for the system, which describes the macrostrain and microstrain components of the system. The absolute value of the total residual strain in the system may range from 0% to 5% or higher, such as from 1% to 3% or from 3% to 5%.

The green body material can include reinforcing particulates. The particulates can be used for strength enhancement or density control (reduce or increase density), or both. The particulates can be included in the composition which forms the green body or part thereof, in any amount such as from about 1 vol % to 50 vol % or more, for example, from 5 vol % to 20 vol % of the overall green body or part thereof. The reinforcing particulates can be ceramic material (e.g., oxide or non-oxide), metallic material (e.g., metal elements or alloys), organic material, or mineral-based material or any combination thereof. Ceramic particulates include, but are not limited to, alumina, zirconia, stabilized zirconia, mullite, zirconia toughened alumina, spinel, aluminosilicates (e.g., mullite, cordierite), silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, aluminum oxynitride, silicon aluminum oxynitride, silicon dioxide, aluminum titanate, tungsten carbide, tungsten nitride, steatite, and the like, or any combination thereof. Metallic particulates include, but are not limited to, iron, nickel, chromium, silicon, aluminum, copper, cobalt, beryllium, tungsten, molybdenum, titanium, magnesium, silver, as well as alloys of metals, and the like, or any combination thereof. Metallic particulates may also include the family of intermetallic materials, such as the iron aluminides, nickel aluminides, titanium aluminides, and the like. Organic particulates include, but are not limited to, carbon-based structures such as nanotubes, nanorods, nanowires, nanospheres, microspheres, whiskers of oxide, fullerenes, carbon fibers, nomex fibers, and the like, or combinations thereof. Mineral-based particulates include, but are not limited to, such materials as kyanite, mica, quartz, sapphire, corundum, including the range of aluminosilicate minerals that display high hardness and strength. Single crystal materials can be used.

The alumina precursor can be or include aluminum hydroxide, bauxite, gibbsite, boehmite or diaspore or any combination thereof. The alumina or alumina precursor can have any particle size distribution.

Figure 32:
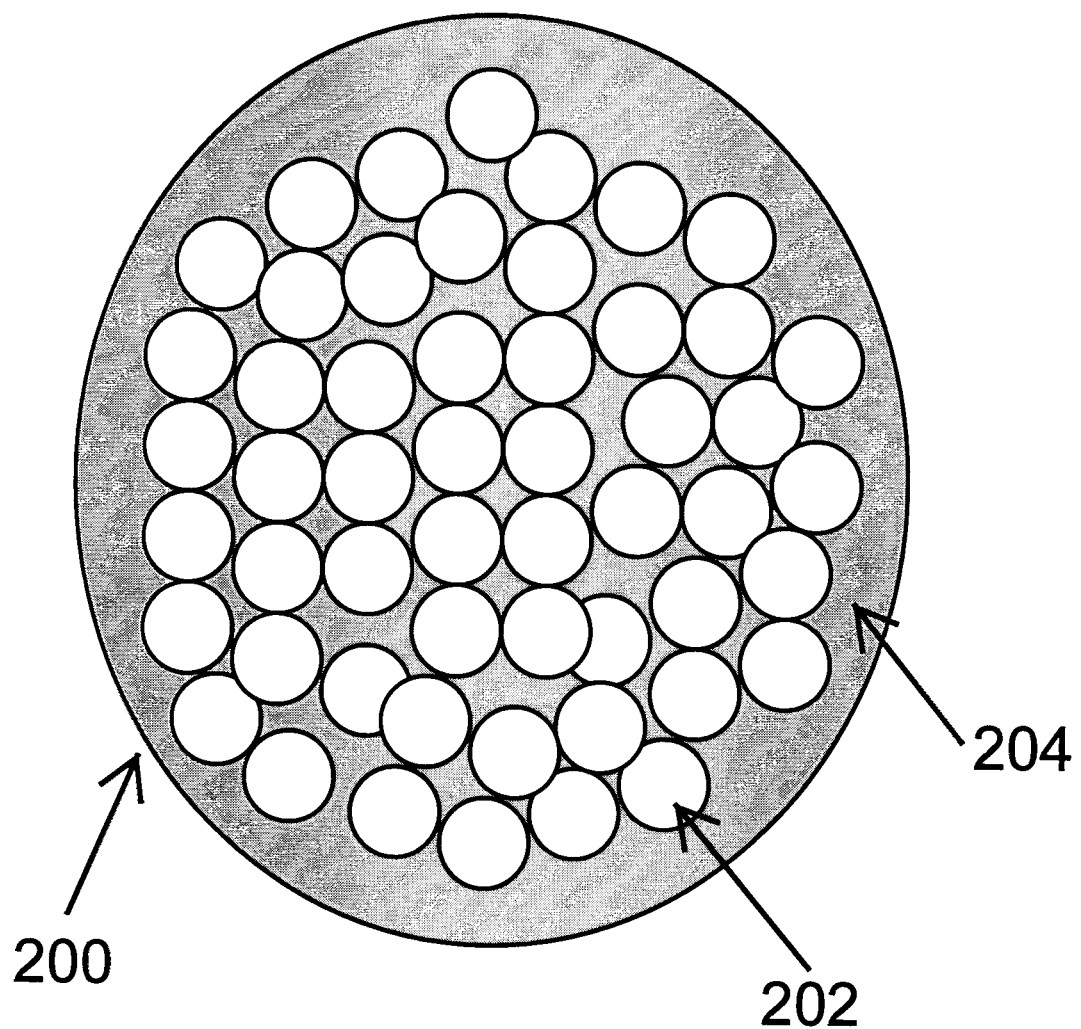
FIG. 32 is a schematic which shows one proppant design of the present invention.

The proppants of the present invention can be made by taking a plurality of synthetic templates or green body cores as described herein which would have a size, for instance, of from about 10 microns to about 30 microns. This plurality of smaller green body cores can then be formed as part of a slurry and then a green body core comprising a plurality of smaller green body templates or cores can be formed having, for instance, a diameter for this green body of from 20 microns to about 250 microns. This green body can then be processed in the same manner as described earlier to form a sintered ceramic proppant. The plurality of smaller templates or cores, during the sintering process, become one mass and ultimately form a sintered proppant that can have a hollow void (or two or more voids or pockets or pores) as described earlier. A small plurality of templates or cores can have a hollow central void or can be completely solid. FIG. 32 provides one example of a green body that is formed from a plurality of smaller template or core material. As can be seen in FIG. 32, 200 represents the overall green body proppant that is formed from the plurality of smaller templates or cores 202. 204 is part of the aqueous slurry that contains the plurality of smaller templates/cores that ultimately will be sintered.

In the present invention, the proppant can be made a number of ways, including, but not limited to, the following:

Option 1: A solid green body core can first be made and while still a green body, a shell, or several shell layers can be formed on the green body core, and then the green body core/shell(s) can be sintered to form the ceramic proppant. The green body core that is used in this option can then remain solid or can form into a hollow void(s) or pockets or a single hollowcore through diffusion during sintering, and the shell layer or layers can optionally contain pore formers that create pores upon sintering and/or the shell layer can contain microspheres. This two-step process can be used, for instance, wherein a core can be formed, for instance, by spray-dryer technique and then after the formation of the green body core, one or more green shell layers can be formed, for instance, by fluid bed techniques as described herein.

Option 2: As another option, the green body core can be formed as above, but first sintered to form a sintered core, which then can receive one or more shell layers as described above in Option 1 and then sintered again. This core can also be a hollow core or a solid core.

Option 3: A green body core and a green body shell can be formed at the same time and the green body core can be hollow at the time of formation of the green body core/shell. For instance, this can be done by a co-axial method, such as co-axial extrusion or spray-drying or other techniques that can simultaneously or essentially simultaneously form a hollow core green body and one or more shell layers on top and then the overall product can be sintered. This would be a form of a one-step process. This one-step process can further have pore formers and/or microspheres present in one or more shell layers as described, for instance, in Option 1.

Option 4: A hollow core can be formed by using a fugitive spherical template, such as a polymer template, such as a silicon-containing polymer. This fugitive spherical template can be a solid or a hollow fugitive spherical template and can be formed by co-axial nozzle techniques, such as described herein. This fugitive spherical template can then have a ceramic material applied on the surface so as to form a shell layers. One or more shell layers can be applied in this manner, such as by spray coating ceramic mixture as described herein for the green body. Then afterwards, the sintering can occur as described herein, wherein the fugitive template is burned out of a sintered ceramic proppant creating a hollow central void. Interestingly, through sintering in an oxidizing atmosphere, the active polymeric template can be pyrolyzed and form $SiO_2$ and/or other products which then, in turn, react with one or more ceramic components in the ceramic green shell material, such as alumina, to form a mullite inner layer or inner shell and an outer shell that is essentially the sintered ceramic shell. Put another way, as an option, the sintered proppant that is formed would essentially be a shell layer with no ceramic core and would have at least two phases—one phase that is a mullite-containing phase in the inner regions of the shell layer and a phase of ceramic that does not contain mullite.

Figure 33:
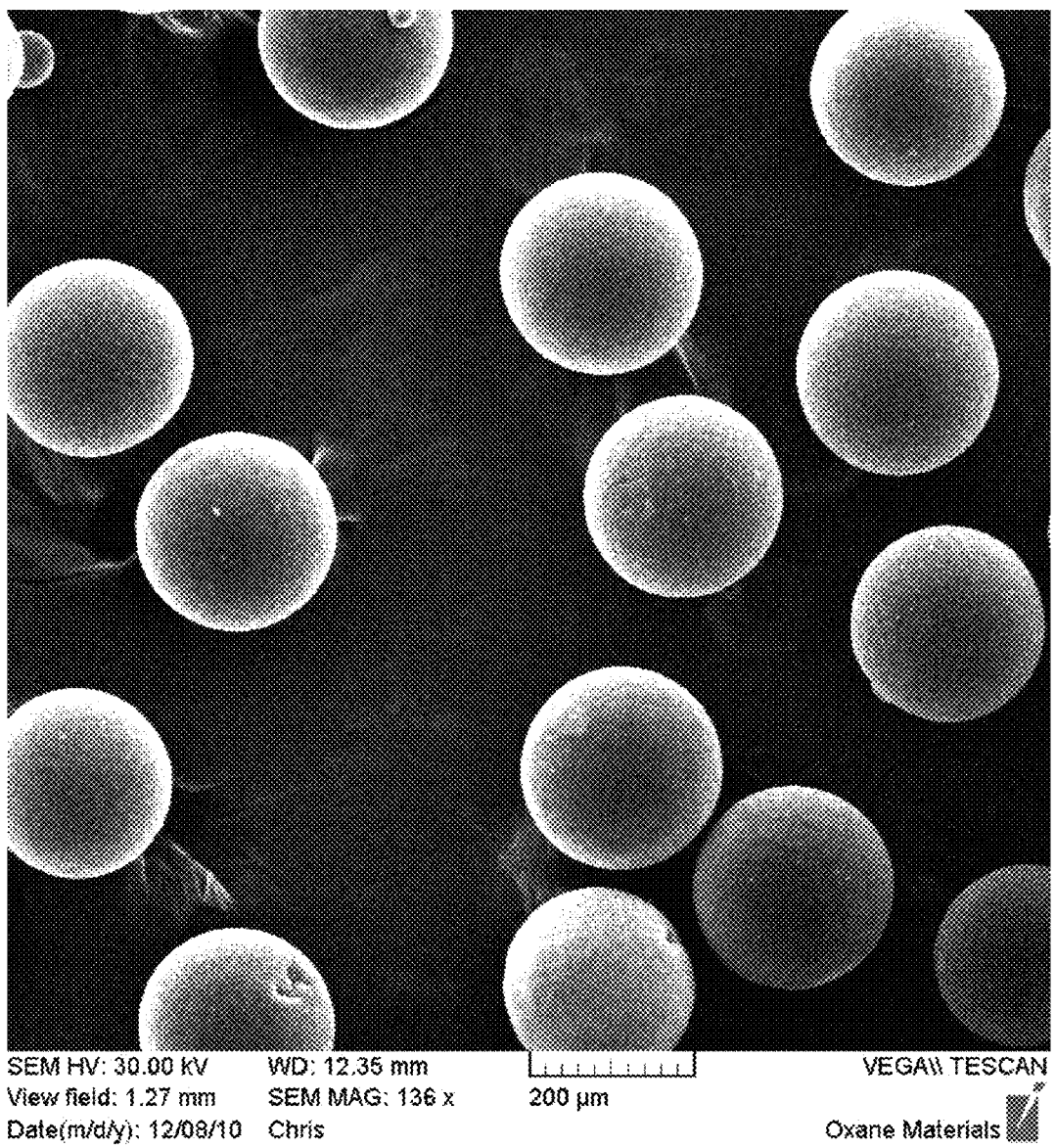
FIG. 33 is a SEM image of the polymeric templates used for proppant preparation.
Figure 34:
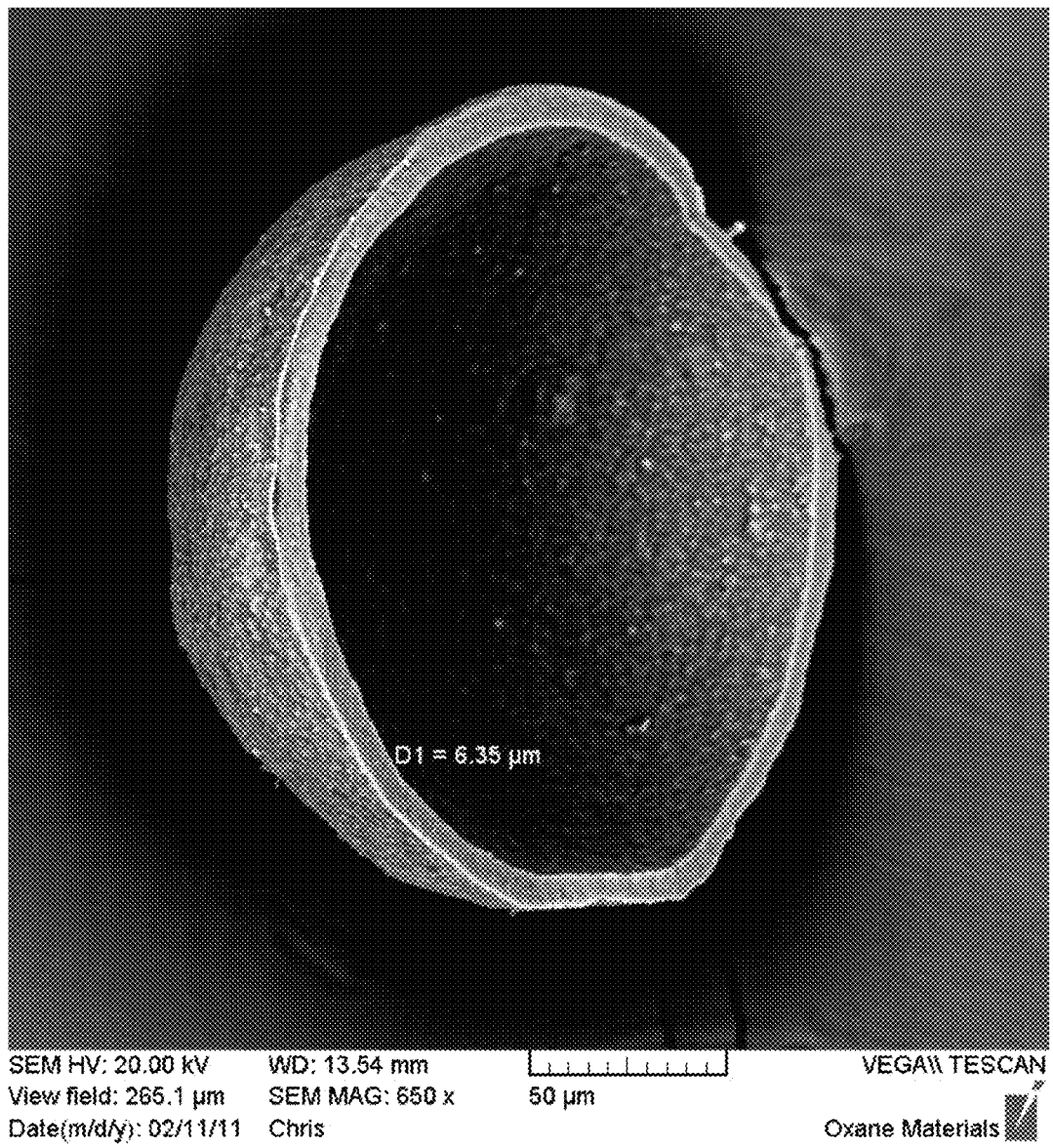
FIG. 34 is a SEM image of the cross-section of a hollow ceramic synthetic template made from spray coating on the polymeric core shown in FIG. 33 followed by burnout of the polymeric core and sintering of the shell.

The fugitive template as described above can be either solid or hollow and can be formed through an inkjet-like system with a piezoelectric dispensing mechanism using a solution of polymeric material, such as polyethylene, poly (methyl)methacrylate, and the like. The pulsing pressure generated by the piezo device can break the continuous stream of the solution to droplets of essentially the same size. The surface tension of the liquid then allows the droplets to become spherical and the droplets can then be dried by appropriate techniques, such as fluidized bed spray drying techniques, drop tower drying techniques, infrared curing, UV curing, and the like. In the case of hollow microspheres, the nozzle can be co-axial and concentric with the synchronized pulse gas (e.g., air) flow in the center and the liquid flow from the surrounding nozzle. FIG. 33 provides one example of the morphology of the fugitive polymeric templates formed and, in this case, polyethylene templates which, as can be seen, are extremely uniform with regard to size and shape. FIG. 34 shows a half of a synthetic ceramic proppant which was made using the polymeric templates of FIG. 33. Again, as can be seen, a very uniform central void can be achieved and a very consistent shell thickness around the entire sintered proppant can be achieved. Further, a proppant having very consistent shape and size that mimics the fugitive templates can be achieved, as well, as shown in FIG. 34. An illustrative example is provided as example 1.

For any one or more components that form the green body, for example, the particle size distribution, $d_{as}$, can be from about 0.5 to about 15, wherein, $d_{as}\{(d_{a90}-d_{a10})/d_{a50}\}$ wherein $d_{a10}$ is a particle size wherein 10% of the particles have a smaller particle size, $d_{a50}$ is a median particle size wherein 50% of the particles have a smaller particle size, and $d_{a90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5, and the like. The one or more components that make up the green body, such as alumina or alumina precursor, can have a median particle size, $d_{a50}$, of from about 0.01 µm to about 100 µm, wherein $d_{a50}$ is a median particle size where 50% of the particles of the distribution have a smaller particle size. The median particle size, $d_{a50}$, can be from about 1 µm to about 5 µm, from 1 to 5 µm, 1 to 90 µm, 1 to 80 µm, 1 to 70 µm, 1 to 60 µm, 1 to 50 µm, 1 to 40 µm, 1 to 30 µm, 1 to 20 µm, 1 to 10 µm, 10 to 90 µm, 20 to 80 µm, 30 to 70 µm, and the like, wherein $d_{a50}$ is a median particle size where 50% of the particles of the distribution have a smaller particle size.

Further, as an option, the particulate material or particles used to form the green body core and/or green body shell can be or have a unimodal particle distribution. In other words, the proppant can comprise a plurality of micron particles that are sintered together, wherein the micron particles have a unimodal particle distribution. The micron particles can have a $d_{50}$ of 0.5 micron to 3.5 microns.

The siliceous material that can be one or more of the components that form the green body, can be any silicon containing material, such as silicate containing material, silicon containing minerals or ore, silicates, silicon oxides, and the like. The siliceous material can be or include one or more cenospheres, fly ash or any combination thereof. The siliceous material can be natural, synthetic, or a by-product. The siliceous material can be or include silicate materials, quartz, feldspar, zeolites, bauxite, calcined clays or any combination thereof. The siliceous material can have any particle size, such as a particle size distribution, The $d_{as}$ can be from 0.5 to 15, 0.75 to 15, 1 to 15, 1 to 5, 1 to 6, 1 to 8, 5 to 15, 0.5 to 10, 0.5 to 5$d_{ss}$, of from about 0.5 to about 15, wherein, $d_{as}=\{(d_{s90}-d_{s10})/d_{s50}\}$ wherein $d_{s10}$ is a particle size wherein 10% of the particles have a smaller particle size, $d_{s50}$ is a median particle size wherein 50% of the particles have a smaller particle size, and $d_{s90}$ is a particle size wherein 90% of the particle volume has a smaller particle size. The $d_{as}$ can be from 0.5 to 15, 0.75 to 15, 1 to 15, 1 to 5, 1 to 6, 1 to 8, 5 to 15, 0.5 to 10, 0.5 to 5 and the like. The siliceous material can have a median particle size, $d_{a50}$, of from about 0.01 µm to about 100 µm, wherein $d_{a50}$ is a median particle size where 50% of the particles of the distribution have a smaller particle size. The median particle size, $d_{a50}$, can be from about 1 µm to about 5 µm, from 1 to 5 µm, 1 to 90 µm, 1 to 80 µm, 1 to 70 µm, 1 to 60 µm, 1 to 50 µm, 1 to 40 µm, 1 to 30 µm, 1 to 20 µm, 1 to 10 µm, 10 to 90 µm, 20 to 80 µm, 30 to 70 µm, and the like, wherein $d_{a50}$ is a median particle size where 50% of the particles of the distribution have a smaller particle size.

As an option, the particle size distribution and/or the median particle size of the alumina or precursor thereof and the siliceous material and/or one or more other components that can be present, can be the same or different, or can be within (±) 1%, 5%, 10%, 15%, 20%, 25% of each other.

The green body material can include at least one binder. The binder can be or include a wax, a starch, a modified starch, polyvinyl alcohol (PVA), polyethylene glycol (PEG), a sodium silicate solution, a potassium silicate solution, a functionalized latex polymer, an acrylic based polymer system, guar gums, alginates, or a low molecular weight functionalized polymer (e.g., 1,000 MW to 100,000 MW or 500 MW to 5,000 MW) or any combination thereof. A binder may be used to facilitate the formation of the green body mixture and can provide strength to the green body to facilitate handling operations.

The green body material can further include at least one dispersant. The dispersant can be or include at least one surfactant. The dispersant system maybe either cationic type, anionic type or a combination thereof. A dispersant may be used to facilitate a uniform mixture of alumina or alumina precursor and a siliceous material in the green body material. Specific dispersants can include, but are not limited to, DOLAPIX CE64 (Zschimmer & Schwarz, GmbH), DARVAN C (RT Vanderbilt Company, Industrial Minerals & Chemicals) and similar materials which may comprise from about 0% by weight to about 5% by weight of the green body material or any other amount to assist in the dispersion of materials.

The green body material can further include at least one slurrying agent. The slurrying agent can be or include water, an organic solvent or any combination thereof.

Besides the other ingredients mentioned above that can comprise the slurry, including the particulates (which includes the ceramic and/or oxide material), the binder, and dispersant, other optional components can be one or more of the following: flux agent (sodium silicate and/or sodium oxide), a defoaming agent (e.g., TU-44, or TU-45), and the like. An example of a binder is Optapix AC112 or Optapix AC95 from Zschimmer & Schwartz. A suitable dispersant can be Dolapix CE-64 from Zschimmer & Schwartz. A rheological control agent (viscosifier) can also be present as an option, which can be Bentone EW from Elementis. The rheological control agent can be present in an amount, for instance, from 0.25 wt % to 1 wt % based on the overall weight of the slurry.

The slurry can have a variety of viscosities. Preferably, the viscosity of the slurry is such to obtain more uniform droplets and, therefore, obtain monodisperse microspheres. The viscosity is preferably in the range of from about $10^2$ to about $10^5$ cP, such as $10^1$ cP to $10^3$ cP. Other examples of viscosities can be from $10^3$ to $10^4$ cP.

With regard to the spray dryer, an example of a suitable spray dryer is a GEA Niro Mobile Minor or Anhydro spray dryer.

Upon exiting the spray dryer, the green body can optionally receive one or more coatings that can form a shell using a fluid bed coater, for instance, 100N manufactured by Applied Chemical Technologies, or VFC-1200 manufactured by Vector Corporation.

Upon exiting the spray dryer or fluid bed coater, the green body can then be subjected to sintering.

The sintering can be performed under a pressure of from about $0.1 \times 10^5$ Pa to about $10 \times 10^5$ Pa, such as from about $0.5 \times 10^5$ Pa to about $7 \times 10^5$ Pa, or from about $1 \times 10^5$ Pa to about $5 \times 10^5$ Pa.

The sintering can be performed at a temperature from about 500° C. to about 2500° C. The sintering can be performed at an elevated pressure, for instance at a pressure from about 0.1 MPa to about 200 MPa for about 1 hour to about 20 hours. The sintering preferably occurs at a temperature below 1400° C., such as from 1000° C. to about 1200° C., for about 30 minutes to 4 hours, and more preferably from 2 to 4 hours. The sintering temperatures referred to herein are the temperature of the material being sintered. Other sintering temperatures/times can be at a temperature from about 1100° C. to about 1300° C. for about 1 hour to about 20 hours. Another example of the pressure during sintering is from about 0.1 MPa to about 200 MPa.

The sintering can be performed at any firing rate, such as a firing rate of from about 0.01° C./min to about 2000° C./min.

Sintering furnaces that can be used as a reactor in the present method can be any vessel that would permit the present method to be achieved. For instance, the reactor can be a fluidized bed furnace or fluidized furnace. The reactor can be a high temperature reactor, for instance, with process atmospheric control(s). Other types of furnaces can be used. The high temperature reactor can be a sealed chamber that permits control of the process atmosphere (composition, pressure, and the like) and can be heated by any means, including, but not limited to, radiant, infra-red, microwave, induction, RF, laser, self propagating combustion, and the like. The fluidized bed furnace can use air or an oxygen-containing gas, or an inert gas as the fluidizing medium. Example of other furnaces (or reactors) include:
  i. Rotary
  ii. Static Bed (or other dynamic bed furnace)
  iii. Muffle
  iv. Drop Tower
  v. Mechanical fluid bed where the air is recycled and/or
  vi. Microwave,
    These above furnaces generally use a sealed environment.
  vii. Conventional fluidized bed furnace.

With regard to the formation of the green body template or core, as indicated, spray drying techniques can be used. As preferred options, the following is provided.

The slurry that is used to form the green body template or core can be an aqueous (or non-aqueous) suspension of oxide and/or non-oxide ceramic particles. The particles can have a $d_{50}$ particle size ranging from 0.2 micron to about 50 microns (e.g., 0.5 micron to 2.5 microns, 0.75 micron to 2 microns, 1 micron to 2 microns, 0.2 micron to 5 microns) or other sizes. The slurry can have a solids concentration of from about 30 wt % to about 80 wt %, such as from about 35 wt % to 75 wt %, 40 wt % to 70 wt %, 45 wt % to 60 wt %, 50 wt % to 80 wt % based on the overall weight percent of the slurry. The slurry can contain one or more binders, such as one or more organic binders. The binders can be present in an amount from about 0.5 wt % to 5 wt % or other amounts, such as 1 wt % to 4 wt %, 2 wt % to 5 wt %, and the like. The weight percent is based on a dry powder basis (i.e., the dry components that form the slurry). As a further option, the slurry can contain one or more dispersants and/or surfactants, which can improve rheological properties (such as viscosity, stability, and the like) of the slurry. The dispersant can be present, for instance, in an amount of from 0.1 wt % to about 1.5 wt %, such as 0.1 wt % to 1.2 wt % and the like, based on a dry powder basis.

The spray dryer can have an inlet air temperature that ranges from 225° C. to 400° C. or other temperatures outside of this range. The spray dryer can have an outlet air temperature that ranges from 95° C. to 115° C. or other temperatures outside of this range. The spray dryer can have an atomizing air pressure that ranges from 0.2 bar to 2 bar or other pressures above this range. The spray dryer can have a slurry flow rate that ranges from 20 grams per minute to 9,000 grams per minute or higher. In the case of a single fluid hydraulic nozzle, employed in the atomization of the slurry in the spray dryer, the slurry pressures may range from less than 6 bar to 100 bar or higher, but preferably between 13 bar and 42 bar. The slurry flow rate can be governed by a combination of the nozzle orifice and the nozzle insert and may range from less than 4,500 grams per minute to 30,000 grams per minute or higher, and preferably between 8,500 grams per minute to 14,750 grams per minute.

Described here is one option to preparing the slurry and synthetic green bodies and proppants. The slurry can be made with desired ceramic matrix powder having a desired particle size (e.g. average mean particle size $d_{50}=1.50\pm0.15$ μm or other sizes) optionally with at least one binder with or without at least one defoamer.

Figure 7:
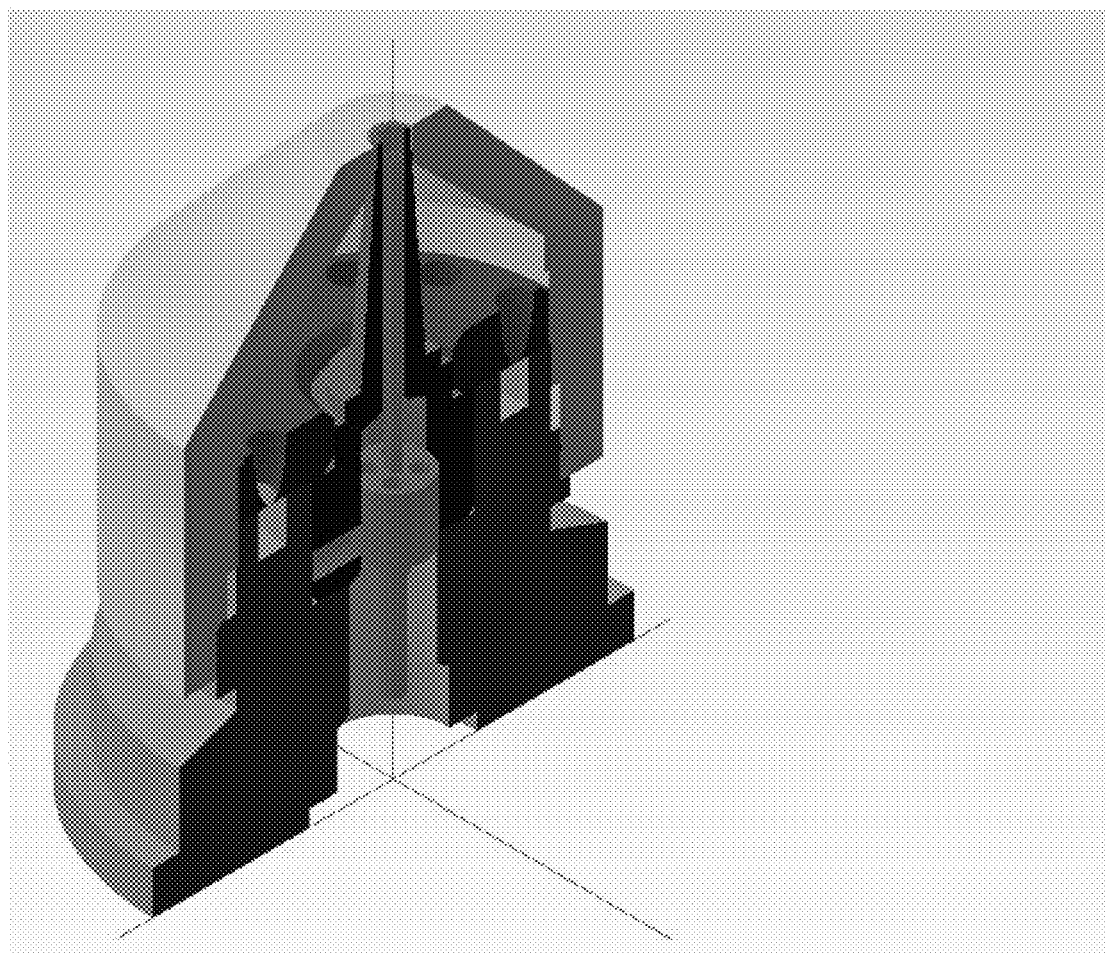
FIG. 7 is a drawing of an exposed side view of a spray nozzle that can be used in the methods of the present invention.

The slurry can be sprayed through a nozzle under constant or pulsing dispensing pressure to form droplets that can immediately become spheres due to the surface tension of the slurry. The nozzle may be of the single fluid hydraulic type, a two fluid nozzle in which compressed air is used to assist droplet formation and the two fluid nozzle may be of the internal mix or external mix variety. Other nozzle types may be used including a design that incorporates a secondary "blowing" air stream to effectively blow bubbles of slurry and thus form hollow spheres. One example of a spray nozzle is set forth in FIG. 7. This spray nozzle 11 has an air cap 1, a swirl plate 3, a slurry nozzle 5, a secondary nozzle 7, and a nozzle body 9.

The spheres are then dried (preferably immediately) in a chamber filled with blowing hot air, with the process operating in counter-current mode. That is, the slurry droplet trajectory is in the opposite direction to the hot air flow. The product fraction of interest is collected at the bottom of the chamber by way of an airlock assembly. Particles that are below a critical size pass through the exhaust stream of the spray drier and are separated from the air stream by way of various devices including, but not limited to, cyclones, bag dust collector, electrostatic dust collectors, and the like.

The dried green products are then sintered at a temperature to densify and strengthen the structure, as described earlier.

By changing the composition of the starting material in the slurry, porous spheres can be produced. For instance, the addition of fugitive phases can be used. The fugitive phase can be or include a combustible inorganic or organic material. For instance, the combustible inorganic or organic material can be or include cellulose-based material, wood-based material, and/or carbonaceous material, polymeric material (or particles) or any combination thereof. The combustible inorganic or organic material can be or include crushed tree nut shell material, carbon black, carbon fiber, charcoal, activated carbon, carbon toner, graphite, coal, paper, plant material, starch, starch granules, flour, or any combination thereof. International Patent Application WO 2011/082102 provides techniques and materials that can be used here and this application is incorporated in its entirety by reference herein.

By using a co-axial nozzle with different slurries, proppants with core-shell structure can be produced simultaneously. For instance, the center orifice of the nozzle assembly may carry a cenosphere (or flyash) slurry and the outer slurry orifice of the nozzle assembly may carry the matrix ceramic slurry. By control of the two slurry flow rates and pressures and the atomizing air pressure, droplets of slurry consisting of a central region of cenosphere (or flyash) slurry encapsulated by the ceramic matrix slurry may be formed, which then pass into the drying chamber of the spray dryer and are formed into green spherical particles.

A multilayer core-shell structure can be produced by a co-axial nozzle spray process to obtain a functionally gradient structure for better mechanical or chemical properties.

By using a co-axial nozzle, a green body with a hollow core in the center can be formed by a continuous or pulsing stream of air, and one or more periphery hollow stream(s) to form a shell of simple matrix or a complex shell with a functionally gradient matrix.

Regarding the sintering process, in more detail, the sintering can be a fast heating process. A tunnel kiln can be used. Or, the particulate proppant can be sintered by a fast sintering technique with ramping rate up to 50° C./min or faster. The ramping rate can be 10 to 100° C./min or even higher. In addition, the holding time can be reduced from several hours to within one hour or even a few minutes only (e.g., 3 minutes to 30 minutes). As indicated, the sintering can occur in fluidized bed conditions or in a rotary kiln. With the fast and homogeneous heating in the sintering process, the mechanical properties of the product are substantially improved, because fast sintering can suppress grain growth and allow fine-grain microstructure. The fine-grain ceramics can be beneficial to fracture toughness and strength.

The proppants of the present invention while preferably used to prop open subterranean formation fractions, can be used in other technologies, such as an additive for cement or an additive for polymers, or other materials that harden, or would benefit. The proppants of the present invention can also be used as encapsulated delivery systems for drugs, chemicals, and the like.

The proppants of the present invention can be used to prop open subterranean formation fractions. The proppant can be suspended in a liquid phase or other medium to facilitate transporting the proppant down the well to a subterranean formation and placed such as to allow the flow of hydrocarbons out of the formation. The medium chosen for pumping the proppant can be any desired medium capable of transporting the proppant to its desired location including, but not limited to, a gas and/or liquid, energized fluid, foam, like aqueous solutions, such as water, brine solutions, and/or synthetic solutions. Any of the proppants of the present invention can have a crush strength sufficient for serving as a proppant to prop open subterranean formation fractures. For instance, the crush strength can be 1,000 psi or greater, 3,000 psi or greater, greater than 4,000 psi, greater than 9,000 psi, or greater than 12,000 psi. Suitable crush strength ranges can be from about 3,000 psi to about 20,000 psi, or from about 5,000 psi to about 20,000 psi, and the like. In some applications, like coal bed methane recovery, a crush strength below 3,000 psi can be useful, such as 500 psi to 3,000 psi, or 1,500 psi to 2,000 psi.

The proppant can be suspended in a suitable gas, foam, energized fluid, or liquid phase. The carrier material, such as a liquid phase is generally one that permits transport to a location for use, such as a well site or subterranean formation. For instance, the subterranean formation can be one where proppants are used to improve or contribute to the flow of hydrocarbons, natural gas, or other raw materials out of the subterranean formation. The present invention also relates to a well site or subterranean formation containing one or more proppants of the present invention.

The proppants of the present invention also can present oil and gas producers with one or more of the following benefits: improved flow rates, improved productive life of wells, improved ability to design hydraulic fractures, and/or reduced environmental impact. The proppants of the present invention also can eliminate or materially reduce the use of permeability destroying polymer gels, and/or reduce pressure drop through the proppant pack, and/or the ability to reduce the amount of water trapped between proppants thereby increasing hydrocarbon "flow area."

The high density of conventional ceramic proppants and sands (roughly 100 lb/cu. ft.) inhibit their transport inside fractures. High density causes proppants to "settle out" when pumped thereby minimizing their efficacy. To maintain dense proppants in solution, expensive polymer gels are typically mixed with the carrier solution (e.g. completion fluid). Once suspended in a gelled completion fluid, proppant transport is considerably enhanced. Polymer gels are extremely difficult to de-cross link, however. As a result, the gel becomes trapped downhole, coats the fracture, and thereby reduces reservoir permeability. Gel-related reservoir permeability "damage factors" can range from 40% to more than 80% depending on formation type. The lightweight high strength buoyancy property that can be exhibited by the proppants of the present invention can eliminate or greatly reduce the need to employ permeability destroying polymer gels, as they naturally stay in suspension. The use of extreme pressure, polymer gels, and/or exotic completion fluids to place ceramic proppants into formations adversely impacts the mechanical strength of the reservoir and shortens its economic life. Proppants of the present invention can enable the use of simpler completion fluids and possibly less (or slower) destructive pumping. Thus, reservoirs packed with buoyant proppants preferably exhibit improved mechanical strength/permeability and thus increased economic life.

Enhanced proppant transport enabled by buoyancy also may enable the placement of the present proppants in areas that were heretofore impossible, or at least very difficult to prop. As a result, the mechanical strength of the formation can be improved, and can reduce decline rates over time. This benefit could be of significant importance, especially within hydraulic fractures ("water fracs") where the ability to place proppants can be extremely limited. If neutrally buoyant proppants are employed, for example, water (fresh to heavy brines) may be used in place of more exotic completion fluids. The use of simpler completion fluids can reduce or eliminate the need to employ de-crossing linking agents. Further, increased use of environmentally friendly proppants may reduce the need to employ other environmentally damaging completion techniques such as flashing formations with hydrochloric acid. In addition to fresh water, salt water and brines, or synthetic fluids are sometimes used in placing proppants to the desired locations. These are of particular importance for deep wells.

While the term proppant has been used to identify the preferred use of the materials of the present invention, it is to be understood that the materials of the present invention can be used in other applications. The proppant of the present invention also can be used to form other products, such as, for example, matrix materials, concrete formulations, composite reinforcement phase, thermal insulating material, electrical insulating material, abrasive material, catalyst substrate and/or support, chromatography column materials (e.g., column packings), reflux tower materials (e.g., reflux tower packings, for instance, in distillation columns), and the like. The proppants may be used in medical applications, filtration, polymeric applications, catalysts, rubber applications, filler applications, drug delivery, pharmaceutical applications, and the like.

The present invention has many advantages, including achieving a monodisperse distribution and/or providing enhanced conductivity and/or permeability, mechanical properties enhancement through microstructural control, and/or case strengthening by core material diffusion, and/or control over defect distribution either by elimination or filling of defects by core material during diffusion or both, and the like.

The present invention will be further clarified by the following examples, which are intended to be exemplary of the present invention.

EXAMPLES

Example 1

In order to evaluate the effect of the desired hollow synthetic template on the mechanical strength of the proppant made with it, a comparative study was carried out with a sacrificial polymeric template and commercially available cenosphere template from Cospheric, LLC, Santa Barbara, Calif. The synthetic proppant (to form a proppant or a non-sacrificial template) was made by spray coating a slurry (as described in Table 8) on a substantially monodisperse highly spherical polyethylene microsphere having an average particle size of 215 microns that was commercially available, followed by burnout of the polyethylene core under a slow heating process and then sintering. The resultant synthetic ceno microspheres were highly spherical, narrow in particle size distribution, and uniform in shell thickness. Proppant sample was made by spray coating of a ceramic slurry on the hollow synthetic template, whereas a control was made by same spray coating of the slurry on the cenosphere template. The samples were sintered for 2 hours at 1250° C. Single sphere crush test was carried out to evaluate the mechanical strength of the samples with 30 sintered proppant beads for each sample. The results are shown in Table 1. It is seen that with the same average sphere size (358 µm), the sample of synthetic template was 58% stronger than the control, even with lower Sg for the synthetic template sample (2.49 vs. 2.56). Since everything else except the structural defects for the sample and the control are the same, the significant improvement in the crush strength of the proppant with the synthetic template is attributed to the substantial elimination of structural defects in the synthetic template.

TABLE 1

Single sphere crush strength of the proppant coated on synthetic template (ST) vs. control coated on regular cenosphere template, both sintered for 2 h at 1250° C.

| System | Sg | Size (µm) | Crush strength (N) | Improvement |
| --- | --- | --- | --- | --- |
| Control | 2.56 | 358 ± 11 | 18.6 ± 2.9 | Control |
| ST Proppant | 2.49 | 358 ± 9 | 29.4 ± 4.1 | 58% |

Example 2

Figure 2:
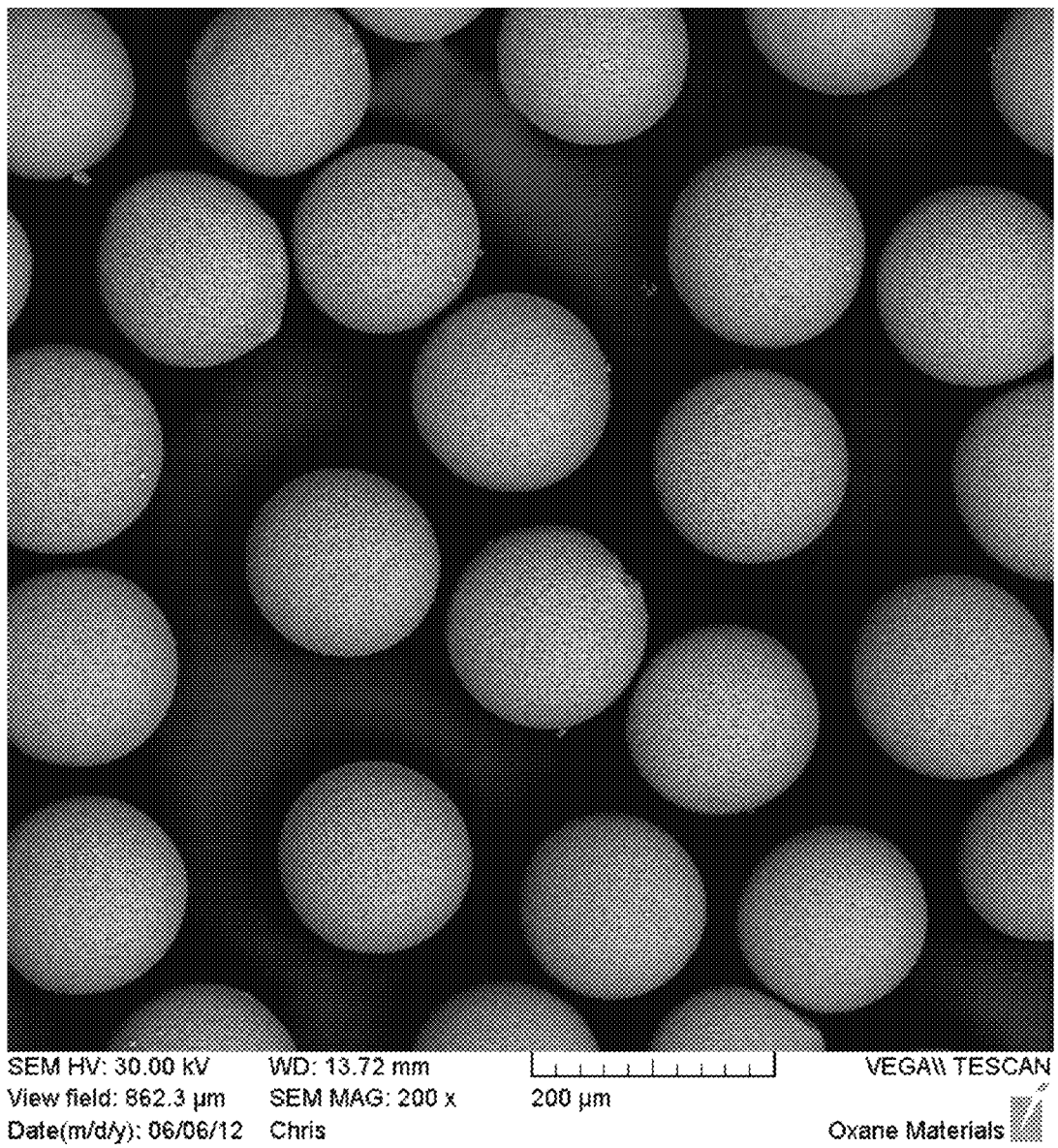
FIG. 2 is a SEM image of higher magnification, compared to FIG. 1, of microspheres of the present invention.
Figure 3:
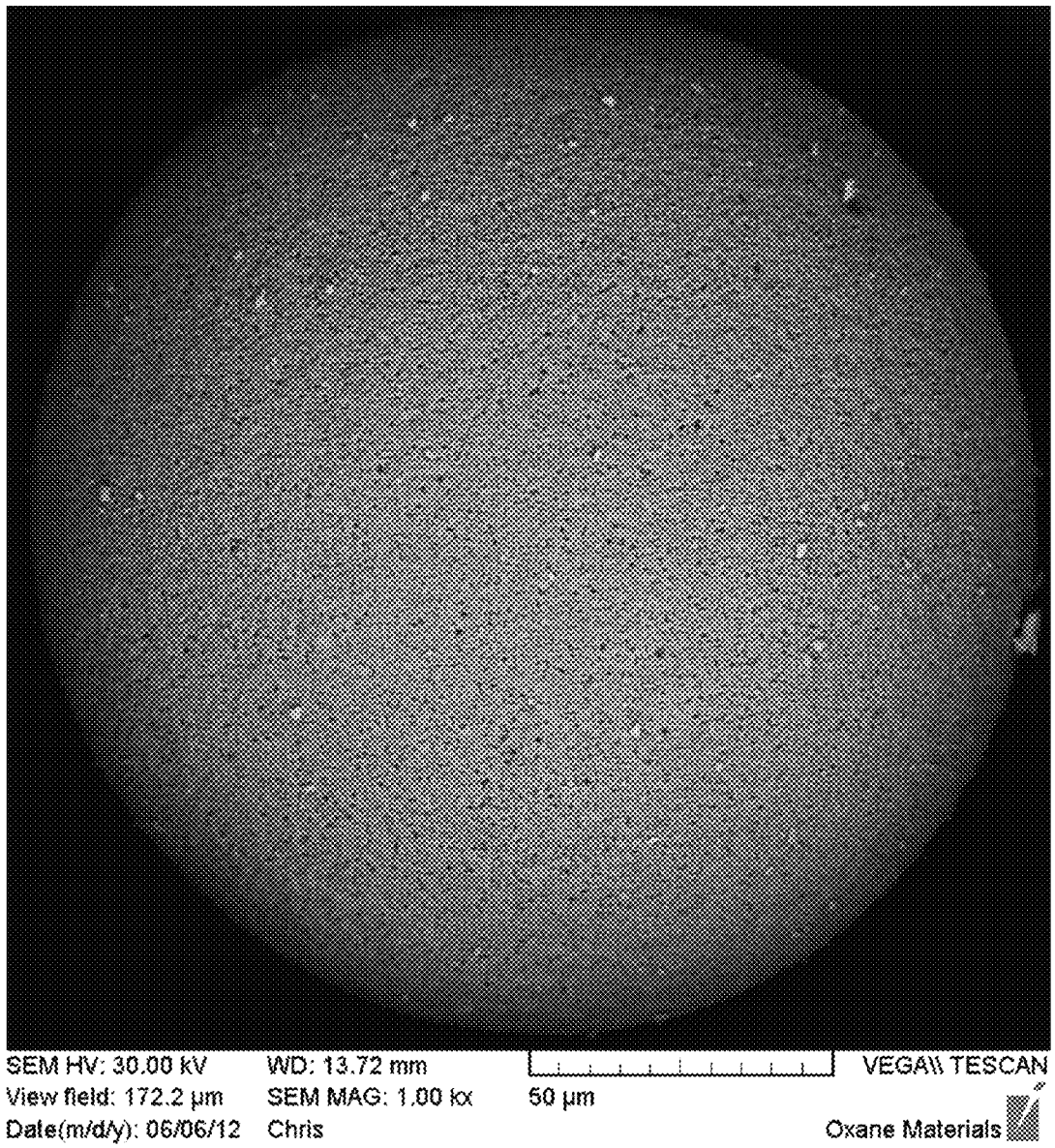
FIG. 3 is a further enlarged SEM image of a microsphere of the present invention.
Figure 4:
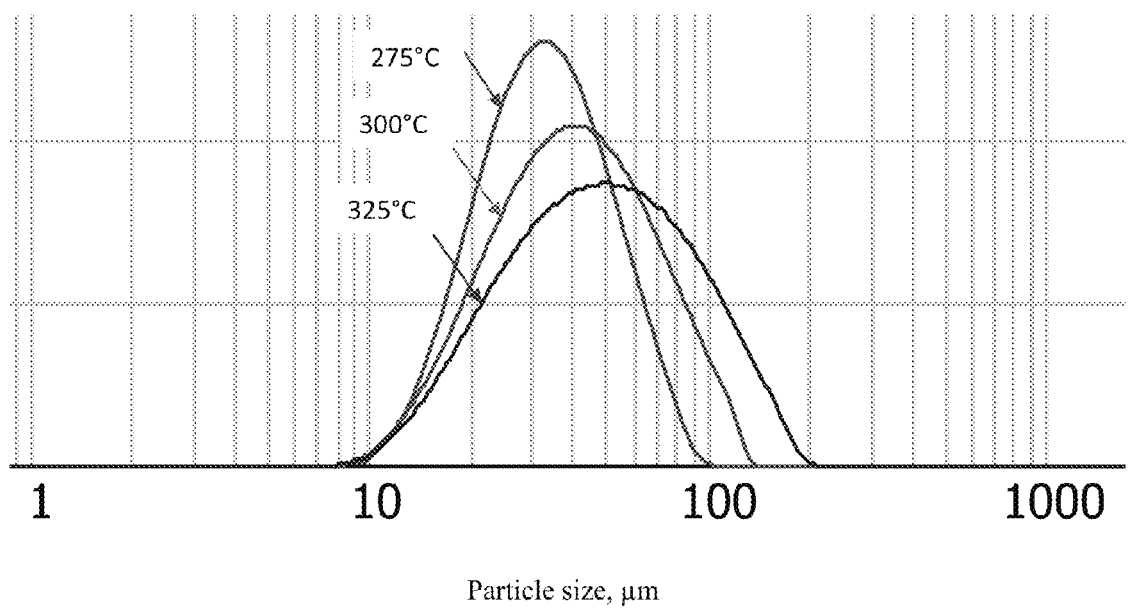
FIG. 4 is a graph showing particle size distribution versus inlet temperature and the effects achieved by adjusting the inlet temperature of the spray dryer.

A slurry of ceramic powder with the following chemical composition (Table 2) and mixing proportions (Table 3) was milled to an average particle size $d_{50}$=1.5 µm. The slurry was then used to make microspheres by spray drying process. The typical morphology of the sample is shown in FIGS. 1-3. FIG. 4 shows the influence of inlet temperature on the particle size distribution of the sintered product. The average particle sizes are listed in Table 4 and 5 with binders AC-112 and AC-95, respectively.

TABLE 2

| Chemical composition of ceramic powder | | | | | | | | | |
| --- | --- | --- | --- | --- | --- | --- | --- | --- | --- |
| Composition | $SiO_2$ | $Al_2O_3$ | $Fe_2O_3$ | MgO | CaO | $Na_2O$ | $K_2O$ | $TiO_2$ | $P_2O_5$ | Others |
| Wt. % | 61.35 | 24.56 | 5.08 | 1.53 | 1.58 | 1.01 | 2.51 | 0.95 | 0.19 | 1.24 |

TABLE 3

| Mixing proportions of spray slurry | | | |
| --- | --- | --- | --- |
| Composition | Ceramic powder | Dispersant | Water | Binder |
| Wt. % | 50 | 0.5 | 46.5 | 3.0 |

These results show that mean particle size of the synthetic templates is dependent upon both the inlet temperature and the outlet temperature. The outlet temperature, for a given inlet temperature, is controlled by the slurry flow rate, and assuming that the nozzle air pressure remains constant, the droplet size will change dependent upon the slurry flow rate, i.e. higher inlet air temperature dictates the use of a higher slurry flow rate to maintain outlet air temperature, by way of evaporative cooling of the process air stream.

TABLE 4

Average sintered particle size ($d_{50}$) in microns influenced by operational parameters ($T_{in}$ = inlet temperature; $T_{out}$ = outlet temperature) with 3% AC-112 binder

| $T_{out}\downarrow$ | $T_{in}$ = 275° C. | $T_{in}$ = 300° C. | $T_{in}$ = 325° C. |
|---|---|---|---|
| 100° C. | 37.1 | 36.4 | 41.3 |
| 105° C. | 30.1 | 31.9 | 30.9 |
| 110° C. | 29.2 | 27.5 | 28.2 |

TABLE 5

Average sintered particle size ($d_{50}$) in microns influenced by operational parameters ($T_{in}$ = inlet temperature; $T_{out}$ = outlet temperature) with 5% AC-95 binder

| $T_{out}\downarrow$ | $T_{in}$ = 275° C. | $T_{in}$ = 300° C. | $T_{in}$ = 325° C. |
|---|---|---|---|
| 100° C. | 33.9 | 40.0 | 48.4 |
| 105° C. | 33.5 | 38.7 | 47.8 |
| 110° C. | 33.7 | 37.5 | 47.2 |

As can be seen in Table 4, by adjusting the inlet temperature, the averaged sintered particle size of the proppant or proppant template can be controlled. For instance, as the inlet temperature is increased, the averaged sintered particle size can be increased to a certain extent. Similarly, the outlet temperature, as it is increased, can decrease the averaged sintered particle size. Similar results are shown in Table 5, where more binder was present in the green body and a significant change in the $d_{50}$ size of the sintered particle occurred due to changing the inlet temperature. As stated, Tables 4 and 5 show the averaged sintered particle size, but the reference to inlet temperature and outlet temperature is with respect to the spray dryer and the processing of the green body. In these examples, the sintering of the green body occurred at 1,000° C. for 30 minutes.

Example 3

In these examples, various slurries were prepared for spray drying in order to make ceramic green bodies that ultimately formed the core. In Table 6 below, the slurry was prepared by milling the additives that comprised the slurry to achieve a $d_{50}$ of 1.5 microns. Then, the milled additives were added to water to form a slurry. The slurry in Table 6 had the following ingredients:

Crushed TG-425 cenospheres

Dispersant (Dolapix CE-64)

Binder (Optapix AC95 or Optapix AC 112)

Water.

Table 6 sets forth the binder content, viscosity, density, solid weight percent, and surface tension, as well as the Z number.

Further, Table 7 below provides examples of slurry which had poor sprayability based on observed results. The slurry used was also prepared by milling the ingredients to have a $d_{50}$ of about 1.5 microns and then forming a slurry as above. The slurry had the following ingredients:

Flyash

Dispersant (Dolapox CE-64)

Binder (Optapix AC95 or Optapix AC112)

Water

TABLE 6

Examples of slurries with good workability for spray drying

| Slurry | $d_{50}$, μm | Binder | Solid % | η | σ | ρ | Z |
|---|---|---|---|---|---|---|---|
| 1 | 2.13 | AC-95 | 52.9 | 1.71 | 0.060 | 1458 | 12.88 |
| 2 | 2.13 | AC-95 | 54.7 | 2.25 | 0.063 | 1460 | 16.64 |
| 3 | 2.13 | AC-112 | 53.4 | 2.07 | 0.072 | 1460 | 14.25 |
| 4 | 2.13 | AC-112 | 54.6 | 2.25 | 0.093 | 1459 | 13.67 |

Notes:
η represents viscosity in Pa · s, measured at 20 RPM; σ, surface tension in N/m; ρ, density of the slurry, kg/m³; Z, Ohnesorge number, dimensionless.

TABLE 7

Examples of slurries with poor sprayability (must be modified to be spray dried)

| Slurry | $d_{50}$, μm | Binder (%) | Solid % | η | σ | ρ | Z |
|---|---|---|---|---|---|---|---|
| 1 | 1.50 | AC-95 (5) | 54.7 | 0.056 | 0.099 | 1510 | 0.33 |
| 2 | 1.50 | AC-95(7) | 54.8 | 0.053 | 0.104 | 1490 | 0.30 |
| 3 | 1.50 | AC-112(5) | 55.9 | 0.030 | 0.099 | 1490 | 0.17 |
| 4 | 1.50 | AC-112(7) | 55.5 | 0.039 | 0.133 | 1490 | 0.20 |

Notes:
η represents viscosity in Pa · s, measured at 20 RPM; σ, surface tension in N/m; ρ, density of the slurry, kg/m³; Z, Ohnesorge number, dimensionless.

Thus, as shown in this example, various parameters can affect desirable properties, such as the ability to obtain monodispersed and high spherical proppants on a uniform basis.

Example 4

As set forth in Table 8 below, six proppants were made from a slurry formulation specified in the table In each case, the solids content of the slurry formulation was 36 wt %. In addition, the coating slurry contained 22% perlite, 63% alumina, 15% nepheline syenite, and 5% ball clay, each based on wt % based on the overall weight of the slurry. Table 8 also sets forth the $d_{50}$, particle size for the slurry formulation. In addition, Table 9 sets forth the sintered body $d_{50}$ size, the green and sintered body sphericity based on Krumbein, and the resulting sintered size provided in both μm and mesh. Also, Table 9 sets forth the amount of crush fines on average generated from a crush strength test of 20,000 psi and a crush strength test based on 25,000 psi following API RP-60 standard. Finally, the resulting $d_{50}$ size of the sintered proppant, as well as the sphericity of the sintered proppant and the standard deviation (Sigma), is provided. As can be seen, the green body sphericity, as well as the sintered proppant sphericity, were immensely high and thus close to one for sphericity. Further, the finished Sigma (the Sigma of the sintered product) was an extremely tight particle distribution, thus showing the highly consistent proppant, that can be made in the methods of the present application. Further to this, Table 10 presents the data for single sphere strength measurement data for proppants comparing the control sample which is based on the coating of cenospheres with the comparative proppant sample utilizing synthetic templates, highlighting the significant strength increases in the proppant that are realized from the use of synthetic templates. Table 11 presents the measured data for the crush test results for as assemblage of proppant particles tested according to API RP-60. Of note is the significant increase in crush strength at both test loadings of 15 ksi and 20 ksi.

TABLE 8

Components of the slurry for spray coating on synthetic template (wt. %)

| Perlite | Alumina | Nepheline Syenite | $d_{50}$, μm | Solid content |
|---|---|---|---|---|
| 22% | 63% | 15% | 1.5 | 36% |

TABLE 9

Properties of the proppants prepared with the spray dried synthetic template

| | | | | | Sphericity | | Crush fines, % | |
|---|---|---|---|---|---|---|---|---|
| Serial No. | Code | SG | Mesh | $d_{50}$, μm | Green | Sintered | 20 ksi | 25 ksi |
| 1 | VBP394A | 2.80 | 40/50 | 325 ± 23 | 0.971 | 0.967 | 4.31 | 7.37 |
| 2 | VBP397A | 2.89 | 40/50 | 321 ± 24 | 0.971 | 0.968 | 3.54 | 6.26 |
| 3 | VBP401A | 2.89 | 40/50 | 320 ± 28 | 0.968 | 0.969 | 4.35 | 7.78 |
| 4 | VBP394B | 2.84 | 30/40 | 475 ± 28 | 0.974 | 0.970 | 5.63 | 8.22 |
| 5 | VBP397B | 2.97 | 30/40 | 482 ± 30 | 0.973 | 0.970 | 5.43 | 9.39 |
| 6 | VBP401B | 2.95 | 30/40 | 475 ± 35 | 0.976 | 0.970 | 5.82 | 10.13 |

TABLE 10

Single sphere strength of the proppant based on synthetic template Vs cenosphere (control)

| Sample # | Type | No. tested | Size, μm | Crush strength, N | Δ% |
|---|---|---|---|---|---|
| 4070C | Control | 30 | 355.3 ± 10.7 | 26.4 ± 5.2 | — |
| 4070S | Sample | 30 | 350.0 ± 11.7 | 30.9 ± 5.2 | 17.0 |
| 3050C | Control | 30 | 495.0 ± 10.1 | 60.1 ± 10.5 | — |
| 3050S | Sample | 30 | 495.0 ± 11.1 | 71.1 ± 12.1 | 18.3 |

TABLE 11

Crush test results of proppant based on synthetic template vs. cenosphere (control)

| Code | Note | Sg | 15 ksi fines % | 18 ksi fines % |
|---|---|---|---|---|
| 4070C | Ceno | 2.83 | 3.95 ± 0.35 | 6.07 ± 0.87 |
| 4070S | Sample | 2.94 | 3.10 ± 0.14 | 3.85 ± 0.07 |
| Difference | Δ% | +3.52 | −21.52 | −36.57 |
| 3050C | Control | 2.90 | 5.40 ± 0.14 | 7.5 ± 0.42 |
| 3050S | Sample | 2.99 | 4.75 ± 0.07 | 5.95 ± 0.07 |
| Difference | Δ% | +3.1 | −12.03 | −20.67 |

Example 5

An aqueous slurry of flyash (Bowen UFF) with a 5 wt % super addition of ball clay was milled to a mean particle size ($d_{50}$) of approximately 1.5 microns and a solids loading of 52 wt %. No organic binder was added to this slurry prior to spray drying. Spray drying was carried out in a GEA/Niro Mobile Minor spray dryer with the following parameters: Inlet temperature 280° C., Outlet Temperature 116° C., atomizing air pressure 0.4 bar, slurry flow rate approximately 0.25 kg/min, using a two-fluid air atomizing nozzle fitted to the spray dryer in a counter current (or fountain) orientation. Examination of the spheres generated during the spray drying process revealed the formation of phases as layers on the sphere. The segregation of the lighter residual carbon phase towards the surface of the sphere occurred during the drying operation with concentration of the segregated carbon to a localized area on the surface of the sphere.

Example 6

1,175 kg of synthetic template of the present invention were admitted to the process chamber of the fluid bed coater. The coater was operated following the production process parameters with respect to airflow, slurry flow rate, temperatures and nozzle pressures, using the production coating formulation. The total cycle time for the batch was 8.93 hours with a final total green proppant weight of 15,509 kg, yielding a proppant production rate of 1,737 kg/hr. By comparison, the non-synthetic cenosphere template utilized in the same process generated a total final weight of 11,936 kg with a cycle time of 8 hours, yielding a proppant production rate of 1,525 kg/hr. The synthetic template based proppant displayed an approximate 15% increase in production rate using the same operating parameters for the process.

Sintering the above green proppant in a batch rotary kiln yielded proppant in the 40 mesh to 50 mesh size range with a specific gravity of 2.87 with crush fines of 4.04 wt % and 8.08 wt % at 15 ksi and 20 ksi respectively.

Example 7

As a further example, a series of proppant samples were fabricated using various formulations that are presented in Table 12. The template particles, both synthetic and standard cenospheres were coated in a fluid bed coater and sintered in air at 1275° C. for 30 minutes. Two distinct heating rates were used for this study, i.e. 7.8° C./min from ambient to 1051° C., followed by a heating rate of 0.63° C./min to the final sintering temperature of 1275° C. This heating rate was used for both the standard cenosphere control samples and the synthetic template samples. The use of synthetic template for the production of the proppant yielded a significant improvement in strength with a minimal impact on specific gravity of the proppant. The crush fines were seen to decrease up to 70% through the use of the synthetic template when compared to the standard cenospheres. The specific gravity of the proppant using synthetic template was seen to increase by approximately 5% over the standard cenospheres. The proppant properties are presented in Table 13.

TABLE 12

Designations of the coating formulations

| | Major Components (wt. %) | | | Additives | | |
|---|---|---|---|---|---|---|
| No. | Bauxite | RC-1 | Pumice | Ball Clay | Dolapix | Cerafix |
| 1 | 40 | 30 | 30 | 5 | 1.25 | 1.30 |
| 2 | 32 | 38 | 30 | 5 | 1.25 | 1.30 |
| 3 | 10 | 40 | 50 | 5 | 1.25 | 1.30 |

TABLE 13

The 40/50 ST-based proppant vs. control (cenosphere-based)

| Run No. | Formula. | Templ. | BD | SG | Fines@18 ksi | Fines@20 ksi |
|---|---|---|---|---|---|---|
| P02834 | 1 | ST | 1.72 | 2.97 | 3.0; 2.7 | 3.7; 3.3 |
| P02842 | 1 | Ceno | 1.62 | 2.81 | 8.8; 8.0 | 10.8; 9.8 |
| P02855 | 2 | ST | 1.61 | 2.82 | 4.3; 4.0 | 5.3; 4.9 |
| P02835 | 2 | Ceno | 1.55 | 2.70 | 14.2; 13.2 | 17.5; 16.2 |
| P02812 | 3 | ST | 1.57 | 2.72 | 4.5; 4.9 | 5.5; 6.0 |

The present invention includes the following aspects/embodiments/features in any order and/or in any combination:

1. The present invention relates to a plurality of sintered ceramic proppants having a mean particle size, wherein the sintered ceramic proppants are monodispersed with a distribution that is a 3-sigma distribution or lower with a width of the total distribution being 5% or less of the mean particle size.

2. The plurality of sintered ceramic proppants of any preceding or following embodiment/feature/aspect, wherein said distribution is a 2-sigma distribution or lower.

3. The plurality of sintered ceramic proppants of any preceding or following embodiment/feature/aspect, wherein the distribution is a 1-sigma distribution.

4. The plurality of sintered ceramic proppants of any preceding or following embodiment/feature/aspect, wherein said sintered ceramic proppants comprise aluminum oxide, silicon dioxide, and one or more mixed metal aluminum oxides.

5. The plurality of sintered ceramic proppants of any preceding or following embodiment/feature/aspect, wherein said sintered ceramic proppants have a specific gravity of from 0.6 to 4.

6. The plurality of sintered ceramic proppants of any preceding or following embodiment/feature/aspect, wherein said proppants have a crush strength of from 5,000 psi to 30,000 psi.

7. The plurality of sintered ceramic proppants of any preceding or following embodiment/feature/aspect, wherein said sintered ceramic proppants have a Krumbein sphericity of at least 0.9.

8. The plurality of sintered ceramic proppants of any preceding or following embodiment/feature/aspect, wherein said sintered ceramic proppants have a particle size of from about 100 microns to 3,000 microns.

9. The plurality of sintered ceramic proppants of any preceding or following embodiment/feature/aspect, wherein said sintered ceramic proppants comprise a core and at least one shell around said core.

10. The plurality of sintered ceramic proppants of any preceding or following embodiment/feature/aspect, wherein said sintered ceramic proppants comprise a core and a shell, wherein a central void is present within said core.

11. A method of making a sintered ceramic proppant comprising forming a spherical green body core comprising one or more ceramic particulate materials;
forming, at the same time or afterwards, a green body shell around said green body core, wherein said green body shell comprises at least one ceramic particulate material which results in a green core/shell body;
sintering said green core/shell body, and, during sintering, diffusing at least a portion of said green body core into said green body shell to form a sintered ceramic proppant having a) a central void or a plurality of hollow regions and b) a shell.

12. The method of any preceding or following embodiment/feature/aspect, wherein said central void or plurality of hollow regions comprises at least 5% by volume of the overall volume of the sintered ceramic proppant.

13. The method of any preceding or following embodiment/feature/aspect, wherein said diffusing results in at least 1% by weight of said green body core diffusing into said shell.

14. The method of any preceding or following embodiment/feature/aspect, wherein said diffusing results in at least 10% by weight of said green body core diffusing into said shell.

15. The method of any preceding or following embodiment/feature/aspect, wherein said diffusing results in at least 30% by weight of said green body core diffusing into said shell.

16. The method of any preceding or following embodiment/feature/aspect, wherein the green body shell has a softening temperature that is higher than the softening temperature of the green body core.

17. The method of any preceding or following embodiment/feature/aspect, wherein said green body shell has a softening temperature of at least 100° C. higher than the softening temperature of the green body core.

18. The method of any preceding or following embodiment/feature/aspect, wherein the softening temperature of the green body shell is from about 300° C. to about 400° C. higher than the softening temperature of the green body core.

19. The method of any preceding or following embodiment/feature/aspect, wherein the green body shell has a porosity of at least 10% by volume based on the volume of the green body shell.

20. The method of any preceding or following embodiment/feature/aspect, wherein the green body shell has a porosity of at least 30% by volume based on the volume of the green body shell.

21. The method of any preceding or following embodiment/feature/aspect, wherein said sintered ceramic proppant has at least 10% porosity in the sintered shell.

22. A plurality of sintered ceramic proppants having a Krumbein sphericity of at least 0.92.

23. The plurality of sintered ceramic proppants of any preceding or following embodiment/feature/aspect, wherein said Krumbein sphericity is 0.95 to 0.99.

24. The method of any preceding or following embodiment/feature/aspect, wherein the slurry has an Ohnesorge Number (Z) of from 1 to 10.

25. The method of any preceding or following embodiment/feature/aspect, wherein the slurry has an Ohnesorge Number (Z) of from 2 to 10.

26. The method of any preceding or following embodiment/feature/aspect, wherein the slurry has an Ohnesorge Number (Z) of from 4 to 6.

27. A proppant comprising a plurality of micron particles that are sintered together, wherein said micron particles have a unimodal particle distribution, wherein said micron particles have a $d_{50}$ of 0.5 micron to 3.5 microns.

28. The proppant of any preceding or following embodiment/feature/aspect, wherein said proppant has a plurality of pores having a pore volume wherein a majority of the pore volume results from interstitial gaps formed between the micron particles.

29. The proppant of any preceding or following embodiment/feature/aspect, wherein the proppant is spherical and have a Krumbein sphericity of at least about 0.9 and/or a roundness of at least about 0.9.

30. The proppant of any preceding or following embodiment/feature/aspect, wherein the pore volume is from about 1% to 30% based upon the total volume of said proppant.

31. The proppant of any preceding or following embodiment/feature/aspect, wherein the pore volume is from about 5% to 20% based upon the total volume of said proppant.

32. The proppant of any preceding or following embodiment/feature/aspect, wherein said proppant has a specific gravity of from 0.8 to 4.

33. The proppant of any preceding or following embodiment/feature/aspect, wherein said proppant has a specific gravity of from about 1 to 3.5.

34. The proppant of any preceding or following embodiment/feature/aspect, wherein said proppant has a $d_{10}$ that is within 100% of the $d_{50}$.

35. The proppant of any preceding or following embodiment/feature/aspect, wherein said proppant has a $d_{10}$ that is within 50% of the $d_{50}$.

36. The proppant of any preceding or following embodiment/feature/aspect, wherein said proppant has a $d_{90}$ that is within 100% of the $d_{50}$.

37. The proppant of any preceding or following embodiment/feature/aspect, wherein said proppant has a $d_{90}$ that is within 50% of the $d_{50}$.

38. The proppant of any preceding or following embodiment/feature/aspect, wherein said proppant has a $d_{10}$ that is within 100% of the $d_{50}$ and has a $d_{90}$ that is within 100% of the $d_{50}$.

39. The proppant of any preceding or following embodiment/feature/aspect, wherein said proppant has a core and at least one shell on said core.

40. The proppant of any preceding or following embodiment/feature/aspect, wherein said core comprises said plurality of micron particles that are sintered together.

41. The proppant of any preceding or following embodiment/feature/aspect, wherein said shell comprises a plurality of micron particles that are sintered together.

42. The proppant of any preceding or following embodiment/feature/aspect, wherein said proppant is in the absence of a binder.

43. The proppant of any preceding or following embodiment/feature/aspect, wherein said proppant is in the absence of a polymer.

44. The proppant of any preceding or following embodiment/feature/aspect, wherein the core comprises a plurality of micron particles that are sintered together, wherein said micron particles have a bimodal particle distribution with a modal A particle distribution and a modal B particle distribution.

45. The proppant of any preceding or following embodiment/feature/aspect, wherein said micron particles of each modal have a $d_{50}$ of 0.5 micron to 3.5 microns, and modal A has a $d_{50}$ that is at least 10% different from the $d_{50}$ of modal B.

46. The proppant of any preceding or following embodiment/feature/aspect, wherein said micron particles of each modal have a $d_{50}$ of 0.5 micron to 3.5 microns, and modal A has a $d_{50}$ that is at least 20% different from the $d_{50}$ of modal B.

47. The proppant of any preceding or following embodiment/feature/aspect, wherein said micron particles of each modal have a $d_{50}$ of 0.5 micron to 3.5 microns, and modal A has a $d_{50}$ that is from 10% to 100% different from the $d_{50}$ of modal B.

48. A proppant comprising a core and a shell, wherein said core is a ceramic or oxide core, and said shell comprises at least one ceramic material, and said proppant has a core strength to shell strength ratio of from 0.8 to 1.

49. The proppant of any preceding or following embodiment/feature/aspect, wherein said proppant has an overall proppant strength to core strength ratio of from 2 to 3.

50. The proppant of any preceding or following embodiment/feature/aspect, wherein said proppant has a specific gravity of 2.6 to 4.5.

51. The proppant of any preceding or following embodiment/feature/aspect, wherein core is a synthetic core.

52. The method of any preceding or following embodiment/feature/aspect, wherein said green core is solid prior to said sintering.

53. The method of any preceding or following embodiment/feature/aspect, wherein said central void has a shape and size of said green core or a portion thereof.

54. The method of any preceding or following embodiment/feature/aspect, wherein whiskers or fibers are formed in-situ in said shell during said sintering and as a result of said diffusing.

55. The method of any preceding or following embodiment/feature/aspect, wherein said diffusing of the green body core or portion thereof into the shell results in a gradient of wherein a higher concentration of the core is present closer to the core than to an exterior outer surface of the proppant.

56. The method of any preceding or following embodiment/feature/aspect, wherein said spherical green body, green body shell, or both further comprise at least one nucleating agent.

57. The method of any preceding or following embodiment/feature/aspect, wherein said ceramic particulate materials comprise cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic or any combination thereof.

58. The method of any preceding or following embodiment/feature/aspect, wherein said ceramic particulate materials comprise one or more sedimentary materials or synthetically produced materials or both.

59. The method of any preceding or following embodiment/feature/aspect, wherein said spherical green body core and said green body shell are in the absence of igneous or metamorphic materials.

60. The plurality of sintered ceramic proppants of any preceding or following embodiment/feature/aspect, wherein said sintered ceramic proppants have less than 1% by weight of proppant of igneous or metamorphic materials.

61. The method of any preceding or following embodiment/feature/aspect, wherein the green body or a portion thereof has a density, as measured by a gas pycnometer, such that the average density (g/cm$^3$) does not alter by more than 1% between the density of the whole green body compared to the density of the crushed green body.

62. The method of any preceding or following embodiment/feature/aspect, wherein the average density changes 0.005% or less.

63. The method of any preceding or following embodiment/feature/aspect, wherein one or more mobile phases are formed in droplets of the slurry that forms the green body and one phase migrates to the surface of the droplet, which causes a multi-phase droplet to form.

64. The method of any preceding or following embodiment/feature/aspect, wherein said multi-phase droplet forms a non-uniform green body of phases.

65. The method of any preceding or following embodiment/feature/aspect, wherein said non-uniform green body of phases diffuses at different rates into said shell with respect to the phases.

66. The method of any preceding or following embodiment/feature/aspect, wherein said green body core comprises at least 50% by weight, based on the weight of the green body core of glassy material, and said green body shell comprises at least 50% crystalline material.

67. The method of any preceding or following embodiment/feature/aspect, wherein said green body core comprises at least 75% by weight, based on the weight of the green body core of glassy material, and said green body shell comprises at least 75% crystalline material.

68. The method of any preceding or following embodiment/feature/aspect, wherein said green body core comprises at least 95% by weight, based on the weight of the green body core of glassy material, and said green body shell comprises at least 95% crystalline material.

69. The method of any preceding or following embodiment/feature/aspect, wherein the particles used to form the green body core are at least 10% smaller in average mean size ($d_{50}$ size) compared to the mean particle size ($d_{50}$ size) of the particles that form the green body shell.

70. The method of any preceding or following embodiment/feature/aspect, wherein the particles used to form the green body core are at least 50% smaller in average mean size ($d_{50}$ size) compared to the mean particle size ($d_{50}$ size) of the particles that form the green body shell.

71. The method of any preceding or following embodiment/feature/aspect, wherein the particles used to form the green body core are at least 100% smaller in average mean size ($d_{50}$ size) compared to the mean particle size ($d_{50}$ size) of the particles that form the green body shell.

72. The method of any preceding or following embodiment/feature/aspect, wherein the ceramic particulate materials that form the green body or a part thereof has the following standard deviation range based on the indicated mean particle size range:

100-299 µm, $\sigma$=0.83-2.5
300-499 µm, $\sigma$=2.5-4.16
500-799 µm, $\sigma$=4.16-6.66
800-999 µm, $\sigma$=6.66-8.33
1000-1499 µm, $\sigma$=8.33-12.5
1500-2000 µm, $\sigma$=12.5-16.66.

73. The method of any preceding or following embodiment/feature/aspect, wherein the ceramic particulate materials that form the green body or a part thereof has a monodisperse particle distribution such that $$d_s = \frac{(d_{90} - d_{10})}{d_{50}}$$

where $d_{90}$, $d_{50}$ and $d_{10}$ are the 90$^{th}$, 50$^{th}$, and 10$^{th}$ percentiles of the particle size distribution respectively, wherein $0.00 < d_s \leq 0.05$.

74. The plurality of sintered ceramic proppants of any preceding or following embodiment/feature/aspect, wherein said sintered ceramic proppants comprise at least one ceramic, wherein said ceramic comprises cordierite, mullite, bauxite, silica, spodumene, clay, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide or a non-oxide ceramic or any mixtures thereof.

75. The plurality of sintered ceramic proppants of any preceding or following embodiment/feature/aspect, wherein said sintered ceramic proppants comprise at least one ceramic, wherein said ceramic comprises a glass-ceramic.

76. The plurality of sintered ceramic proppants of any preceding or following embodiment/feature/aspect, wherein said sintered ceramic proppants comprise at least one ceramic, wherein said ceramic comprises aluminum oxide, silicon oxide, titanium oxide, iron oxide, magnesium oxide, calcium oxide, potassium oxide and/or sodium oxide, or any combination thereof.

77. A plurality of sintered ceramic proppants having a mean particle size, wherein the sintered ceramic proppants are monodispersed with a standard deviation of 3 or less.

78. The plurality of sintered ceramic proppants of any preceding or following embodiment/feature/aspect, wherein said standard deviation is 2.75 or less.

79. The plurality of sintered ceramic proppants of any preceding or following embodiment/feature/aspect, wherein said standard deviation is 2 or less.

80. The plurality of sintered ceramic proppants of any preceding or following embodiment/feature/aspect, wherein said standard deviation is 1 or less.

81. The plurality of sintered ceramic proppants of any preceding or following embodiment/feature/aspect, wherein said standard deviation is 0.5 or less.

82. The plurality of sintered ceramic proppants of any preceding or following embodiment/feature/aspect, wherein said standard deviation is from 0.5 to 3.

83. A plurality of ceramic proppants having a mean particle size, wherein the ceramic proppants are monodispersed and have a coefficient of variance (CV) of 8% or less.

84. The plurality of ceramic proppants of any preceding or following embodiment/feature/aspect, wherein said coefficient of variance is from about 5% to 8%.

85. The plurality of ceramic proppants of any preceding or following embodiment/feature/aspect, wherein said ceramic proppants are sintered.

86. The plurality of ceramic proppants of any preceding or following embodiment/feature/aspect, wherein said ceramic proppants are green bodies.

87. The plurality of ceramic proppants of any preceding or following embodiment/feature/aspect, wherein said ceramic proppants are green bodies having a core and shell.

88. A ceramic proppant that comprises at least one ceramic, wherein said proppant has a change in sphericity of 5% or less.

89. The ceramic proppant of any preceding or following embodiment/feature/aspect, wherein said change of sphericity is 3% or less.

90. The ceramic proppant of any preceding or following embodiment/feature/aspect, wherein said change of sphericity is from about 0.5% to 5%.

91. The ceramic proppant of any preceding or following embodiment/feature/aspect, wherein said ceramic proppant is sintered.

92. The ceramic proppant of any preceding or following embodiment/feature/aspect, wherein said ceramic proppant is a green body.

93. The ceramic proppant of any preceding or following embodiment/feature/aspect, wherein said ceramic proppant is a green body having a core and shell.

94. A ceramic proppant comprising at least one ceramic and having a strength/porosity relationship at a load of 20,000 psi of from 0.4 to 0.9.

95. The ceramic proppant of any preceding or following embodiment/feature/aspect, wherein said strength/porosity relationship at a load of 20,000 psi is from 0.46 to 0.88.

96. The ceramic proppant of any preceding or following embodiment/feature/aspect, wherein said strength/porosity relationship at a load of 20,000 psi is from 0.5 to 0.8.

97. A ceramic proppant comprising at least one ceramic and having a measured specific gravity that is within 10% of a specific gravity calculated from a measured bulk density of the ceramic proppant.

98. The ceramic proppant of any preceding or following embodiment/feature/aspect, wherein said measured specific gravity is within 5% of the specific gravity calculated from the measured bulk density.

99. The ceramic proppant of any preceding or following embodiment/feature/aspect, wherein said measured specific gravity is within 1% of the specific gravity calculated from the measured bulk density.

100. The ceramic proppant of any preceding or following embodiment/feature/aspect, wherein said measured specific gravity is within 0.1% of the specific gravity calculated from the measured bulk density.

101. The ceramic proppant of any preceding or following embodiment/feature/aspect, wherein said ceramic proppant has a maximum load of at least 18 N.

102. The ceramic proppant of any preceding or following embodiment/feature/aspect, wherein said ceramic proppant has a maximum load of from 20 N to 100 N.

103. The ceramic proppant of any preceding or following embodiment/feature/aspect, wherein said ceramic proppant has a maximum load of from 40 N to 80 N.

104. A plurality of sintered ceramic proppants comprising at least one ceramic, wherein said plurality of proppants have an average crush strength in psi as determined per single proppant and a coefficient of variance of the proppants for individual crush strength is 20% or less.

105. The plurality of sintered ceramic proppants of any preceding or following embodiment/feature/aspect, wherein said coefficient of variance is from 5% to 20%.

106. The plurality of sintered ceramic proppants of any preceding or following embodiment/feature/aspect, wherein said coefficient of variance is from 5% to 15%.

107. The plurality of sintered ceramic proppants of any preceding or following embodiment/feature/aspect, wherein said coefficient of variance is from 10% to 20%.

108. The plurality of sintered ceramic proppants of any preceding or following embodiment/feature/aspect, wherein said plurality is at least one kilogram of proppant.

109. A plurality of sintered ceramic proppants comprising at least one ceramic, wherein said plurality of proppants have a coefficient of variance for size (size CV) of 10% or less, and the same plurality of proppants have a coefficient of variance for the shape (shape CV) of 5% or less.

110. The plurality of sintered proppants of any preceding or following embodiment/feature/aspect, wherein the sintered proppants have a sphere shape.

111. The plurality of sintered ceramic proppants of any preceding or following embodiment/feature/aspect, wherein said plurality of proppants have said coefficient of variance for size (size CV) of 1% to 10%, and the same plurality of proppants have said coefficient of variance for the shape (shape CV) of 0.5 to 5%.

112. The plurality of sintered ceramic proppants of any preceding or following embodiment/feature/aspect, wherein said plurality of proppants have said coefficient of variance for size (size CV) of 1% to 6%, and the same plurality of proppants have said coefficient of variance for the shape (shape CV) of 0.5 to 3%.

113. The plurality of sintered ceramic proppants of any preceding or following embodiment/feature/aspect, wherein said plurality of proppants have said coefficient of variance for size (size CV) of 3% to 8%, and the same plurality of proppants have said coefficient of variance for the shape (shape CV) of 0.5 to 3%.

114. A sintered ceramic proppant comprising at least one ceramic, and a ceramic core that is synthetic and at least one ceramic shell, wherein said ceramic core, at a 20,000 psi crush test under API 60, has a 20,000 psi crush fines that average 5.5% or less.

115. The sintered ceramic proppant of any preceding or following embodiment/feature/aspect, wherein said 20,000 psi crush fines average 3% or less.

116. The sintered ceramic proppant of any preceding or following embodiment/feature/aspect, wherein said 20,000 psi crush fines average from 0.5% to 5%.

117. The sintered ceramic proppant of any preceding or following embodiment/feature/aspect, wherein the ceramic core has a sintered $d_{50}$ size of 500 microns or less.

118. The sintered ceramic proppant of any preceding or following embodiment/feature/aspect, wherein the ceramic core has a sintered $d_{50}$ size of from 100 microns to 500 microns.

119. The sintered ceramic proppant of any preceding or following embodiment/feature/aspect, wherein the ceramic core has a sintered $d_{50}$ size of from 300 microns to 475 microns.

120. The sintered ceramic proppant of any preceding or following embodiment/feature/aspect, wherein the ceramic core has a sintered $d_{50}$ size of 500 microns or less and a specific gravity of 3 sg or lower.

121. The sintered ceramic proppant of any preceding or following embodiment/feature/aspect, wherein the ceramic core has a sintered $d_{50}$ size of 500 microns or less and a specific gravity of from 2 sg to 2.9 sg.

122. A plurality of ceramic proppants having a crush resistance number based on the overall crush fine ratio, where $$\text{crush resistance Number } (CR) = \{[D \times Sd_{50}]/[CF \times P]\} \times 10^6$$

wherein CF represents the amount (by weight % in fraction) of the crushed fines from a 20,000 psi crush test and is an average and based on API RP-60, and weight % is based on the total amount of particles being subjected to the crush test, D represents the density of the proppants in g/cm$^3$, $Sd_{50}$ represents sintered $d_{50}$ size of the proppants in microns, and P is crush fine measurement pressure in g/cm$^2$, and wherein said crush resistance number is from 0.5 to 3.

123. The plurality of ceramic proppants of any preceding or following embodiment/feature/aspect, wherein said crush resistance number is from 0.75 to 2.5.

124. The plurality of ceramic proppants of any preceding or following embodiment/feature/aspect, wherein said crush resistance number is from 1 to 2.

125. A ceramic proppant comprising a ceramic synthetic core or template, wherein said ceramic proppant has a strength to porosity ratio, determined by measuring crush strength (psi) of the ceramic proppant and dividing by amount of porosity (% volume) (including any central void) that is present in the ceramic proppant, and said strength to porosity ratio is from $5 \times 10^4$ to $50 \times 10^4$.

126. The ceramic proppant of any preceding or following embodiment/feature/aspect, wherein said strength to porosity ratio is from $5 \times 10^4$ to $30 \times 10^4$.

127. The ceramic proppant of any preceding or following embodiment/feature/aspect, wherein said strength to porosity ratio is from $15 \times 10^4$ to $30 \times 10^4$.

128. The ceramic proppant of any preceding or following embodiment/feature/aspect, wherein said strength to porosity ratio is from $5 \times 10^4$ to $10 \times 10^4$.

129. A sintered ceramic proppant that is spherical and having a central void, and having regions A to B, B to C and C to D, wherein region A to B is closest to the central void and region C to D is furthest away from said central void, and region B to C is radially located between region A to B and C to D and said sintered ceramic proppant having porosity that is highest in the central location of the shell with regard to radius of sintered ceramic proppant with region A to B having from 0% to 5% (by volume of that region) of porosity, region B to C having porosity of from 5% to 30% by volume of that region, and region C to D having porosity that is ±10% of region A to B.

130. The sintered ceramic proppant of any preceding or following embodiment/feature/aspect, wherein region B to C has more porosity by volume than region A to B and/or region C to D.

131. The sintered ceramic proppant of any preceding or following embodiment/feature/aspect, wherein region B to C has at least 10% more porosity than other said regions.

132. The sintered ceramic proppant of any preceding or following embodiment/feature/aspect, wherein region A to B comprises from 10% to 40% by volume of the overall non-void region of the proppant, region B to C comprises from 20% to 50% by volume of the overall non-void regions of the proppant and region C to D comprises from 10% to 40% by volume of the overall non-void regions of the proppant.

133. The method of any preceding or following embodiment/feature/aspect, wherein said slurry has a viscosity of from about $10^2$ to about $10^5$ cP.

134. The method of any preceding or following embodiment/feature/aspect, wherein said sintering is performed under pressure at from about $0.1 \times 10^5$ to about $10 \times 10^5$ Pa.

135. The method of any preceding or following embodiment/feature/aspect, wherein said ceramic particulate material have a $d_{50}$ particle size of from 0.2 micron to about 50 microns.

136. The method of any preceding or following embodiment/feature/aspect, wherein said ceramic particulate material have a $d_{50}$ particle size of from 0.5 micron to about 5 microns.

137. The method of any preceding or following embodiment/feature/aspect, wherein said ceramic particulate material have a $d_{50}$ particle size of from 0.5 micron to about 2.5 microns.

138. A method of making a ceramic proppant comprising:
a. forming a green body core from a first plurality of particles that comprise at least one type of first ceramic material;
b. forming at least one green shell layer around said green body core to obtain a green body, wherein said green shell layer is formed from a second plurality of particles that comprise at least one type of second ceramic material, wherein said first ceramic material and said second ceramic material is the same or different; and
c. sintering said green body to form a sintered body.

139. The method of any preceding or following embodiment/feature/aspect, wherein said forming of the green body core comprises spray drying a slurry containing said first plurality of particles into the shape of said green body core.

140. The method of any preceding or following embodiment/feature/aspect, wherein said forming of the at least one green shell layer comprises utilizing a fluid bed to apply said second plurality of particles to provide said green shell layer.

141. The method of any preceding or following embodiment/feature/aspect, wherein said second plurality of particles further comprises at least one pore former or microsphere or both.

142. The method of any preceding or following embodiment/feature/aspect, wherein said green body core is a solid core with no central void.

143. The method of any preceding or following embodiment/feature/aspect, wherein said green body core is a hollow core having a central void.

144. A method of making a ceramic proppant comprising:
a. forming a green body core from a first plurality of particles that comprise at least one type of first ceramic material;
b. sintering said green body core to form a sintered core;
c. forming at least one green shell layer around said sintered core to obtain at least one green shell layer, wherein said green shell layer is formed from a second plurality of particles that comprise at least one type of second ceramic material, wherein said first ceramic material and said second ceramic material is the same or different;
d. sintering said at least one green shell layer to form a sintered body having a core/shell.

145. The method of any preceding or following embodiment/feature/aspect, wherein said forming of the green body core comprises spray drying a slurry containing said first plurality of particles into the shape of said green body core.

146. The method of any preceding or following embodiment/feature/aspect, wherein said forming of the at least one green shell layer comprises utilizing a fluid bed to apply said second plurality of particles to provide said at least one green shell layer.

147. The method of any preceding or following embodiment/feature/aspect, wherein said second plurality of particles further comprises at least one pore former or microsphere or both.

148. The method of any preceding or following embodiment/feature/aspect, wherein said green body core is a solid core with no central void.

149. The method of any preceding or following embodiment/feature/aspect, wherein said green body core is a hollow core having a central void.

150. A method of a making ceramic proppant comprising:
a. forming at the same time or about the same time, a green body core from a first plurality of particles that comprise at least one type of first ceramic material and forming at least one green shell layer around said green body core to obtain a green body, wherein said shell layer is formed from a second plurality of particles that comprise at least one type of second ceramic material, wherein said first ceramic material and said second ceramic material is the same or different; and b. sintering said green body to form a sintered body.

151. The method of any preceding or following embodiment/feature/aspect, wherein said forming of the green body core and green shell layer comprises forming by way of a co-axial nozzle.

152. The method of any preceding or following embodiment/feature/aspect, wherein said second plurality of particles further comprises at least one pore former or microsphere or both.

153. The method of any preceding or following embodiment/feature/aspect, wherein said green body core is a solid core with no central void.

154. The method of any preceding or following embodiment/feature/aspect, wherein said green body core is a hollow core having a central void.

155. The method of any preceding or following embodiment/feature/aspect, wherein said forming of the green body core and green shell layer comprises forming by co-axial extrusion or co-axial spray-drying.

156. A method of making a ceramic proppant comprising:
a. providing a fugitive spherical core;
b. forming at least one green shell layer around said fugitive spherical core to obtain a green body, wherein said green shell layer is formed from a plurality of particles that comprise at least one type of ceramic material; and
c. sintering said green body to remove at least a portion of said fugitive spherical core and form a central void and a sintered shell body.

157. The method of any preceding or following embodiment/feature/aspect, wherein said fugitive spherical core comprises at least one polymer.

158. The method of any preceding or following embodiment/feature/aspect, wherein said fugitive spherical core is polymer core.

159. The method of any preceding or following embodiment/feature/aspect, wherein said fugitive spherical core comprises at least one silicon-containing polymer.

160. The method of any preceding or following embodiment/feature/aspect, further comprising forming said fugitive spherical core by extrusion or spraying drying.

161. The method of any preceding or following embodiment/feature/aspect, wherein said fugitive spherical core is a solid core.

162. The method of any preceding or following embodiment/feature/aspect, wherein said fugitive spherical core is a core with a central void.

163. The method of any preceding or following embodiment/feature/aspect, wherein said forming of the at least one green shell layer comprises utilizing a fluid bed to apply said plurality of particles to provide said green shell layer.

164. The method of any preceding or following embodiment/feature/aspect, wherein said plurality of particles further comprises at least one pore former or microsphere or both.

165. The method of any preceding or following embodiment/feature/aspect, wherein said sintering comprises sintering in an oxidizing atmosphere.

166. The method of any preceding or following embodiment/feature/aspect, wherein said fugitive spherical core is pyrolyzed during said sintering.

167. The method of any preceding or following embodiment/feature/aspect, wherein said fugitive spherical core is pyrolyzed during said sintering and at least a portion of said fugitive spherical core forms a pyrolyzed material that reacts with at least a portion of said green shell layer.

168. The method of any preceding or following embodiment/feature/aspect, wherein said fugitive spherical core is pyrolyzed during said sintering and at least a portion of said fugitive spherical core forms a pyrolyzed material that reacts with at least a portion of said green shell layer to form a mullite phase.

169. The method of any preceding or following embodiment/feature/aspect, wherein said fugitive spherical core is pyrolyzed during said sintering and at least a portion of said fugitive spherical core forms a pyrolyzed material that reacts with at least a portion of said green shell layer to form a mullite phase in a radial region closer to the central void and wherein a radial region further away from said central void contain no mullite phase.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of making a sintered ceramic proppant comprising forming a spherical green body core comprising one or more ceramic particulate materials; wherein the sintered ceramic proppant comprises a monodispersity with a 3-sigma distribution, wherein a width of a total distribution of the sintered ceramic proppant is 5% or less of a mean particle size of the sintered ceramic proppant, wherein the 3-sigma distribution is a size distribution of the sintered ceramic proppant; wherein the sintered ceramic proppant comprises a glassy phase, wherein the glassy phase is present in an amount of 15% to 70% based on weight of the sintered ceramic proppant; wherein the sintered ceramic proppant comprises ceramic whiskers, wherein the ceramic whiskers have an average length from 1 micron to 3.5 microns, an average width from 0.1 to 0.3 microns and a whisker length distribution from 0.1 to 5; wherein 90% of the ceramic whiskers have a whisker length that is less than 5 microns, wherein the sintered ceramic proppant comprises a free alpha-alumina content of at least 20 wt % based on the weight of the sintered ceramic proppant; wherein the sintered ceramic proppant comprises an etching weight loss from 15 wt % to 30 wt % based on the weight of the sintered ceramic proppant;

forming, at the same time or afterwards, a green body shell around said green body core, wherein said green body shell comprises at least one ceramic particulate material which results in a green core/shell body;

sintering said green core/shell body, and, during sintering, diffusing at least a portion of said green body core into said green body shell; wherein the diffusing forms the sintered ceramic proppant having a) a central void or a plurality of hollow regions, and b) a shell.

2. The method of claim 1, wherein said central void or hollow regions comprises at least 1% by volume of the overall volume of the sintered ceramic proppant.

3. The method of claim 1, wherein said diffusing results in at least 5% by weight of said green body core diffusing into said shell.

4. The method of claim 1, wherein said diffusing results in at least 10% by weight of said green body core diffusing into said shell.

5. The method of claim 1, wherein said diffusing results in at least 50% by weight of said green body core diffusing into said shell.

6. The method of claim 1, wherein the green body shell has a softening temperature that is higher than the softening temperature of the green body core.

7. The method of claim 1, wherein said green body shell has a softening temperature of at least 100° C. higher than the softening temperature of the green body core.

8. The method of claim 7, wherein the softening temperature of the green body shell is from about 300° C. to about 400° C. higher than the softening temperature of the green body core.

9. The method of claim 1, wherein the green body shell has a porosity of at least 10% by volume based on the volume of the green body shell.

10. The method of claim 1, wherein the green body shell has a porosity of at least 30% by volume based on the volume of the green body shell.

11. The method of claim 1, wherein said sintered ceramic proppant has at least 10% porosity in the sintered shell.

12. The method of claim 1, wherein a slurry of the ceramic particulate material has an Ohnesorge Number (Z) of from 1 to 10, wherein the Ohnesorge Number (Z) is a measure of a sprayability of the slurry.

13. The method of claim 1, wherein a slurry of the ceramic particulate material has an Ohnesorge Number (Z) of from 2 to 10, wherein the Ohnesorge Number (Z) is a measure of a sprayability of the slurry.

14. The method of claim 1, wherein a slurry of the ceramic particulate material has an Ohnesorge Number (Z) of from 4 to 6, wherein the Ohnesorge Number (Z) is a measure of a sprayability of the slurry.

15. The method of claim 1, wherein the whiskers or one or more fibers are formed in-situ in said shell during said sintering and as a result of said diffusing.

16. The method of claim 1, wherein said diffusing of the green body core or portion thereof into the shell results in a gradient of wherein a higher concentration of the core is present closer to the core than to an exterior outer surface of the proppant.

17. The method of claim 1, wherein said spherical green body, green body shell, or both further comprise at least one nucleating agent.

18. The method of claim 1, wherein said ceramic particulate materials comprise cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic or any combination thereof.

19. The method of claim 1, wherein said ceramic particulate materials comprise one or more sedimentary materials or synthetically produced materials or both.

20. The method of claim 1, wherein said spherical green body core and said green body shell are in the absence of igneous or metamorphic materials.

21. The plurality of sintered ceramic proppants of claim 1, wherein said sintered ceramic proppants have less than 1% by weight of proppant of igneous or metamorphic materials.

22. The method of claim 1, wherein the green body or a portion thereof has a density, as measured by a gas pycnometer, such that the average density (g/cm3) does not alter by more than 1% between the density of the whole green body compared to the density of the crushed green body.

23. The method of claim 22, wherein the average density changes 0.005% or less.

24. The method of claim 12, wherein one or more mobile phases are formed in droplets of the slurry that forms the green body and one phase migrates to the surface of the droplet, which causes a multi-phase droplet to form.

25. The method of claim 24, wherein said multi-phase droplet forms a non-uniform green body of phases.

26. The method of claim 25, wherein said non-uniform green body of phases diffuses at different rates into said shell with respect to the phases.

27. The method of claim 1, wherein said green body core comprises at least 50% by weight, based on the weight of the green body core of glassy material, and said green body shell comprises at least 50% crystalline material.

28. The method of claim 1, wherein said green body core comprises at least 75% by weight, based on the weight of the green body core of glassy material, and said green body shell comprises at least 75% crystalline material.

29. The method of claim 1, wherein said green body core comprises at least 95% by weight, based on the weight of the green body core of glassy material, and said green body shell comprises at least 95% crystalline material.

30. The method of claim 1, wherein the particles used to form the green body core are at least 10% smaller in average mean size (d50 size) compared to the mean particle size (d50 size) of the particles that form the green body shell.

31. The method of claim 1, wherein the particles used to form the green body core are at least 50% smaller in average mean size (d50 size) compared to the mean particle size (d50 size) of the particles that form the green body shell.

32. The method of claim 1, wherein the particles used to form the green body core are at least 100% smaller in average mean size (d50 size) compared to the mean particle size (d50 size) of the particles that form the green body shell.

33. The method of claim 1, wherein the ceramic particulate materials that form the green body or a part thereof has the following standard deviation range based on the indicated mean particle size range:

100-299 μm, σ=0.83-2.5
300-499 μm, σ=2.5-4.16
500-799 μm, σ=4.16-6.66
800-999 μm, σ=6.66-8.33
1000-1499 μm, σ=8.33-12.5
1500-2000 μm, σ=12.5-16.66.

34. The method of claim 1, wherein the ceramic particulate materials that form the green body or a part thereof has a monodisperse particle distribution such that $$ds = (d90 - d10)d50$$

where d90, d50 and d10 are the 90th, 50th, and 10th percentiles of the particle size distribution respectively, wherein $0.00 < ds \leq 0.05$.

35. The method of claim 12, wherein said slurry has a viscosity of from about 102 to about 105 cP.

\* \* \* \* \*